United States Patent
Shimohira et al.

(10) Patent No.: US 12,086,500 B2
(45) Date of Patent: Sep. 10, 2024

(54) DEVICE MANAGEMENT SYSTEM, INFORMATION PROCESSING METHOD, INFORMATION PROCESSING SERVER, AND NON-TRANSITORY RECORDING MEDIUM

(71) Applicants: Yoshihiko Shimohira, Kanagawa (JP); Susumu Fujioka, Kanagawa (JP)

(72) Inventors: Yoshihiko Shimohira, Kanagawa (JP); Susumu Fujioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/178,035

(22) Filed: Mar. 3, 2023

(65) Prior Publication Data
US 2023/0297313 A1 Sep. 21, 2023

(30) Foreign Application Priority Data

Mar. 18, 2022 (JP) ................. 2022-044210

(51) Int. Cl.
*G06F 3/14* (2006.01)
*G06F 3/04883* (2022.01)
*H04L 65/401* (2022.01)
*H04L 65/403* (2022.01)

(52) U.S. Cl.
CPC ........ *G06F 3/1454* (2013.01); *G06F 3/04883* (2013.01); *H04L 65/4015* (2013.01); *H04L 65/403* (2013.01)

(58) Field of Classification Search
CPC ..... G06F 3/04883; G06F 3/1454–1462; H04L 65/401; H04L 65/4015; H04L 65/403–4053
See application file for complete search history.

(56) References Cited

U.S. PATENT DOCUMENTS

| | | | |
|---|---|---|---|
| 8,773,462 B2 * | 7/2014 | Kasuya | G06F 3/1462 345/636 |
| 9,978,178 B1 * | 5/2018 | Shepard | G06T 19/00 |
| 9,992,449 B1 * | 6/2018 | Ashkenazi | H04N 5/2628 |
| 2011/0122437 A1 | 5/2011 | Shimohira | |
| 2011/0210908 A1 * | 9/2011 | Kasuya | H04N 7/15 345/2.2 |
| 2011/0221773 A1 * | 9/2011 | Kasuya | G06F 3/1462 345/634 |
| 2012/0233553 A1 * | 9/2012 | Barrus | H04M 3/567 715/751 |
| 2013/0016373 A1 | 1/2013 | Shimohira | |

(Continued)

FOREIGN PATENT DOCUMENTS

| | | |
|---|---|---|
| JP | 2011-135390 | 7/2011 |
| JP | 2016-122226 | 7/2016 |

*Primary Examiner* — Gene W Lee

(74) *Attorney, Agent, or Firm* — IPUSA, PLLC

(57) ABSTRACT

A device management system includes: a display device including first circuitry that displays a display area for displaying an object input by an operator; an image-capturing device including second circuitry that acquires an operator image including an image of at least a portion of the display device and at least a portion of an operator; and an information processing server including third circuitry that transmits the operator image acquired by the image-capturing device to a terminal apparatus to enable sharing of the display area between the display device and the terminal apparatus.

13 Claims, 35 Drawing Sheets

(56) References Cited

U.S. PATENT DOCUMENTS

| | | |
|---|---|---|
| 2017/0017455 A1 | 1/2017 | Shimohira |
| 2017/0093941 A1 | 3/2017 | Shimohira et al. |
| 2017/0094338 A1 | 3/2017 | Kamekura et al. |
| 2020/0162617 A1* | 5/2020 | Hasegawa ............ H04L 12/1822 |
| 2023/0289123 A1* | 9/2023 | Nakamura ............. H04N 7/155 |
| 2023/0308607 A1* | 9/2023 | Kaku .................... H04N 7/147 |

* cited by examiner

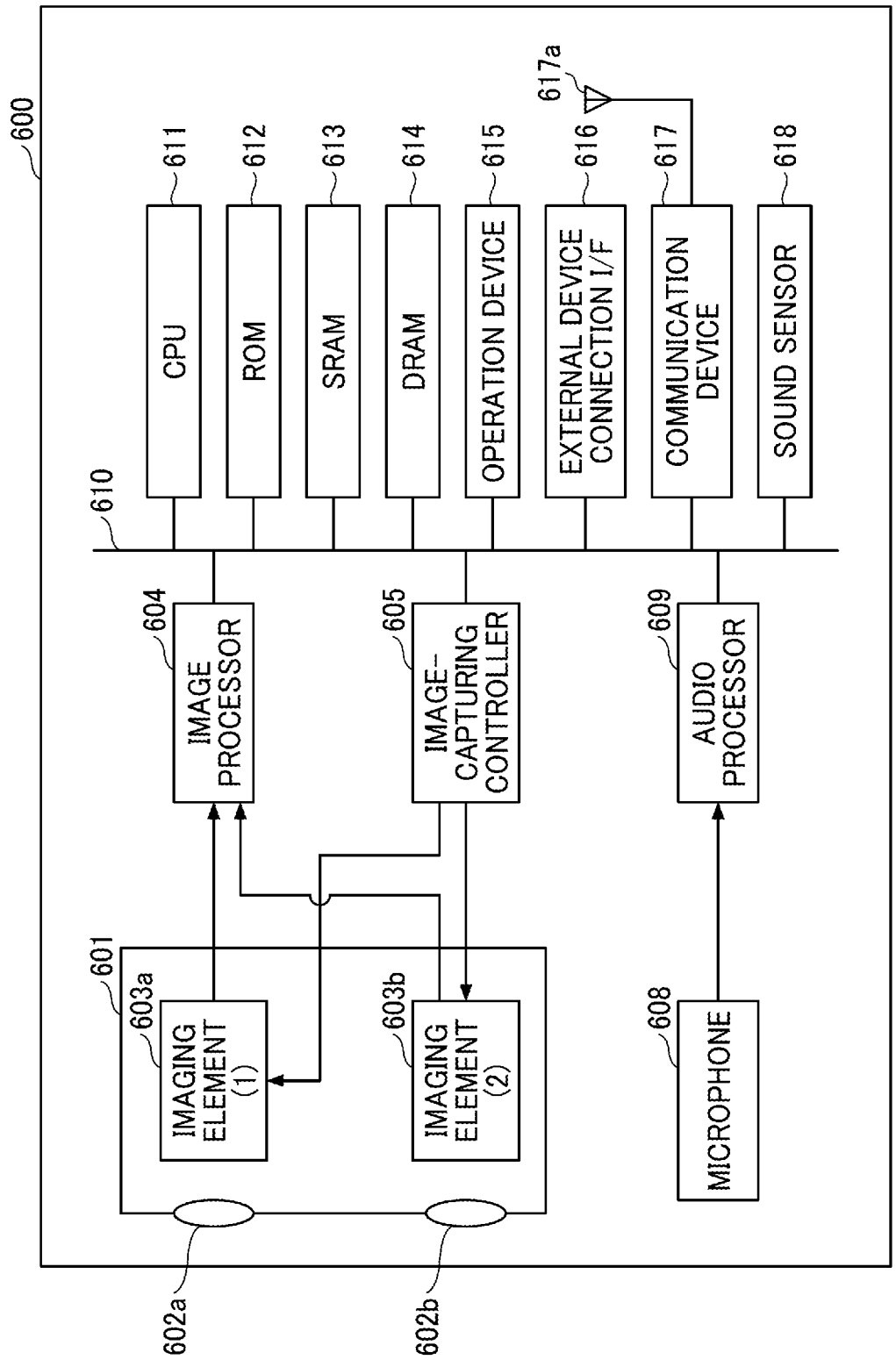

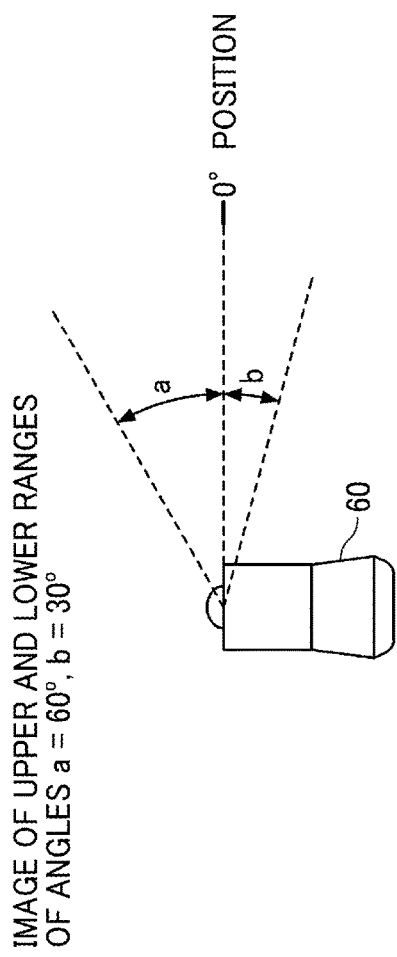
FIG. 6A
IMAGE OF 360-DEGREE SPACE AROUND DEVICE
FIG. 6B
IMAGE OF UPPER AND LOWER RANGES OF ANGLES a = 60°, b = 30°
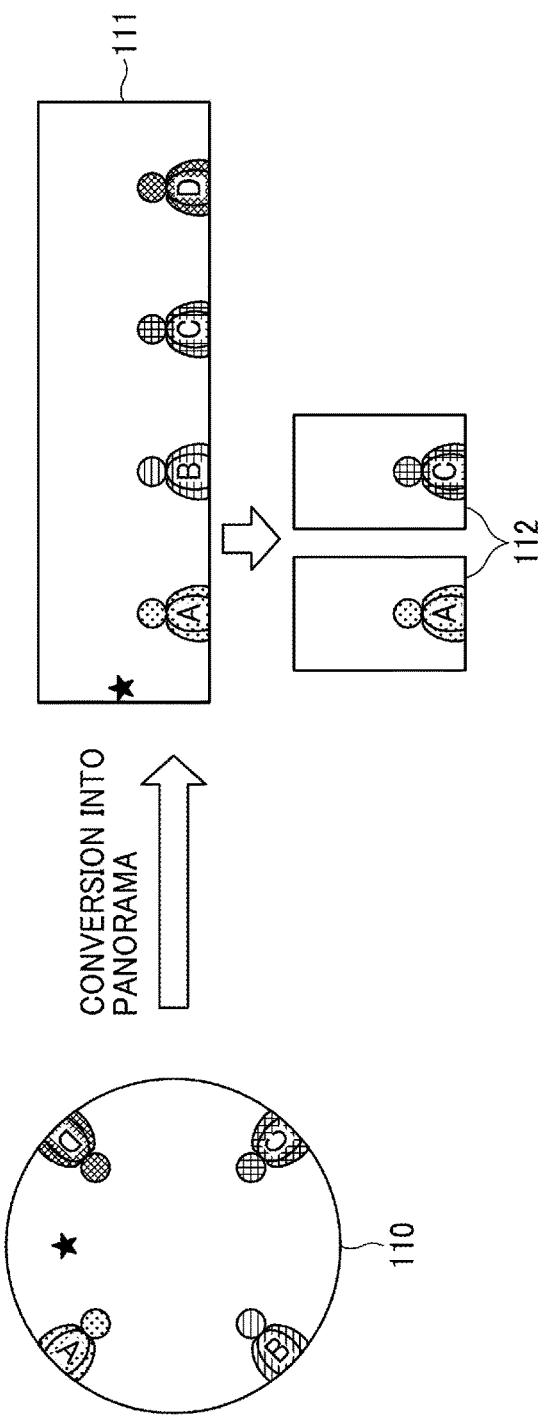
FIG. 7

FIG. 10

| CONFERENCE ID | RECORDED VIDEO ID | UPDATE DATE AND TIME | TITLE | UPLOAD | STORAGE DESTINATION |
|---|---|---|---|---|---|
| 091 | 151 | 20XX/1/25 10:30 | DESIGN CONFERENCE | — | |
| 091 | 152 | 20XX/1/25 10:50 | DESIGN CONFERENCE | — | |
| 109 | 198 | 20XX/1/27 14:30 | DEVELOPMENT CONFERENCE | DONE | http://sample.com/file/ ... |
| 123 | 250 | 20XX/1/28 15:00 | PATENT CONFERENCE | DONE | http://sample.com/file/ ... |
| ... | ... | ... | ... | ... | ... |

FIG. 11

| CONFERENCE ID | HOST ID | TITLE | START DATE AND TIME | END DATE AND TIME | ELECTRONIC WHITEBOARD | MEETING DEVICE |
|---|---|---|---|---|---|---|
| 0000 | 0000 | REVIEW | 2021-12-03 10:00 | 2021-12-03 11:00 | NULL | NULL |
| 0001 | 0000 | REGULAR CONFERENCE | 2021-12-03 14:00 | 2021-12-03 14:30 | WB001 | DEV001 |

FIG. 12

| CONFERENCE ID | DEVICE IDENTIFICATION INFORMATION |
|---|---|
| 001 | WB001<br>DEV001 |

FIG. 13

| USER ID | TYPE | NAME | EMAIL ADDRESS |
|---|---|---|---|
| 0000 | USER | USER A | user1@mail.com |
| 0001 | USER | USER B | user2@mail.com |
| 0002 | ELECTRONIC WHITEBOARD | ELECTRONIC WHITEBOARD (CONFERENCE ROOM A) | wb1@mail.com |
| 0003 | ELECTRONIC WHITEBOARD | ELECTRONIC WHITEBOARD (CONFERENCE ROOM B) | wb2@mail.com |
| 0004 | MEETING DEVICE | MEETING DEVICE (CONFERENCE ROOM A) | device1@mail.com |
| 0005 | MEETING DEVICE | MEETING DEVICE (CONFERENCE ROOM B) | device2@mail.com |

FIG. 15

| DEVICE IDENTIFICATION INFORMATION | WB001 |
|---|---|
| IP ADDRESS | 1.1.1.1 |
| PASSWORD | **** |

FIG. 16

| OBJECT ID | DATA CONTENT | INPUT SOURCE | IDENTIFICATION INFORMATION OF OPERATOR IMAGE | STORAGE DESTINATION |
|---|---|---|---|---|
| stroke_id_1 | (10, 10), (15, 15), (20, 20) ··· | wb_01 | user_image_id_01 | /images/user_image_id_01 |
| stroke_id_2 | (100, 100), (400, 400) ··· | user_id_1 | | |
| text_id_1 | CONFERENCE (55, 55), (75, 75) | wb_01 | user_image_id_02 | /images/user_image_id_02 |
| ··· | ··· | ··· | ··· | ··· |

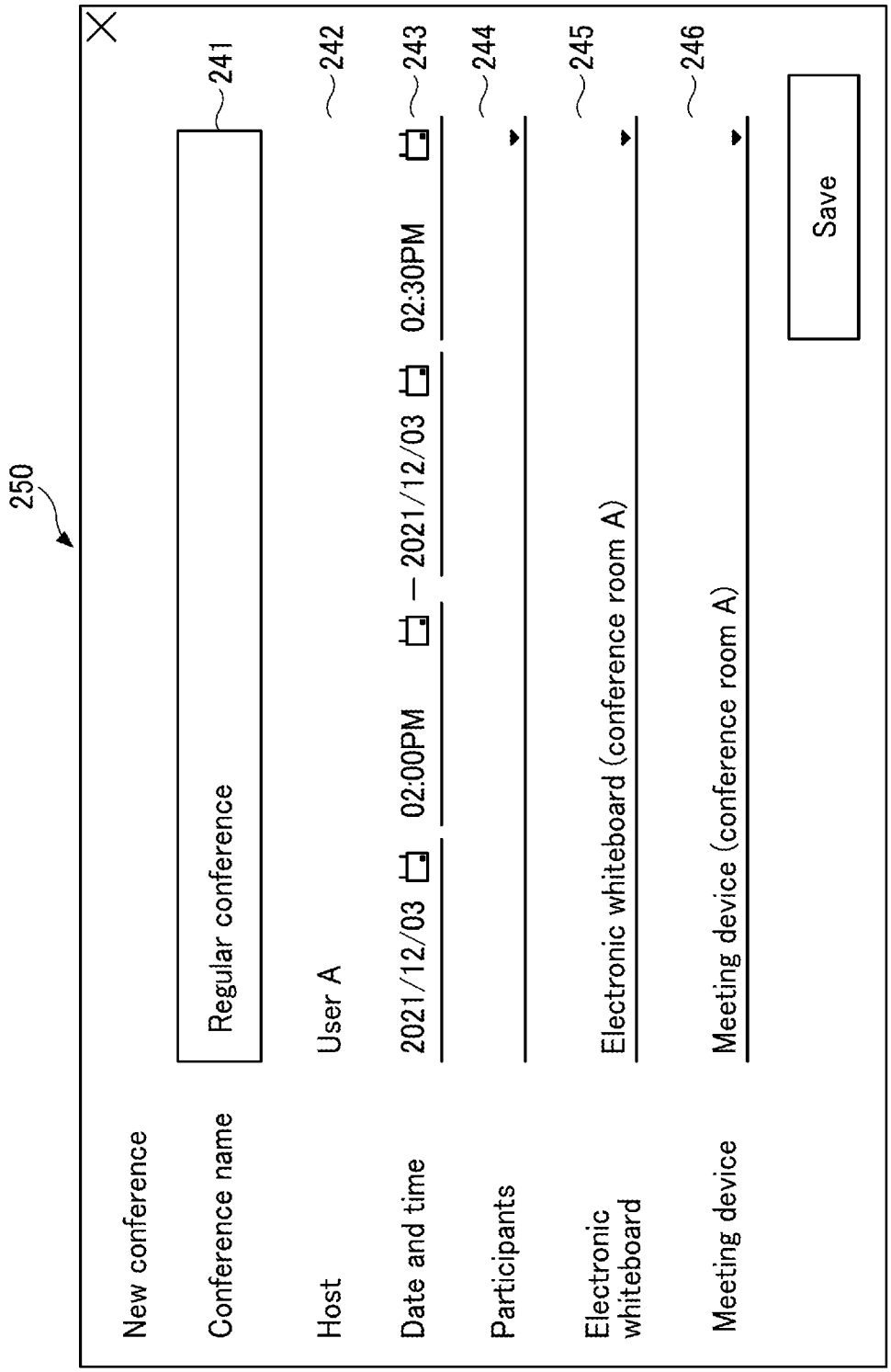

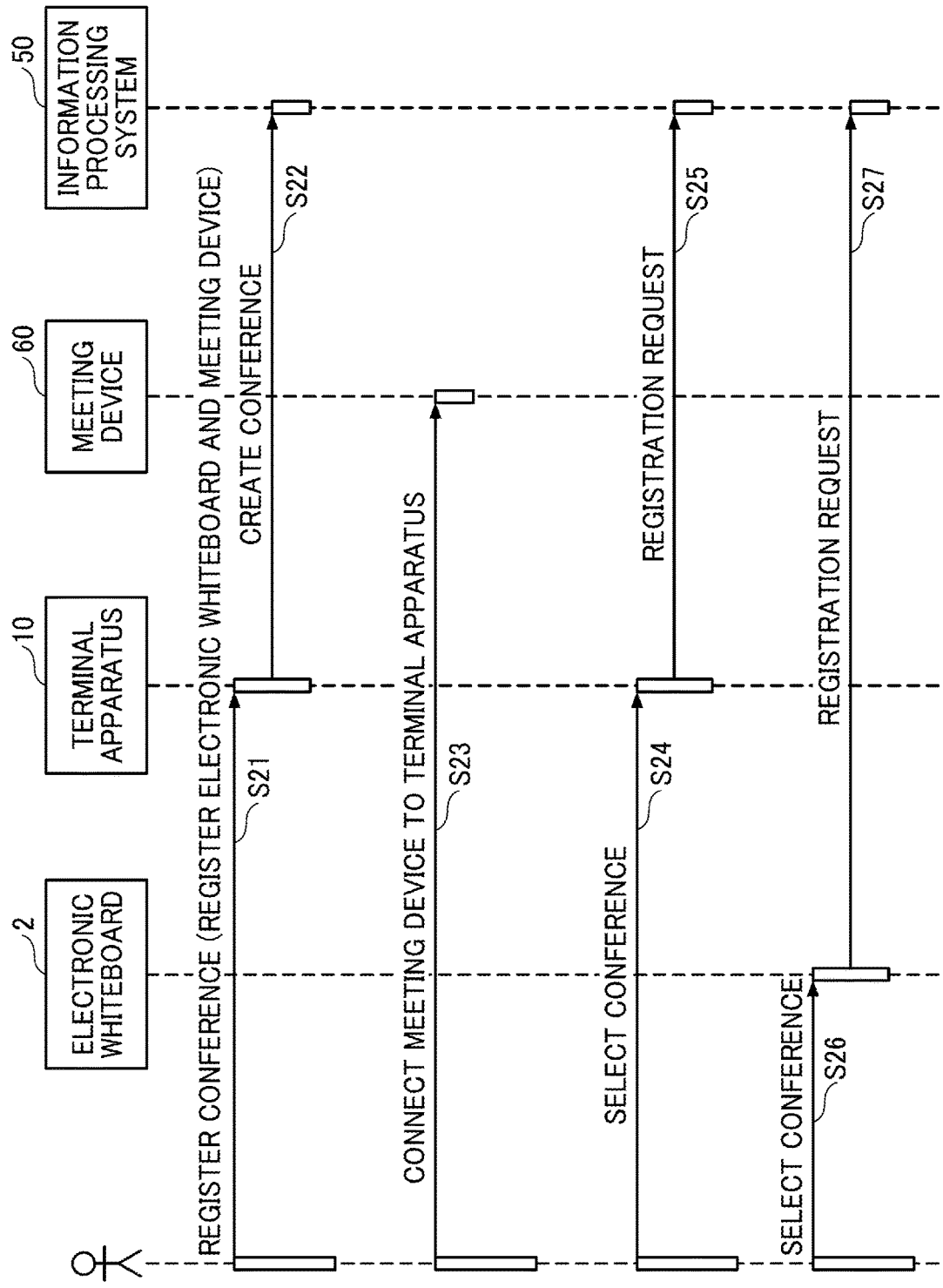

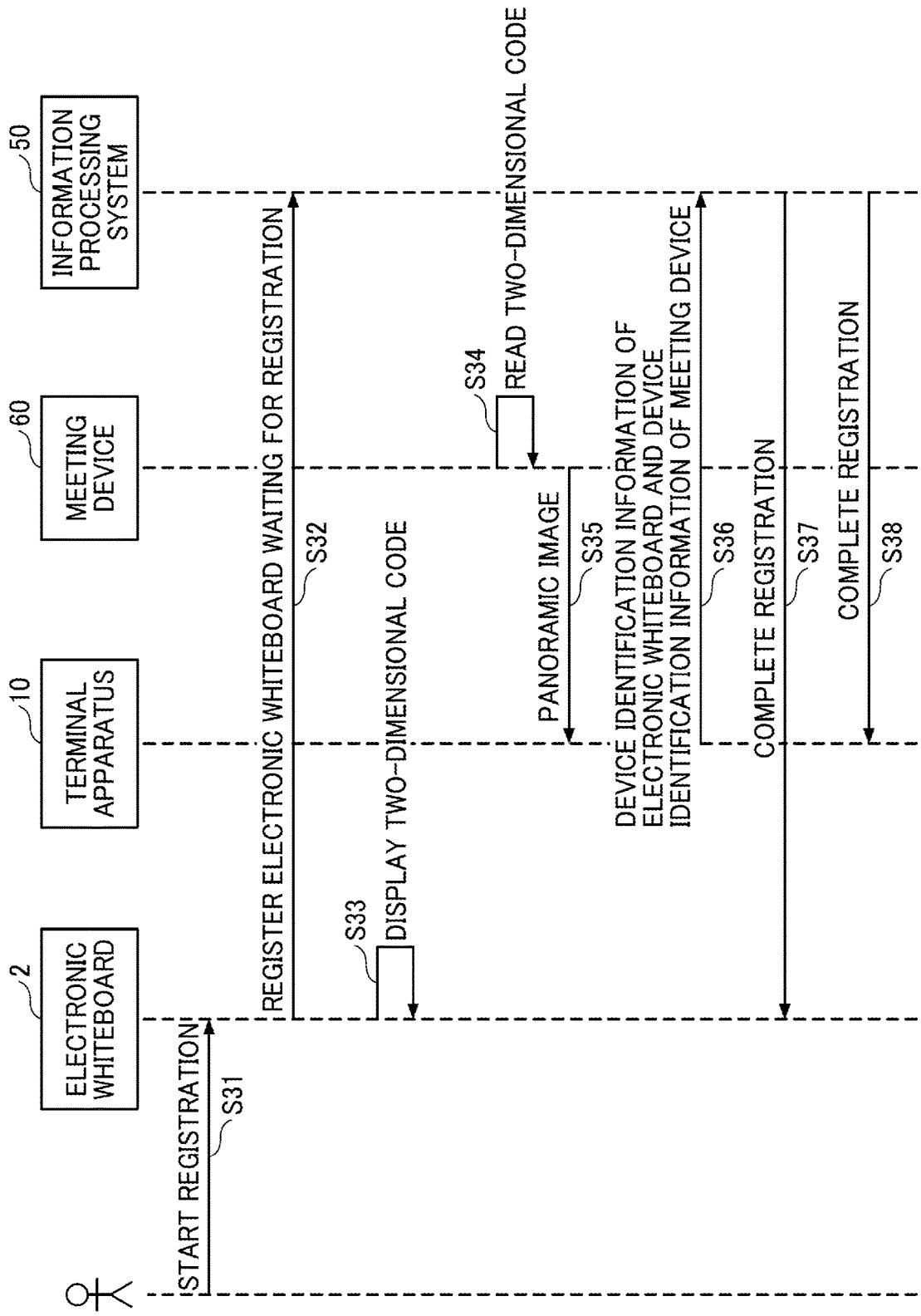

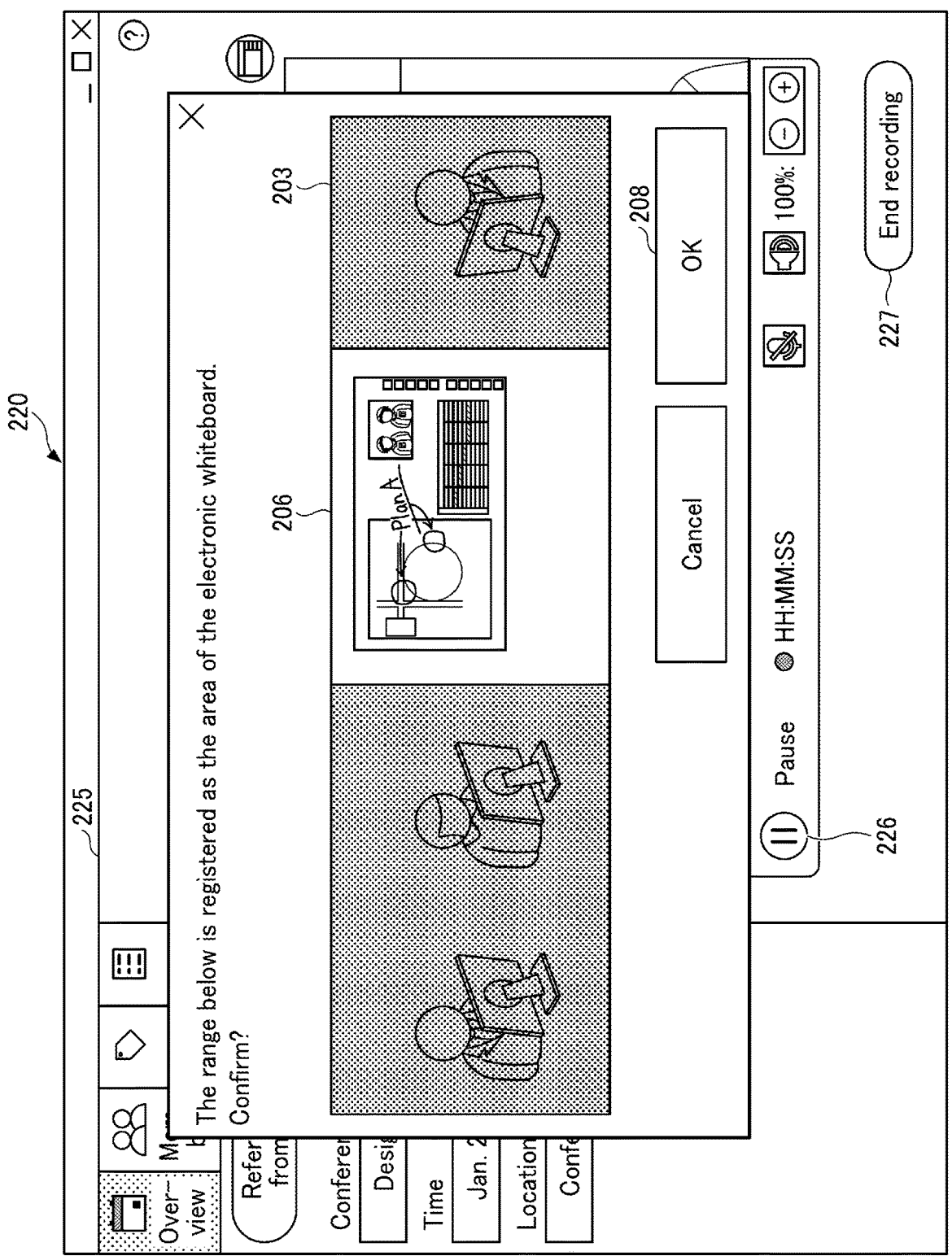

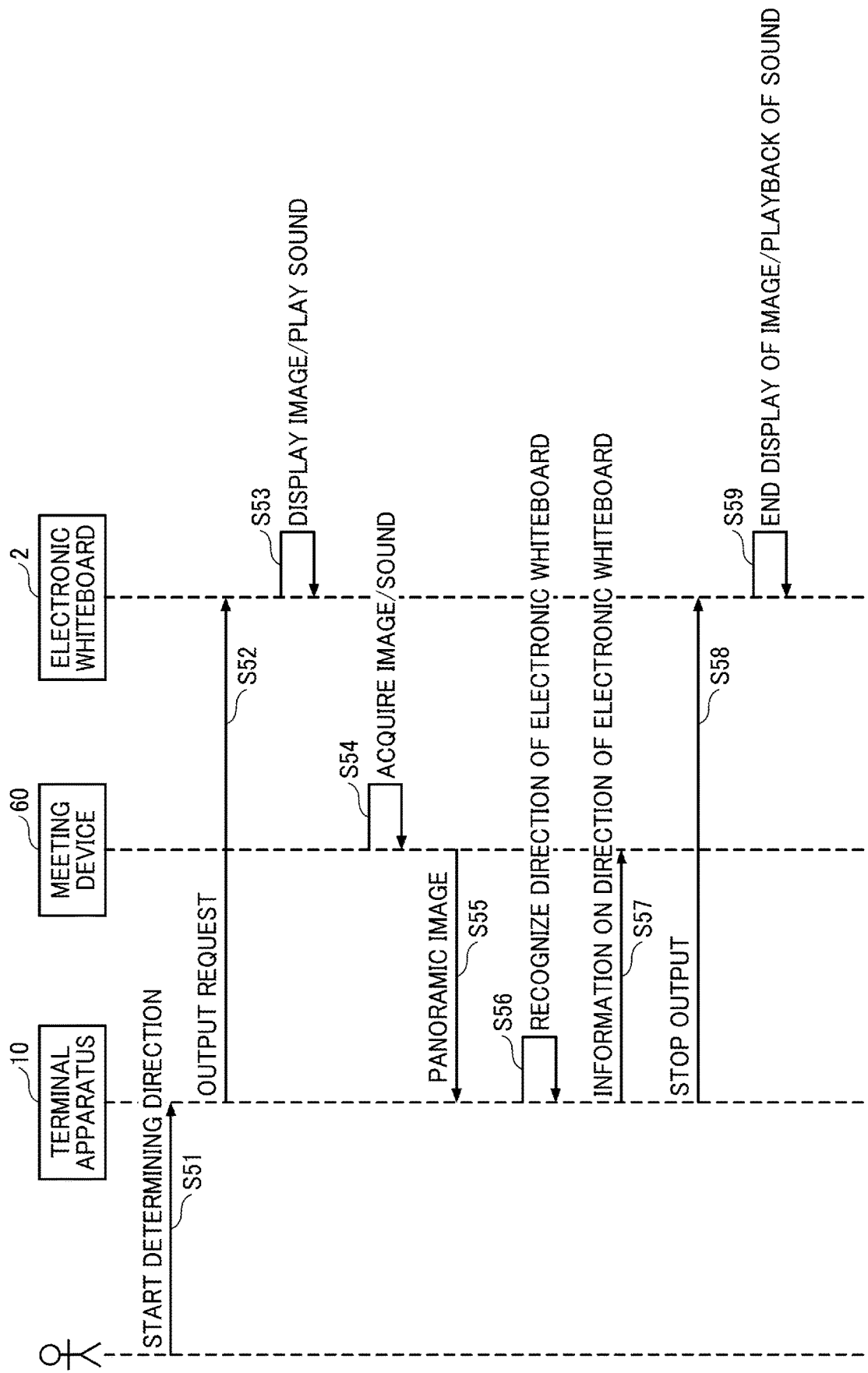

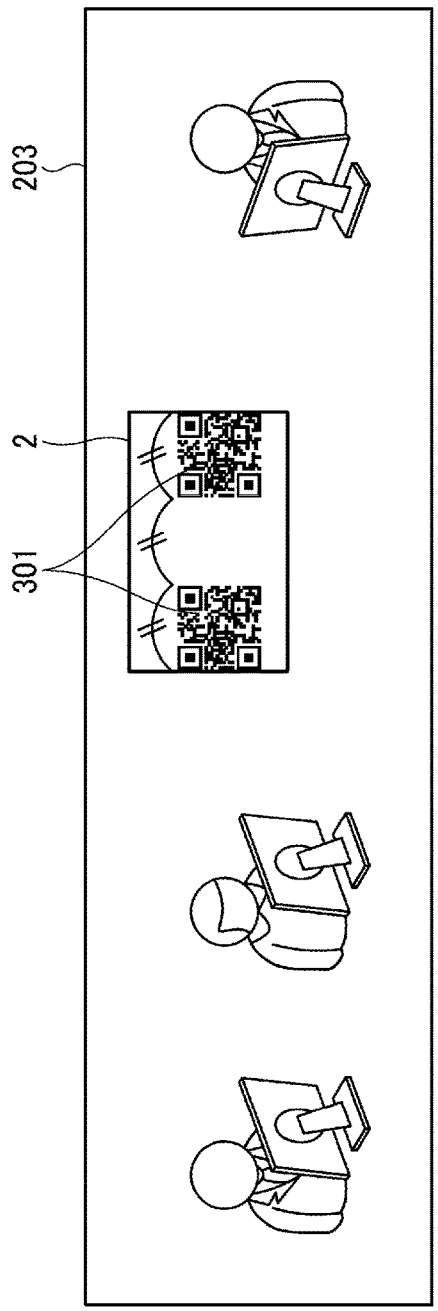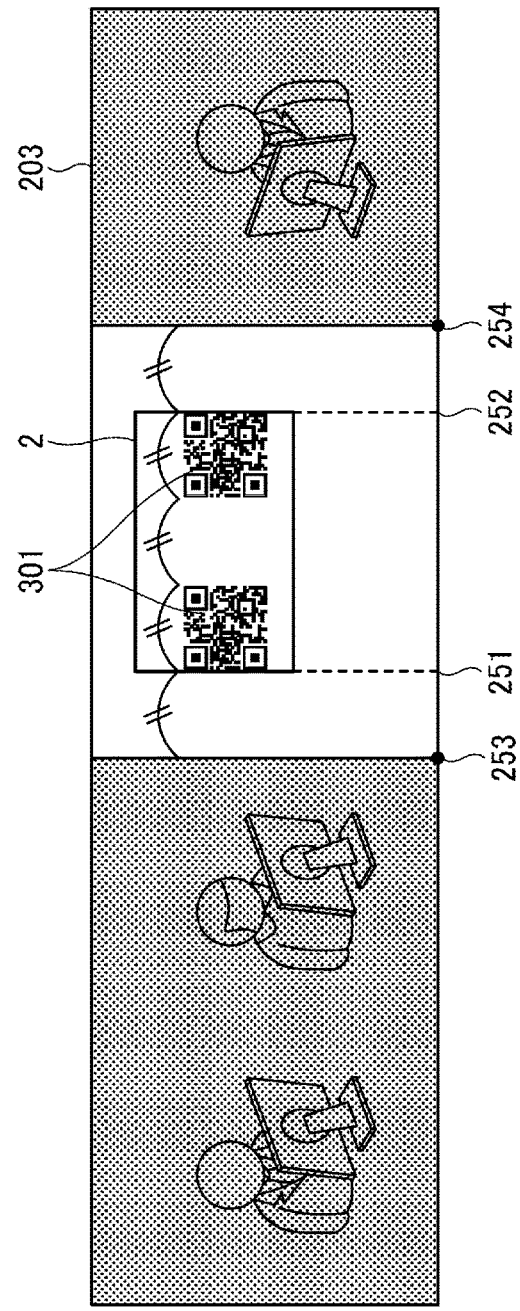

DEVICE MANAGEMENT SYSTEM, INFORMATION PROCESSING METHOD, INFORMATION PROCESSING SERVER, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-044210, filed on Mar. 18, 2022, in the Japan Patent Office, the entire disclosure of which is hereby incorporated by reference herein.

BACKGROUND

Technical Field

The present disclosure relates to a device management system, an information processing method, an information processing server, and a non-transitory recording medium.

Related Art

A display device in the related art displays data handwritten on a touch panel thereof with an input means such as an electronic pen or a finger. A display device including a relatively large touch panel is disposed indoors or outdoors and is used by a plurality of users as an electronic whiteboard or the like.

Some techniques in the related art use a camera included in such an electronic whiteboard (i.e. the display device) to deduce an operator of the electronic whiteboard. For example, a technique of deducing that a user who is included in a first image but is not included in a second image is a current operator of a touch panel is disclosed.

The related art, however, does not enable an image of an operator who is operating an display device at one site to be shared with a terminal apparatus at another site. Thus, the operation performed by the operator of the display device at the one site is sometimes not grasped at the other site.

SUMMARY

According to an embodiment of the present disclosure, a display management system includes: a display device including first circuitry configured to display a display area for displaying an object input by an operator; an image-capturing device including second circuitry configured to acquire an operator image including an image of at least a portion of the display device and at least a portion of an operator; and an information processing server including third circuitry configured to transmit the operator image acquired by the image-capturing device to a terminal apparatus to enable sharing of the display area between the display device and the terminal apparatus.

According to another embodiment of the present disclosure, an information processing server including circuitry that: acquires an operator image captured by an image-capturing device, the operator image including an image of at least a portion of the display device and at least a portion of an operator who is performing an input operation on the display device; and transmits the acquired operator image to a terminal apparatus to enable sharing of the display area between the display device and the terminal apparatus.

According to another embodiment of the present disclosure, an information processing method includes: acquiring an operator image captured by an image-capturing device, the operator image including an image of at least a portion of the display device and at least a portion of an operator who is performing an input operation on the display device; and transmitting the acquired operator image to a terminal apparatus to enable sharing of the display area between the display device and the terminal apparatus.

According to another embodiment of the present disclosure, a program, stored on a non-transitory recording medium, is provided, which causes one or more processors to perform the information processing method as described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a diagram illustrating an example of a hardware configuration of the meeting device according to the embodiment of the present disclosure;

FIGS. 6A and 6B are diagrams for describing an image-capturing range of the meeting device according to the embodiment of the present disclosure;

FIG. 7 is a diagram for describing a panoramic image and clipping of speaker images in accordance with the embodiment of the present disclosure;

FIG. 10 is a diagram illustrating an example of moving image recording information stored in an information storage unit in accordance with the embodiment of the present disclosure;

FIG. 11 is a diagram illustrating an example of conference information managed by a communication management unit in accordance with the embodiment of the present disclosure;

FIG. 12 is a diagram illustrating an example of association information, associating a conference identifier (ID) and device identification information with each other, stored in an association information storage unit in accordance with the embodiment of the present disclosure;

FIG. 13 is a diagram illustrating an example of account information stored in an account information storage unit in accordance with the embodiment of the present disclosure;

FIG. 15 is a diagram illustrating an example of information such as the device identification information stored in a device information storage unit in accordance with the embodiment of the present disclosure;

FIG. 16 is a diagram for describing object information stored in an object information storage unit in accordance with the embodiment of the present disclosure;

FIG. 19 is a diagram illustrating an example of a conference registration screen displayed by the terminal apparatus in accordance with the embodiment of the present disclosure;

FIG. 20 is an example of a sequence diagram for describing a process in which a user registers a meeting device and an electronic whiteboard to the information processing system in accordance with the embodiment of the present disclosure;

FIG. 21 is an example of a sequence diagram for describing a process in which the user registers a meeting device and an electronic whiteboard to the information processing system when the conference information is not created in accordance with the embodiment of the present disclosure;

FIG. 24 is a diagram illustrating a screen for checking the direction set by the user in accordance with the embodiment of the present disclosure;

FIG. 25 is an example of a sequence diagram for describing a process in which an information recording app determines the direction of the electronic whiteboard based on a specific image or sound in accordance with the embodiment of the present disclosure;

FIG. 26 is a diagram illustrating an example of two-dimensional codes displayed as the specific image by the electronic whiteboard in accordance with the embodiment of the present disclosure;

FIG. 27 is a diagram for describing a method of determining the direction of the electronic whiteboard based on the two-dimensional codes in accordance with the embodiment of the present disclosure;

Figure 1:
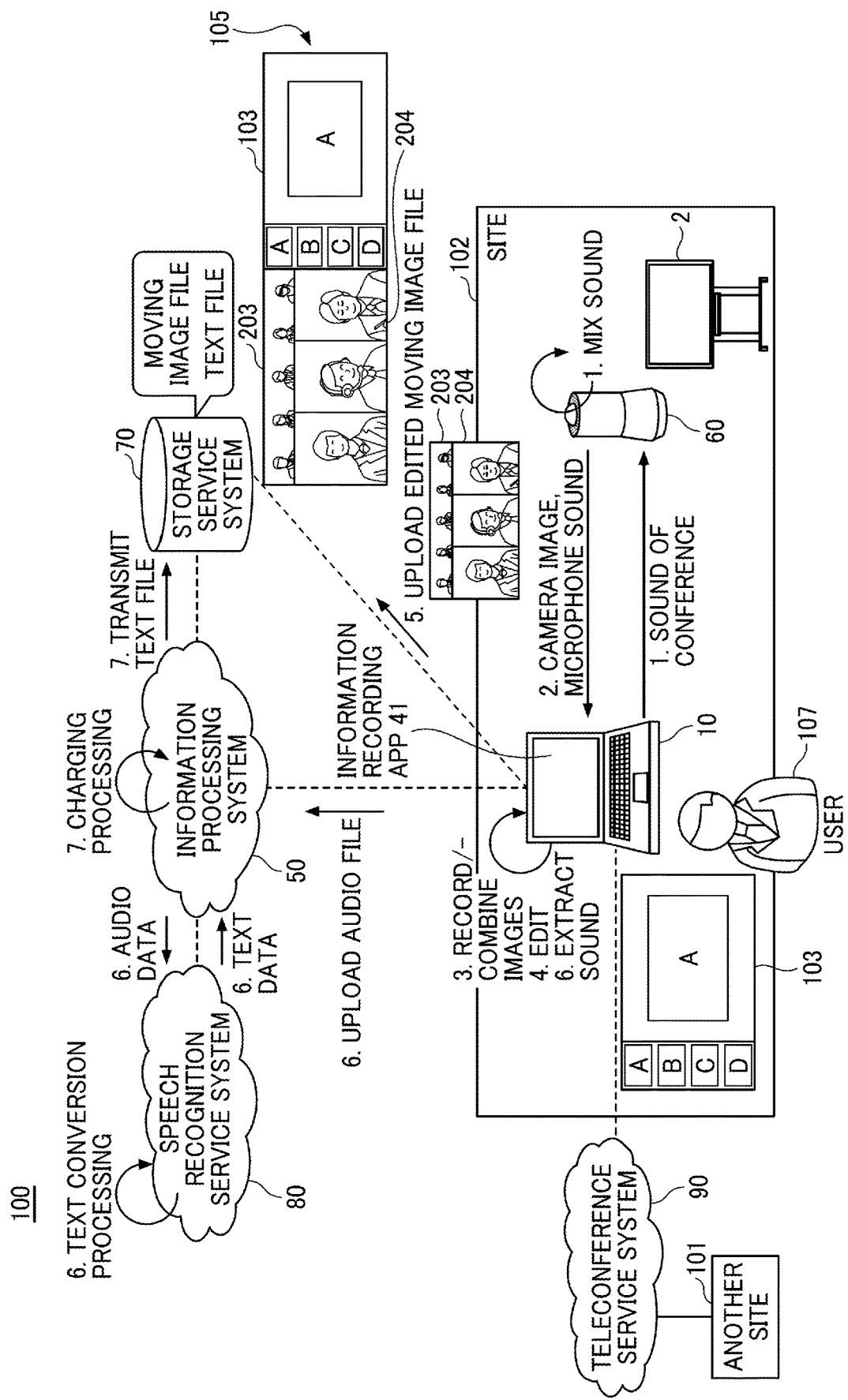
FIG. 1 is a diagram for describing an overview of creation of recording information for storing a screen of an application (hereinafter, referred to as an app) executed during a teleconference together with a panoramic image of surroundings in accordance with an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A device management system and an information processing method carried out by the device management system will be described below as an example of embodiments of the present disclosure.

Example Operation of Creating Minutes of Teleconference

In the related art, information related to an operator who has operated an object displayed by an electronic whiteboard is not shared. For example, if an information processing system enables object data displayed by the electronic whiteboard at one site to be shared in real time with another site, a user at the other site is informed of who is writing what. If the information processing system associates the operator with the object, who has input the object becomes apparent. This improves the content of the minutes.

An overview of a method of creating minutes using a panoramic image and a screen of an app will be described with reference to FIG. 1. FIG. 1 is a diagram for describing an overview of creation of recording information that includes a screen of an app executed during a teleconference together with a panoramic image of surroundings. As illustrated in FIG. 1, a user 107 at one site 102 uses a teleconference service system 90 to have a teleconference with a user at another site 101.

A recording information creation system 100 according to the present embodiment includes a meeting device 60 and a terminal apparatus 10. The meeting device 60 includes an image-capturing device (for example, camera) that captures an image of a 360-degree surrounding area, a microphone, and a loudspeaker. The meeting device 60 processes information of the captured image of the surrounding area to obtain a horizontal panoramic image (hereinafter, referred to as a panoramic image). The recording information creation system 100 uses the panoramic image and a screen created by an app executed by the terminal apparatus 10 to create recording information such as minutes. As for audio data, the recording information creation system 100 combines audio data received by a teleconference app 42 (FIG. 3) and audio data obtained by the meeting device 60 together and includes the resultant audio data in the recording information. The overview will be described below.

(1) An information recording app 41 (described below) and the teleconference app 42 are operating on the terminal apparatus 10. Another app such as a document display app may also be operating. The information recording app 41 transmits, to the meeting device 60, audio data to be output by the terminal apparatus 10. The audio data includes audio data received by the teleconference app 42 from the other site 101. The meeting device 60 mixes (combines) audio data obtained by the meeting device 60 and the audio data received under control of the teleconference app 42 together.

(2) The meeting device 60 includes the microphone. Based on a direction from which the microphone obtains sound, the meeting device 60 performs processing of clipping each speaker-including portion from the panoramic image to create a speaker image. The meeting device 60 transmits both the panoramic image and the speaker images to the terminal apparatus 10.

(3) The information recording app 41 operating on the terminal apparatus 10 displays a panoramic image 203 and speaker images 204. The information recording app 41 combines the panoramic image 203 and the speaker images 204 with a screen of any app (for example, a screen 103 of the teleconference app 42) selected by the user 107. For example, the information recording app 41 combines the panoramic image 203 and the speaker images 204 with the screen 103 of the teleconference app 42 to create a combined image 105 such that the panoramic image 203 and the speaker image 204 are arranged on the left side and the screen 103 of the teleconference app 42 is arranged on the right side. The screen of the app is an example of screen information (described below) displayed by each application such as the teleconference app 42. Since the processing (3) is repeatedly performed, the resultant combined images 105 form a moving image (hereinafter, referred to as a combined moving image). The information recording app 41 attaches the combined audio data to the combined moving image to create a moving image with sound.

In the present embodiment, an example of combining the panoramic image 203, the speaker images 204, and the screen 103 of the teleconference app 42 together is described. Alternatively, the panoramic image 203, the speaker images 204, and the screen 103 of the teleconference app 42 may be stored separately and arranged on a screen at the time of playback by the information recording app 41.

(4) The information recording app 41 receives an editing operation (performed by the user 107 to cut off a portion not to be used), and completes the combined moving image. The combined moving image is part of the recording information.

(5) The information recording app 41 transmits the created combined moving image (with sound) to a storage service system 70 for storage.

(6) The information recording app 41 extracts the audio data from the combined moving image (or may keep the original audio data to be combined) and transmits the extracted audio data to an information processing system 50. The information processing system 50 receives the audio data and transmits the audio data to a speech recognition service system 80 that converts the audio data into text data. The speech recognition service system 80 converts the audio data into text data. The text data includes data indicating a time, from the start of recording, when a speaker made an utterance.

In the case of real-time conversion into text data, the meeting device 60 transmits the audio data directly to the information processing system 50. The meeting device 60 then transmits the resultant text data to the information recording app 41 in real time.

(7) The information processing system 50 additionally stores the text data in the storage service system 70 storing the combined moving image. The text data is part of the recording information.

The information processing system 50 performs a charging process for a user according to a service that is used. For example, the charge is calculated based on an amount of the text data, a file size of the combined moving image, a processing time, or the like.

As described above, the combined moving image displays the panoramic image 203 of the surroundings including the user 107 and the speaker images 204 as well as the screen of the app such as the teleconference app 42 displayed during the teleconference. When a participant or non-participant of the teleconference views the combined moving image as the minutes, the teleconference is reproduced with the realism.

First Embodiment

Overview of Process of Displaying Operator Image in Association with Object

Figure 2:
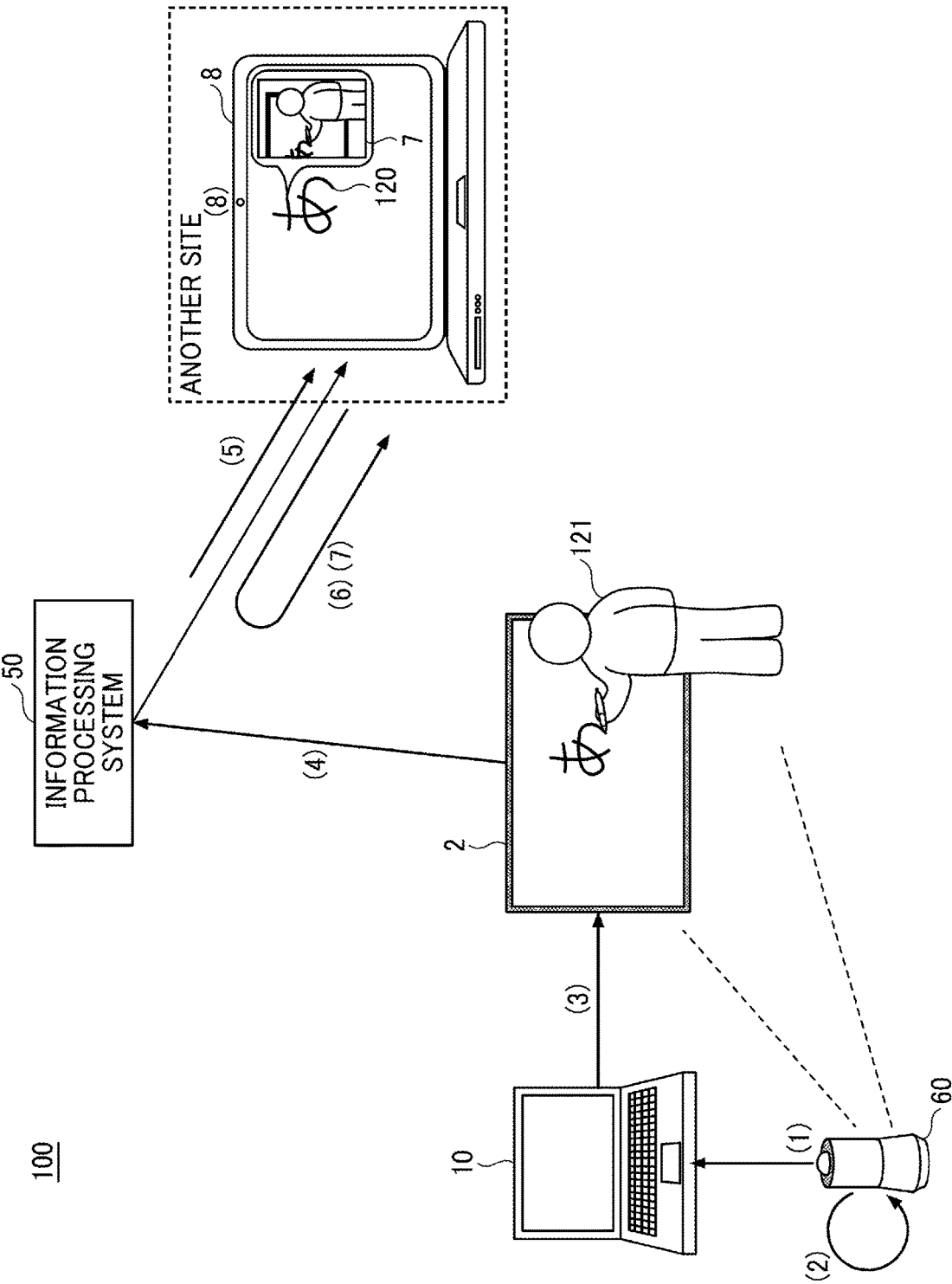
FIG. 2 is a diagram for describing an overview of a process in which an object displayed by an electronic whiteboard at one site is displayed by a terminal apparatus at another site along with an operator image in accordance with an embodiment of the present disclosure.

An overview of a process in which a terminal apparatus 8 at another site displays an operator image in association with an object will be described with reference to FIG. 2. FIG. 2 is a diagram for describing an overview of the process in which an object displayed by an electronic whiteboard 2 at one site is displayed by the terminal apparatus 8 (which is an example of a first terminal apparatus) at another site along with an operator image 7. In FIG. 2, at least the electronic whiteboard 2 and the terminal apparatus 8 at the other site are participating in the same conference, the terminal apparatus 8 at the other site shares the object displayed by the electronic whiteboard 2 with the electronic whiteboard 2.

(1) The meeting device 60 repeatedly captures an image of the surroundings and transmits a panoramic image and speaker images to the terminal apparatus 10 (which is an example of a second terminal apparatus). The panoramic image includes an operator 121.

(2) In response to an operation on the electronic whiteboard 2, the electronic whiteboard 2 transmits an operation start notification (a request to clip the operator image 7) to the meeting device 60 via the terminal apparatus 10. In response to receiving the operation start notification (the request to clip the operator image 7), the meeting device 60 clips a portion including the electronic whiteboard 2 from the panoramic image. The panoramic image may be captured in response to the operation start notification. Since the portion including the electronic whiteboard 2 is clipped at the timing when the operation is performed on the electronic whiteboard 2, the clipped image includes the operator 121. The clipped image is referred to as the operator image 7.

(3) The terminal apparatus 10 transmits the operator image 7 to the electronic whiteboard 2.

(4) The electronic whiteboard 2 transmits, for example, for each stroke, the operator image 7 and stroke data to the information processing system 50. If strokes are consecutively written (pen-up for a next stroke is detected before a certain period elapses since pen-down), the electronic whiteboard 2 may skip transmission of the operator image 7.

(5) The information processing system 50 assigns an object identifier (ID) to the stroke data and assigns identification information to the operator image 7 to associate the stroke data with the identification information of the operator image 7. The information processing system 50 transmits the stroke data and the identification information of the operator image 7 to the terminal apparatus 8 at the other site. In another example, the information processing system 50 may transmit the stroke data and the operator image 7 to the terminal apparatus 8 at the other site.

(6) The terminal apparatus 8 at the other site receives the stroke data and the identification information of the operator image 7, designates the identification information of the operator image 7 in a request for the operator image 7, and transmits the request to the information processing system 50.

(7) In response to the request, the information processing system 50 transmits the operator image 7 associated with the identification information of the operator image 7 to the terminal apparatus 8 at the other site.

(8) In response to receiving the operator image 7, the terminal apparatus 8 at the other site displays the operator image 7 in association with a stroke 120.

As illustrated in FIG. 2, the operator image 7 is displayed near the stroke 120 at the other site. This allows the user at the other site to easily grasp who is writing (wrote) the stroke 120. The information processing system 50 associates the operator image 7 with the object data. This make it clear that who has input the object and thus improves the content of the minutes.

Terminology in this Disclosure

The term "operator image" refers to an image including an operator who is operating the electronic whiteboard 2. The operator image may include the electronic whiteboard 2 along with the operator. Thus, the operator image may also be referred to as a "device image". The term "stroke" refers to a series of actions of the user pressing an input means onto a display (for example, pen-down), continuously moving the input means, and then releasing the input means from the display (for example, pen-up). The stroke includes tracing an action performed by the user without a touch on the display. In this case, the display device may start the stroke in response to a gesture of a user, a pressing of a button with a hand or foot of the user, or any other method performed by using a mouse or a pointing device, for example. The display device may end the stroke in response to the same or different gesture of the user, releasing of the button, or any other method performed using a mouse or a pointing device.

The term "stroke data" refers to information displayed on a display, based on a trajectory of coordinates input with an input means. The stroke data may be interpolated as appropriate. The term "handwritten data" refers to data including one or more pieces of stroke data. The term "handwriting input" refers to input of the handwritten data by a user. The handwriting input may be performed using a touch interface, a touch object such as a pen or a stylus, or the body of the user. The handwriting input may be performed through an input based on a gesture, an input based on a trace of a motion of a hand, any other touch-free input by a user, or an input of any other type. In the embodiments of the present disclosure, a handwriting input with a touch object and the handwriting input data obtained with a touch object are described but a handwriting input of other types may be used.

The term "object" refers to a graphic displayed based on the stroke data on a display. The object means a target. In the embodiments of the present disclosure, the object means a display target. Examples of the object to which stroke data is converted through handwriting recognition include text, a stamp displayed as a preset character or marking such as "DONE", a figure such as a circle or a star, and a straight line. The term "text" refers to a character string (character codes) including one or more characters, and includes numerals and symbols. The text may also be referred to as a character string.

The term "display device" refers to any device that displays information. In the embodiments of the present disclosure, the display device is described with the term "electronic whiteboard". The electronic whiteboard may also be referred to as an electronic information board or the like. A projector is an equivalent device of the electronic whiteboard. The display device may also be a digital signage, a television, a display, a teleconference terminal, or the like.

The term "application (app)" refers to software developed or used for a specific function or purpose. Types of such applications include a native app and a web app. A web app (a cloud app that provides a cloud service) may operate in cooperation with a native app or a web browser.

The expression "app being executed" refers to an app in a state from the start of the app to the end of the app. An app is not necessarily active (an app in the foreground) and may operate in the background.

The "recording information" refers to information that is recorded by the information recording app 41. The recording information is stored/saved to be viewed as information associated with identification information of one conference (meeting). The recording information includes, for example, information as follows:

moving image information created based on information such as screen information displayed by a selected app (such as a teleconference app) and image information of the surroundings of a device obtained by the device;

combined audio information obtained by the teleconference app (terminal apparatus) and the meeting device at a site during the conference (meeting);

text information converted from the obtained audio information; and other data and images that are related information related to the conference (meeting). The other data and images include, for example, a material file used during the conference, an added memo, translated data of the text data, images and stroke data created by a cloud electronic whiteboard service during the conference.

When the information recording app 41 records the screen of the teleconference app 42 and the conference at the site, the recording information may serve as the minutes of the held conference. The minutes are an example of the recording information. The way the recording information is called changes according to an activity performed in the teleconference or at the site, and the recording information may be called, for example, a communication record, a site circumstance record, or the like. The recording information includes, for example, files of a plurality of formats such as a moving image file (such as a combined moving image), an audio file, a text data file (text data obtained through speech recognition on audio), a document file, an image file, and a spreadsheet file. The files are mutually associated with identification information of the conference. Thus, when the files are viewed, the files are collectively or selectively viewable in time series.

The term "tenant" refers to a group of users (such as a company, a local government, or an organization that is part of such a company or local government) that has a contract to receive a service from a service provider. In the embodiments of the present disclosure, creation of the recording information and conversion into text data are performed since the tenant has a contract with the service provider.

The term "telecommunication" refers to audio-and-video-based communication using software and terminal apparatuses with a counterpart at a physically remote site. A teleconference is an example of telecommunication. A conference may also be referred to as an assembly, a meeting, an arrangement, a consultation, an application for a contract or the like, a gathering, a meet, a meet-up, a seminar, a workshop, a study meeting, a study session, a training session, or the like.

The term "site" refers to a place where various activities are performed using various apparatuses connected to a network. A conference room is an example of the site. The conference room is a room installed for use in a conference. The term "site" may also refer to various places such as a home, a reception, a store, a warehouse, and an outdoor site, and may refer to any place or space where a terminal apparatus, a device, or the like is installable.

The term "sound" refers to an utterance made by a person, a surrounding sound, or the like. The term "audio data" refers to data to which the sound is converted. However, in the embodiments of the present disclosure, the sound and the audio data will be described without being strictly distinguished from each other. The term "another (other) state" refers to a place, a building, or a conference room that is different from one site and is away from the one site.

Example of System Configuration

Figure 3:
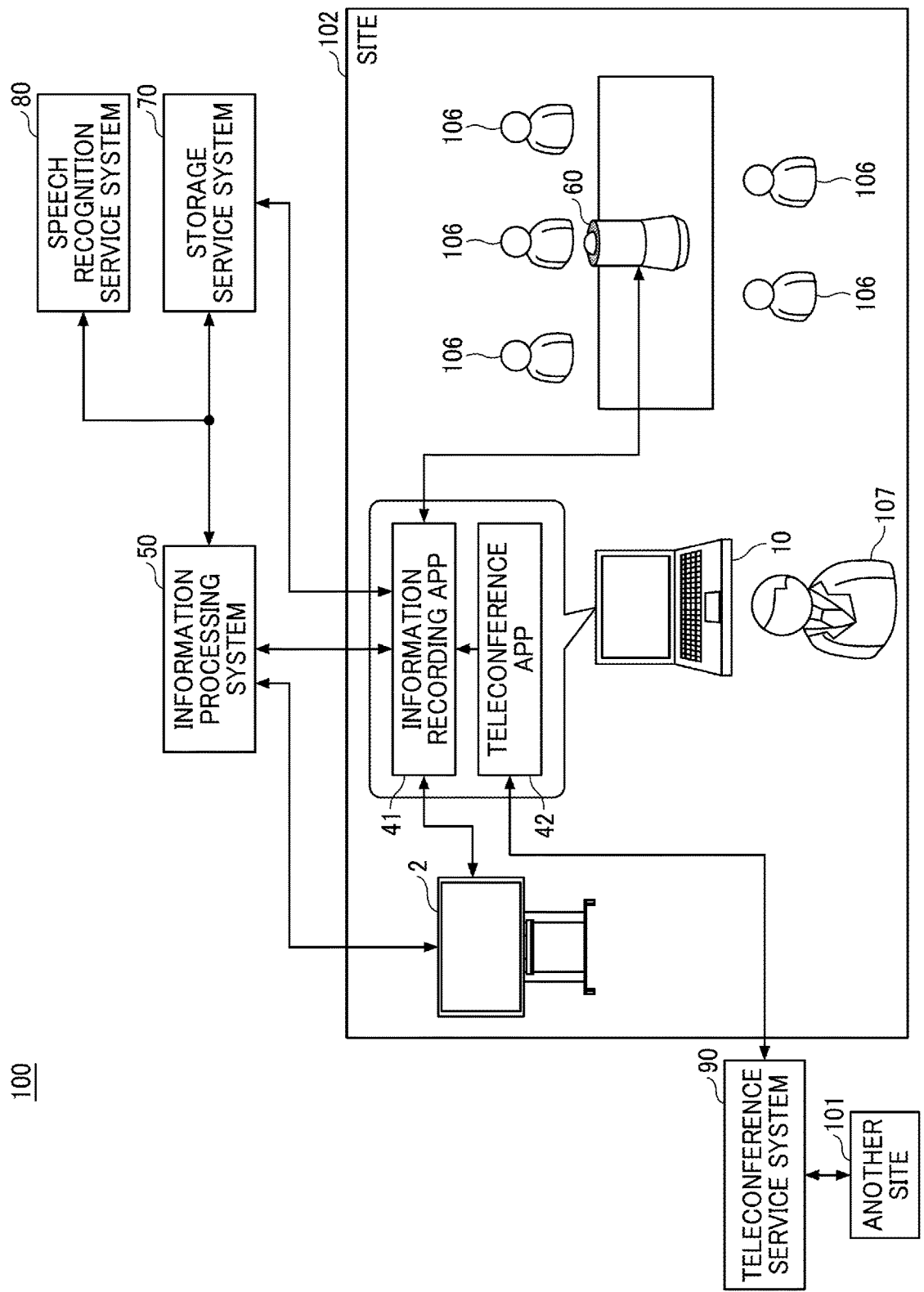
FIG. 3 is a diagram illustrating an example of a configuration of a recording information creation system according to the embodiment of the present disclosure.

The system configuration of the recording information creation system 100 will be described with reference to FIG. 3. FIG. 3 illustrates an example of the configuration of the recording information creation system 100. FIG. 3 illustrates one site (the one site 102) among a plurality of sites between which a teleconference is held. The terminal apparatus 10 at the one site 102 communicates with the information processing system 50, the storage service system 70, and the teleconference service system 90 via a network. The meeting device 60 and the electronic whiteboard 2 are disposed at the one site 102. The terminal apparatus 10 is communicably connected to the meeting device 60 via a Universal Serial Bus (USB) cable or the like. The terminal apparatus 10 may communicate with the meeting device 60 via a local area network (LAN).

At least the information recording app 41 and the teleconference app 42 operate on the terminal apparatus 10. The teleconference app 42 can communicate with the terminal apparatus 10 at the other site 101 via the teleconference service system 90 over the network to allow users at the sites to have a conference from the remote places. The information recording app 41 uses functions of the information processing system 50 and the meeting device 60 to create recording information in the teleconference held by the teleconference app 42.

In the present embodiment, an example of creating recording information during a teleconference will be described. However, the conference is not necessarily a conference that involves communication to a remote site. That is, the conference may be a conference in which participants at one site participate. In this case, sound collected by the meeting device 60 is stored without being combined. The rest of the process performed by the information recording app 41 is the same.

The terminal apparatus 10 includes a camera having an ordinary angle of view built therein (or may include a camera externally attached thereto). The camera captures an image of a front space including the user 107 who operates the terminal apparatus 10. With the ordinary angle of view, a non-panoramic image is obtained. In the present embodiment, a flat image that is not a curved-surface image such as a spherical image is obtained. The terminal apparatus 10 includes a microphone built therein (or may include a microphone externally attached thereto). The microphone collects sound around the user 107 or the like who operates the terminal apparatus 10. Thus, the user 107 can have a common teleconference using the teleconference app 42 without being conscious of the information recording app 41. The information recording app 41 and the meeting device 60 do not affect the teleconference app 42 except for an increase in the processing load of the terminal apparatus 10.

The information recording app 41 is an app that communicates with the meeting device 60, and creates and records recording information. The meeting device 60 is a device used during a meeting, and includes an image-capturing device (such as a camera) that captures a panoramic image, a microphone, and a loudspeaker. The camera included in the terminal apparatus 10 can capture an image of a limited range of the front space. In contrast, the meeting device 60 can capture an image of the entire space around the meeting device 60 (the space subjected to image-capturing is not necessarily the entire space). The meeting device 60 can keep a plurality of participants 106 illustrated in FIG. 3 within the angle of view at all times.

The meeting device 60 also clips a speaker image from a panoramic image and combines audio data obtained by the meeting device 60 and audio data output by the terminal apparatus 10 (including audio data received by the teleconference app 42) together. The place where the meeting device 60 is installed is not limited to on a desk or a table, and the meeting device 60 may be disposed at any place at the one site 102. Since the meeting device 60 can capture a spherical image, for example, with a spherical camera, the meeting device 60 may be disposed on a ceiling, for example. The meeting device 60 may be installed at another site or at any site.

The information recording app 41 displays a list of apps being executed on the terminal apparatus 10, combines images for the above-described recording information (creates the combined moving image), plays the combined moving image, receives editing, and the like. The information recording app 41 also displays a list of teleconferences that have been held or are to be held. The list of teleconferences is used in information related to recording information to allow the user to link a teleconference with the recording information.

The teleconference app 42 is an application that establishes a connection to and communicates with another terminal apparatus at the other site 101, transmits and receives an image and sound, displays the image and outputs the sound to allow the terminal apparatus 10 to perform telecommunication with the other terminal apparatus. The teleconference app 42 may be referred to as a telecommunication app, a remote information sharing application, or the like.

The information recording app 41 and the teleconference app 42 each may be a web app or a native app. A web app is an app in which a program on a web server and a program on a web browser or a native app cooperate with each other to perform processing, and is not to be installed on the terminal apparatus 10. A native app is an app that is installed and used on the terminal apparatus 10. In the present embodiment, both the information recording app 41 and the teleconference app 42 are described as native apps.

The terminal apparatus 10 may be, for example, a general-purpose information processing apparatus having a communication function, such as a personal computer (PC), a smartphone, or a tablet terminal. The terminal apparatus 10 may also be the electronic whiteboard 2, a game machine, a personal digital assistant (PDA), a wearable PC, a car navigation system, an industrial machine, a medical device, a smart home appliance, or the like. The terminal apparatus 10 may be any apparatus on which at least the information recording app 41 and the teleconference app 42 operate. The terminal apparatus 10 may be any apparatus on which the information recording app 41 and the teleconference app 42 operate.

The electronic whiteboard 2 displays, on a display, data handwritten on a touch panel with an input means such as a pen or a finger. The electronic whiteboard 2 can communicate with the terminal apparatus 10 or the like in a wired or wireless manner, and capture a screen displayed by the terminal apparatus 10 and display the screen on the display. The electronic whiteboard 2 can convert handwritten data into text data, and share information displayed on the display with the electronic whiteboard 2 at another site. The electronic whiteboard 2 may be a whiteboard, not including a touch panel, onto which a projector projects an image. The electronic whiteboard 2 may be a tablet terminal, a notebook PC, a PDA, a game machine, or the like including a touch panel.

The electronic whiteboard 2 can communicate with the information processing system 50. For example, after being powered on, the electronic whiteboard 2 performs polling on the information processing system 50 to receive information from the information processing system 50. The electronic whiteboard 2 and the meeting device 60 that captures an image of the electronic whiteboard 2 operate as a display system.

The information processing system 50 includes one or more information processing apparatuses deployed over a network. The information processing system 50 may also be referred to as an information processing server. The information processing system 50 includes one or more server apps that perform processing in cooperation with the information recording app 41, and an infrastructure service. The server apps manage a list of teleconferences, recording information recorded during a teleconference, various settings and storage paths, and the like.

The infrastructure service performs user authentication, makes a contract, performs charging processing, and the like. The meeting device 60, the electronic whiteboard 2, and the information processing system 50 function as a device management system.

All or some of the functions of the information processing system 50 may exist in a cloud environment or in an on-premise environment. The information processing system 50 may include a plurality of server apparatuses or may include a single information processing apparatus. For example, the server apps and the infrastructure service may be provided by separate information processing apparatuses, and information processing apparatuses may exist for respective functions of the server apps. The information processing system 50 may be integrated with the storage service system 70 and the speech recognition service system 80 described below.

The storage service system 70 operates as a storage on a network, and provides a storage service for accepting storage of files and the like. Examples of the storage service system 70 include OneDrive®, Google Workspace®, and Dropbox®. The storage service system 70 may be on-premise network-attached storage (NAS) or the like.

The speech recognition service system 80 provides a service of performing speech recognition on audio data and converting the audio data into text data. The speech recognition service system 80 may be a general-purpose commercial service or part of the functions of the information processing system 50. As the speech recognition service system 80, different service systems may be set and used for different users or tenants or different conferences.

Example of Hardware Configuration

A hardware configuration of the information processing system 50 and the terminal apparatus 10 according to the present embodiment will be described with reference to FIG. 4.

Information Processing System and Terminal Apparatus

Figure 4:
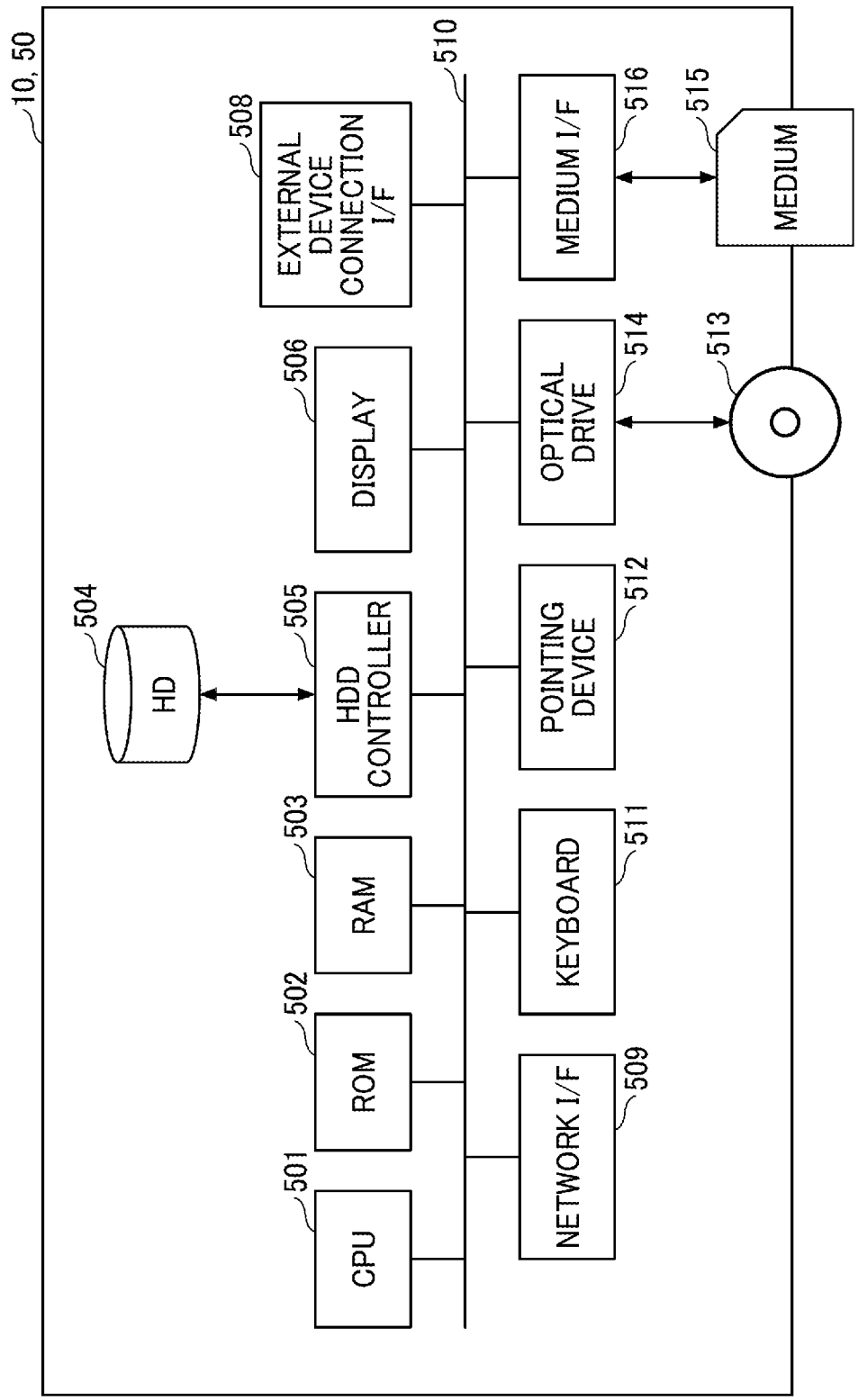
FIG. 4 is a diagram illustrating an example of a hardware configuration of an information processing system and a terminal apparatus according to the embodiment of the present disclosure.

FIG. 4 is a diagram illustrating an example of a hardware configuration of the information processing system 50 and the terminal apparatus 10 according to the present embodiment. As illustrated in FIG. 4, the information processing system 50 and the terminal apparatus 10 each are implemented by a computer and each include a central processing unit (CPU) 501, a read-only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, an optical drive 514, and a medium I/F 516.

The CPU 501 controls operations of the entire information processing system 50 and the entire terminal apparatus 10. The ROM 502 stores programs such as an initial program loader (IPL) to boot the CPU 501. The RAM 503 is used as a work area for the CPU 501. The HD 504 stores various kinds of data such as a program. The HDD controller 505 controls reading or writing of various kinds of data from or to the HD 504 under control of the CPU 501. The display 506 displays various kinds of information such as a cursor, a menu, a window, characters, or an image. The external device connection I/F 508 is an interface for connecting various external devices. Examples of the external devices in this case include, but are not limited to, a USB memory and a printer. The network I/F 509 is an interface for performing data communication via a network. The bus line 510 is, for example, an address bus or a data bus for electrically connecting the components such as the CPU 501 illustrated in FIG. 4 to one another.

The keyboard 511 is an example of an input device including a plurality of keys used for inputting characters, numerical values, various instructions, or the like. The pointing device 512 is an example of an input device used for selecting or executing various instructions, selecting a target for processing, or moving a cursor. The optical drive 514 controls reading or writing of various kinds data from or to an optical recording medium 513 that is an example of a removable recording medium. The optical recording medium 513 may be a compact disc (CD), a digital versatile disc (DVD), a Blu-ray® disc, or the like. The medium I/F 516 controls reading or writing (storing) of data from or to a recording medium 515 such as a flash memory.

Meeting Device

A hardware configuration of the meeting device 60 will be described with reference to FIG. 5. FIG. 5 is an example of a hardware configuration diagram of the meeting device 60 that captures a 360-degree moving image. In the description below, the meeting device 60 captures a moving image of a 360-degree space around the meeting device 60 at a predetermined height, with imaging elements, the number of which may be one or two or more. The meeting device 60 is not necessarily a dedicated device, and may be a PC, a digital camera, a smartphone, or the like to which an image-capturer for a 360-degree moving image is externally attached so that the PC, the digital camera, the smartphone, or the like has substantially the same functions as the meeting device 60.

As illustrated in FIG. 5, the meeting device 60 includes an image-capturer 601, an image processor 604, an image-capturing controller 605, a microphone 608, an audio processor 609, a CPU 611, a ROM 612, a static random access memory (SRAM) 613, a dynamic random access memory (DRAM) 614, an operation device 615, an external device connection I/F 616, a communication device 617, an antenna 617a, and a sound sensor 618. The image-capturer 601 includes wide-angle lenses (so-called fish-eye lenses) 602a and 602b having an angle of view of 360 degrees to form a hemispherical image, and imaging elements (image sensors) 603a and 603b provided for the wide-angle lens 602a and 602b, respectively. Each of the imaging elements 603a and 603b includes an image sensor such as a complementary metal oxide semiconductor (CMOS) sensor or a charge coupled device (CCD) sensor, a timing generation circuit, and a group of registers. The image sensor converts an optical image formed by the corresponding fisheye lens 602a or 602b into an electric signal to output image data. The timing generation circuit generates horizontal or vertical synchronization signals, pixel clocks, and the like for this image sensor. Various commands, parameters, and the like for operations of the corresponding imaging element are set in the group of registers. The image-capturer 601 may be a 360-degree camera (may be called a spherical camera) and is an example of an image-capturing device that captures an image of a 360-degree space around the meeting device 60.

Each of the imaging elements 603a and 603b (image sensors) of the image-capturer 601 is connected to the image processor 604 via a parallel I/F bus. On the other hand, each of the imaging elements 603a and 603b of the image-capturer 601 is connected to the image-capturing controller 605 via a serial I/F bus (such as an I2C bus). Each of the image processor 604, the image-capturing controller 605, and the audio processor 609 is connected to the CPU 611 via a bus 610. The ROM 612, the SRAM 613, the DRAM 614, the operation device 615, the external device connection I/F 616, the communication device 617, the sound sensor 618, and the like are also connected to the bus 610.

The image processor 604, which may be implemented by circuitry, obtains image data (such as fisheye image) output from each of the imaging elements 603a and 603b through the parallel I/F bus and performs predetermined processing on the image data to create data of a panoramic image and data of a speaker image from the fisheye video. The image processor 604 combines the panoramic image and the speaker image or the like together to output a combined moving image.

The image-capturing controller 605, which may be implemented by circuitry, usually serves as a master device, whereas the imaging elements 603a and 603b usually serve as a slave device. The image-capturing controller 605 sets commands in the groups of registers of the respective imaging elements 603a and 603b through the I2C bus. The image-capturing controller 605 receives the commands from the CPU 611. The image-capturing controller 605 obtains status data in the groups of registers of the respective imaging elements 603a and 603b through the I2C bus. The image-capturing controller 605 then sends the obtained status data to the CPU 611.

The image-capturing controller 605 instructs the imaging elements 603a and 603b to output image data at a time when an image-capturing start button of the operation device 615 is pressed or a time when the image-capturing controller 605 receives an image-capturing start instruction from the CPU 611. The meeting device 60 sometimes has functions corresponding to a preview display function and a moving image display function implemented by a display (for example, a display of a PC or a smartphone). In this case, the image data is continuously output from the imaging elements 603a and 603b at a predetermined frame rate (frames/minute).

As described later, the image-capturing controller 605 operates in cooperation with the CPU 611 to function as a synchronization controller that makes output timings of the pieces of image data from the respective imaging elements 603a and 603b synchronous. In the present embodiment, the meeting device 60 does not include a display. However, in some embodiments, the meeting device 60 may include a display.

The microphone 608 converts sound into audio (signal) data. The audio processor 609, which may be implemented by circuitry, obtains the audio data output from the microphone 608 through an I/F bus and performs predetermined processing on the audio data. The CPU 611 controls operations of the entire meeting device 60 and performs desirable processing. The ROM 612 stores various programs to be executed by the CPU 611. Each of the SRAM 613 and the DRAM 614 is a work memory, and stores programs being executed by the CPU 611 or data being processed. In particular, in one example, the DRAM 614 stores image data being processed by the image processor 604 and processed data of an equirectangular projection image.

The operation device 615 collectively refers to various operation buttons such as an image-capturing start button. The user operates the operation device 615 to start image-capturing or recording, power on or off the meeting device 60, establish a connection, perform communication, and input settings such as various image-capturing modes and image-capturing conditions.

The external device connection I/F 616 is an interface for connecting various external devices. Examples of the external devices in this case include, but not limited to, a PC, a display, a projector, and an electronic whiteboard. Examples of the external device connection I/F 616 may include a USB terminal and a High-Definition Multimedia Interface (HDMI®) terminal. For example, the USB terminal may be a socket terminal for Micro-USB. The moving image data or image data stored in the DRAM 614 is transmitted to an external terminal or recorded in an external medium via the external device connection I/F 616. A plurality of external device connection I/Fs 616 may be used to, for example, while transmitting the image information obtained through image-capturing by the meeting device 60 to a PC via a USB to record the image information in the PC, acquire a video (for example, screen information to be displayed by the teleconference app) from the PC to the meeting device 60 and transmit the video from the meeting device 60 to another external device (such as a display, a projector, or an electronic whiteboard) via HDMI® and display the video.

The communication device 617, which may be implemented by a network I/F, may communicate with a cloud server via the Internet by using a wireless communication technology such as Wi-Fi via the antenna 617a provided in the meeting device 60, and transmit the stored moving image data or image data to the cloud server. The communication device 617 may communicate with a device located nearby by using a short-range wireless communication technology such as Bluetooth Low Energy (BLE®) or Near Field Communication (NFC).

The sound sensor 618 is a sensor that acquires 360-degree audio information in order to specify the direction from which a loud sound is input within a 360-degree space around the meeting device 60 (on a horizontal plane). The audio processor 609 determines the direction in which the volume of the sound is highest, based on the input 360-degree audio parameter, and outputs the direction from which the sound is input within the 360-degree space.

In this disclosure, another sensor (such as an azimuth/acceleration sensor or a Global Positioning System (GPS)) may calculate an azimuth, a position, an angle, an acceleration, or the like and use the calculated azimuth, position, angle, acceleration, or the like in image correction or position information addition.

The image processor 604 also performs processing described below.

The CPU 611 creates a panoramic image according to a method below. The CPU 611 performs predetermined camera image processing such as Bayer conversion (RGB interpolation processing) on raw data input from the image sensors that input a spherical video, and creates a fisheye image (a video including curved-surface images). The CPU 611 performs flattening processing such as dewarping processing (distortion correction processing) on the created fisheye video (curved-surface video) to create a panoramic image (video including flat-surface images) of a 360-degree space around the meeting device 60.

The CPU 611 creates a speaker image according to a method below. The CPU 611 clips a portion including a speaker from the panoramic image (video including flat-surface images) of the 360-degree surrounding space to create a speaker image. The CPU 611 determines, as the direction of the speaker, the sound input direction identified from the 360-degree space output by using the sound sensor 618 and the audio processor 609, and clips the speaker image from the panoramic image.

At this time, in the method of clipping an image of a person based on the sound input direction, the CPU 611 clips a 30-degree portion around the sound input direction identified from the 360-degree space, and performs face detection on the 30-degree portion to clip the speaker image. The CPU 611 further specifies speaker images of a specific number of persons (three persons, for example) who have made an utterance most recently among the clipped speaker images.

The panoramic image and the one or more speaker images may be individually transmitted to the information recording app 41. Alternatively, the meeting device 60 may create one image from the panoramic image and the one or more speaker images and transmit the one image to the information recording app 41. In the present embodiment, the panoramic image and the one or more speaker images are individually transmitted from the meeting device 60 to the information recording app 41.

FIGS. 6A and 6B are diagrams for describing an image-capturing range of the meeting device 60. As illustrated in FIG. 6A, the meeting device 60 captures an image of a 360-degree range in the horizontal direction, around the meeting device 60. As illustrated in FIG. 6B, the meeting device 60 has an image-capturing range that extends upward and downward by predetermined angles with respect to the direction horizontal to the height of the meeting device 60 which is defined as 0 degree. For example, the meeting device 60 captures an image of upper and lower ranges of predetermined angles from 0 degree, horizontal to the meeting device. The predetermined angles include an upper-range angle "a" of 60 degrees, and a lower-range angle "b" of 30 degrees, for example.

FIG. 7 is a diagram for describing a panoramic image and clipping of speaker images. As illustrated in FIG. 7, an image captured by the meeting device 60 forms a portion 110 of a sphere, and thus has a three-dimensional shape. As illustrated in FIG. 6B, the meeting device 60 sections the angle of view into predetermined angles of the upward and downward ranges and predetermined angles of the leftward and rightward ranges, and performs perspective projection transformation on the resulting sections. The meeting device 60 thoroughly performs perspective projection transformation on the entire 360-degree range in the horizontal direction to obtain a predetermined number of flat images. The meeting device 60 laterally links the predetermined number of flat images together to obtain a panoramic image 111. The meeting device 60 performs face detection on a predetermined range around the sound direction in the panoramic image 111, and clips 15-degree leftward and rightward ranges from the center of the face (i.e., a 30-degree range in total) to create a speaker image 112.

Electronic Whiteboard

Figure 8:
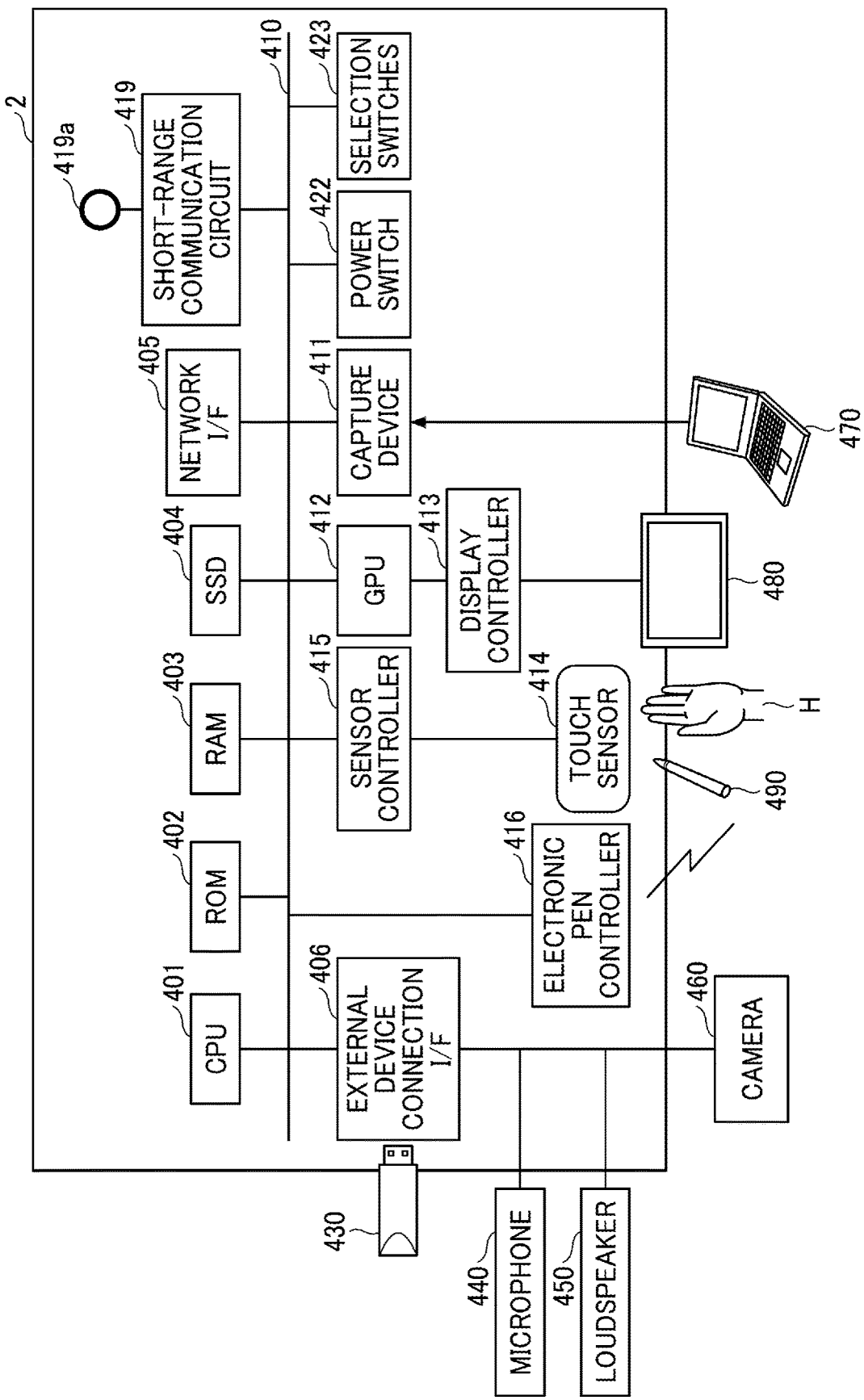
FIG. 8 is a diagram illustrating an example of a hardware configuration of the electronic whiteboard according to the embodiment of the present disclosure.

FIG. 8 is a diagram illustrating an example of a hardware configuration of the electronic whiteboard 2. As illustrated in FIG. 8, the electronic whiteboard 2 includes a CPU 401, a ROM 402, a RAM 403, a solid state drive (SSD) 404, a network I/F 405, and an external device connection I/F 406.

The CPU 401 controls operations of the entire electronic whiteboard 2. The ROM 402 stores programs such as an IPL to boot the CPU 401. The RAM 403 is used as a work area for the CPU 401.

The SSD 404 stores various kinds of data such as a program for the electronic whiteboard 2. The network I/F 405 controls communication with other devices via a communication network. The external device connection I/F 406 is an interface for connecting various external devices. Examples of the external devices in this case include, but not limited to, a USB memory 430 and externally-connected devices such as a microphone 440, a loudspeaker 450, and a camera 460.

The electronic whiteboard 2 further includes a capture device 411, a graphics processing unit (GPU) 412, a display controller 413, a touch sensor 414, a sensor controller 415, an electronic pen controller 416, a short-range communication circuit 419, an antenna 419a of the short-range communication circuit 419, a power switch 422, and selection switches 423.

The capture device 411 causes a display of an external-connected PC 470 to display video (image) information as a still image or a moving image. The GPU 412 is a semiconductor chip that exclusively handles graphics. The display controller 413 controls and manages displaying of a screen to display an image output from the GPU 412 on a display 480. The touch sensor 414 detects a touch of an electronic pen 490, a user's hand H, or the like onto the display 480. The sensor controller 415 controls processing of the touch sensor 414. The touch sensor 414 receives a touch input and detects coordinates of the touch input according to the infrared blocking system. A method of receiving a touch input and detecting the coordinates of the touch input will be described. The display 480 is provided with two light emitting/receiving devices disposed on respective upper side ends of the display 480 and with a reflector member surrounding the display 480. The light emitting/receiving devices emit a plurality of infrared rays in parallel to a surface of the display 480. The plurality of infrared rays are reflected by the reflector member. The two light emitting/receiving devices receive light returning along the same optical path as the optical path of the emitted light.

The touch sensor 414 outputs identifiers (IDs) of infrared rays that are emitted from the two light emitting/receiving devices and are blocked by an object, to the sensor controller 415. Based on the IDs of the infrared rays, the sensor controller 415 identifies coordinates of a position touched by the object. The electronic pen controller 416 communicates with the electronic pen 490 to detect a touch of the tip or bottom of the electronic pen 490 onto the display 480.

The short-range communication circuit 419 is a communication circuit that is compliant with NFC, Bluetooth®, or the like. The power switch 422 is used for powering on and off the electronic whiteboard 2. The selection switches 423 are a group of switches used for adjusting brightness, hue, etc. of images displayed on the display 480, for example.

The electronic whiteboard 2 further includes a bus line 410. The bus line 410 is, for example, an address bus or a data bus for electrically connecting the components such as the CPU 401 illustrated in FIG. 8 to one another.

Note that the touch sensor 414 is not limited to a touch sensor of the infrared blocking system, and may be a capacitive touch panel that detects a change in capacitance to identify the touched position. The touch sensor 414 may be a resistive-film touch panel that specifies the touched position based on a change in voltage across two opposing resistive films. The touch sensor 414 may be an electromagnetic inductive touch panel that detects electromagnetic induction generated by a touch of an object onto a display to specify the touched position. The touch sensor 414 may use any other various detection methods. The electronic pen controller 416 may determine whether there is a touch of another part of the electronic pen 490 such as a part of the electronic pen 490 held by the user as well as the tip and the bottom of the electronic pen 490.

Functions

Figure 9:
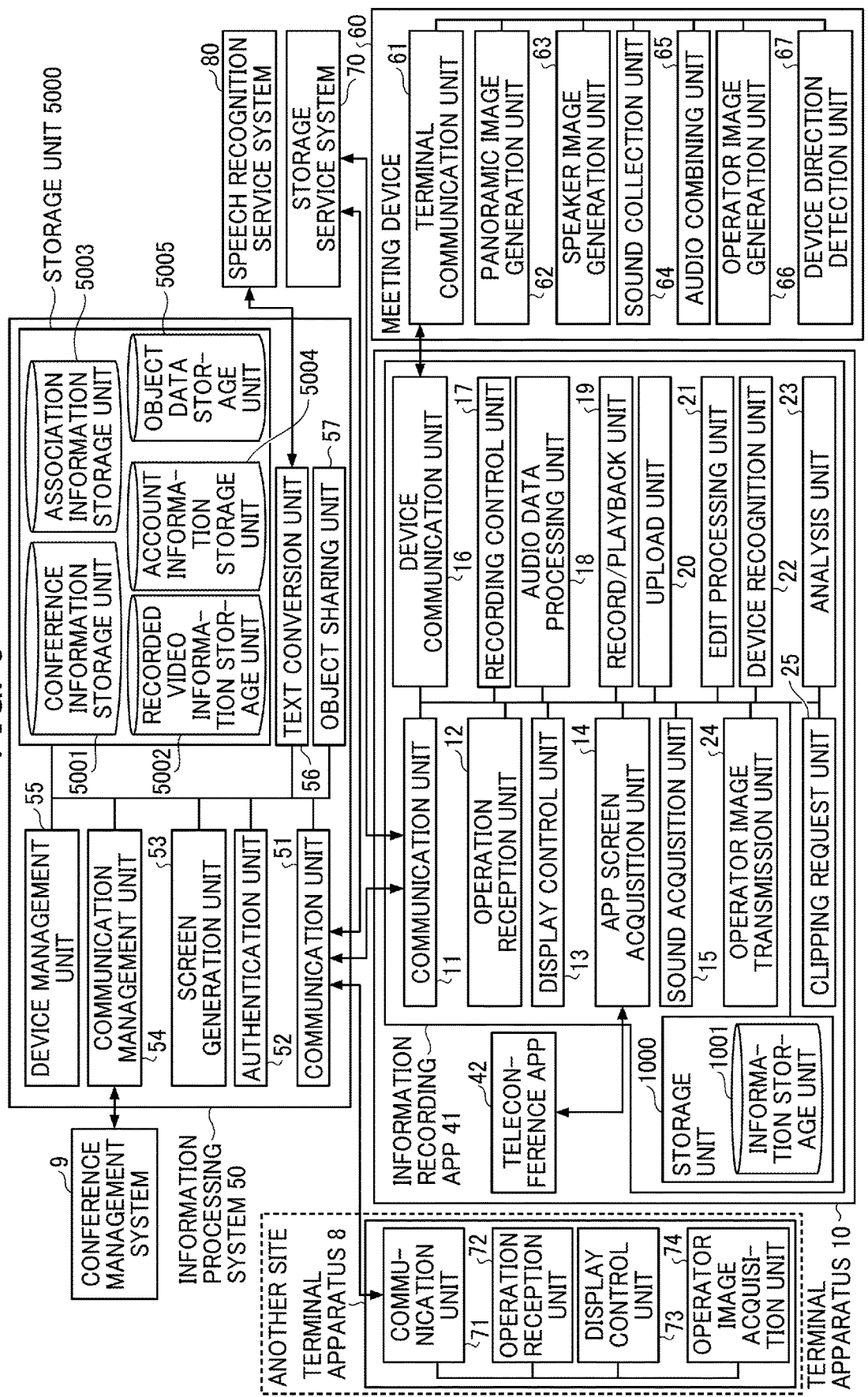
FIG. 9 is an example of a functional block diagram for describing, as individual blocks, functions of the terminal apparatus, the meeting device, and the information processing system of the recording information creation system according to the embodiment of the present disclosure.

A functional configuration of the recording information creation system 100 will be described with reference to FIG. 9. FIG. 9 is an example of a functional block diagram for describing, as individual blocks, functions of the terminal apparatus 10, the meeting device 60, and the information processing system 50 of the recording information creation system 100.

Terminal Apparatus at One Site

The information recording app 41 operating on the terminal apparatus 10 provides a plurality of functional units including a communication unit 11, an operation reception unit 12, a display control unit 13, an app screen acquisition unit 14, a sound acquisition unit 15, a device communication unit 16, a recording control unit 17, an audio data processing unit 18, a record/playback unit 19, an upload unit 20, an edit processing unit 21, a device recognition unit 22, an analysis unit 23, an operator image transmission unit 24, and a clipping request unit 25.

These units of the terminal apparatus 10 are functions that are implemented by or means that are caused to function by any of the components illustrated in FIG. 4 operating in accordance with instructions of the CPU 501 based on the information recording app 41 loaded to the RAM 503 from the HD 504. The terminal apparatus 10 also includes a storage unit 1000 implemented by the HD 504 or any desired memory illustrated in FIG. 4. The storage unit 1000 includes an information storage unit 1001.

The communication unit 11 communicates various kinds of information with the information processing system 50 via a network.

For example, the communication unit 11 receives a list of teleconferences from the information processing system 50, and transmits an audio data recognition request to the information processing system 50. The communication unit 11 receives an operation start notification and an operation end notification from the electronic whiteboard 2.

The display control unit 13 displays various screens serving as a user interface in the information recording app 41, in accordance with screen transitions set in the information recording app 41. The operation reception unit 12 receives various operations performed on the information recording app 41.

The app screen acquisition unit 14 acquires screen information to be displayed by an app selected by a user, screen information of a desktop screen, or the like from an operating system (OS), for example. When the app selected by the user is the teleconference app 42, the app screen acquisition unit 14 acquires a screen generated by the teleconference app 42 (an image including a captured image of a user of the terminal apparatus 10 captured by a camera of the terminal apparatus 10 at each site, a display image of a shared material, and participant icons, participant names, etc.). The screen information (app screen) displayed by the app is information that is displayed in the form of a window by the app being executed and is acquired as an image by the information recording app 41. The window of the application is displayed on a monitor or the like such that the area of the window is rendered as an area in the entire desktop image. The screen information displayed by the app is acquirable by another app (such as the information recording app 41) as an image file or a moving image file including a plurality of consecutive images via an application programming interface (API) of the OS, an API of the app that displays the screen information, or the like. The screen information of the desktop screen is information including an image of the desktop screen generated by the OS, and is similarly acquirable as an image file or a moving image file via an API of the OS. The format of these image files may be bitmap, PNG, or any other format. The format of the moving image file may be MP4 or any other format.

The sound acquisition unit 15 acquires sound (including audio data received from the teleconference app 42 during the teleconference) output from a microphone or an earphone of the terminal apparatus 10. Even when the output sound is muted, the sound acquisition unit 15 can acquire the sound. A user operation such as selection of the teleconference app 42 is not to be performed for audio data, and the sound acquisition unit 15 can acquire sound to be output by the terminal apparatus 10 via an API of the OS or an API of the app. Thus, the audio data received by the teleconference app 42 from the other site 101 is also acquired. When the teleconference app 42 is not being executed or a teleconference is not being held, the information recording app 41 may fail to acquire the audio data. In this example, the sound acquired by the sound acquisition unit 15 may be the audio data to be output, excluding the sound collected by the terminal apparatus 10. This is because the meeting device 60 separately collects the sound at the site.

The device communication unit 16 communicates with the meeting device 60 via a USB cable, for example. The device communication unit 16 may communicate with the meeting device 60 via a wireless LAN, Bluetooth®, or the like. The device communication unit 16 receives the panoramic image and the speaker image from the meeting device 60, and transmits the audio data acquired by the sound acquisition unit 15 to the meeting device 60. The device communication unit 16 receives the combined audio data obtained by the meeting device 60.

The recording control unit 17 combines the panoramic image and the speaker image received by the device communication unit 16 and the screen of the app acquired by the app screen acquisition unit 14 together to create a combined image. The recording control unit 17 links the repeatedly created combined images in time series to create a combined moving image, and attaches the combined audio data to the combined moving image to create a combined moving image with sound. Note that the meeting device 60 may combine the panoramic image and the speaker image. A panoramic moving image including the panoramic images, a speaker moving image including the speaker images, an app screen moving image including the app screen, and a combined moving image including the panoramic images and the speaker images may be stored in the storage service system 70 as individual moving image files. In this case, the panoramic moving image, the speaker moving image, the app screen moving image, or the combined moving image of the panoramic images and the speaker images may be called and displayed on one display screen when being viewed.

The audio data processing unit 18 extracts audio data combined with the combined moving image, or requests the information processing system 50 to convert the combined audio data received from the meeting device 60 into text data.

The record/playback unit 19 plays the combined moving image. The combined moving image is stored in the terminal apparatus 10 during recording, and then uploaded to the information processing system 50.

After the teleconference ends, the upload unit 20 transmits the combined moving image to the information processing system 50.

The edit processing unit 21 edits (partially deletes, links, or the like) the combined moving image in accordance with a user operation.

The device recognition unit 22 learns the shape (circumscribed rectangle) of the electronic whiteboard 2 through machine learning in advance to detect the electronic whiteboard 2 from the panoramic image. The device recognition unit 22 may simply recognize the electronic whiteboard 2 through pattern matching without using machine learning. The meeting device 60 may perform the processing performed by the device recognition unit 22.

The analysis unit 23 detects a two-dimensional code included in a panoramic image and analyzes the two-dimensional code to acquire information such as device identification information of the electronic whiteboard 2 included in the two-dimensional code. Note that the meeting device 60 may perform the processing performed by the analysis unit 23.

The operator image transmission unit 24 transmits, to the information processing system 50, the operator image 7 transmitted from the meeting device 60. The information processing system 50 transmits the operator image 7 to the terminal apparatus 8, at another site, participating in the same conference. The meeting device 60 may perform the processing performed by the operator image transmission unit 24.

In response to receipt of an operation start notification from the electronic whiteboard 2, the clipping request unit 25 transmits a clipping request for the operator image 7 to the meeting device 60. In response to receipt of an operation end notification from the electronic whiteboard 2, the clipping request unit 25 transmits a clipping end request for the operator image 7 to the meeting device 60.

FIG. 10 illustrates moving image recording information stored in the information storage unit 1001. The moving image recording information includes items such as "conference ID", "recorded video ID", "update date and time", "title", "uploaded", and "storage destination". In response to a user logging into the information processing system 50, the information recording app 41 downloads conference information from a conference information storage unit 5001 of the information processing system 50. The conference ID or the like included in the conference information is reflected in the moving image recording information. The moving image recording information in FIG. 10 is held by the terminal apparatus 10 operated by a certain user.

The item "conference ID" is identification information for identifying a held teleconference. The conference ID is assigned when a schedule of the teleconference is registered to a conference management system 9, or is assigned by the information processing system 50 in response to a request from the information recording app 41. The conference management system 9 is a system to which a schedule of a conference and a teleconference, a Uniform Resource Locator (URL) (conference link) for starting the teleconference, reservation information of a device to be used in the conference, and the like are registered, and may be implemented by a scheduler accessible from the terminal apparatus 10 via a network. The conference management system 9 can transmit the registered schedule or the like to the information processing system 50.

The item "recorded video ID" is identification information for identifying a combined moving image recorded during the teleconference.

The recorded video ID is assigned by the meeting device 60, but may be assigned by the information recording app 41 or the information processing system 50. Different recorded video IDs are assigned for the same conference ID when the recording is ended in the middle of the teleconference but is started again for some reason.

The item "update date and time" is a date and time when the combined moving image is updated (recording is ended). When the combined moving image is edited, the update date and time is the date and time of editing.

The item "title" is a name of the conference. The title may be set when the conference is registered to the conference management system 9, or may be set by the user in any manner.

The item "uploaded" indicates whether the combined moving image has been uploaded to the information processing system 50.

The item "storage destination" indicates a location (URL or file path) where the combined moving image and the text data are stored in the storage service system 70. The item "storage destination" allows the user to view the uploaded combined moving image as desired. Note that the combined moving image and the text data are stored with different file names following the URL, for example.

Terminal Apparatus at Another Site

The terminal apparatus 8 at the other site will be described in terms of functions of sharing an object displayed by the electronic whiteboard 2 will be described. In addition to the illustrated functions, the terminal apparatus 8 at the other site may have functions identical to the functions of the terminal apparatus 10 at the one site. The terminal apparatus 8 at the other site includes a communication unit 71, an operation reception unit 72, a display control unit 73, and an operator image acquisition unit 74. These units of the terminal apparatus 8 at the other site are functions that are implemented by or means that are caused to function by any of the components illustrated in FIG. 4 operating in accordance with instructions of the CPU 501 based on a program (app for the electronic whiteboard 2 or a web browser) loaded to the RAM 503 from the HD 504.

The communication unit 71 communicates with the information processing system 50 to receive various kinds of information including object data displayed by the electronic whiteboard 2 and the operator image 7. The communication unit 71 also transmits object data handwritten on the terminal apparatus 8 at the other site to the information processing system 50.

The operation reception unit 72 receives various operations performed on the terminal apparatus 8 at the other site. For example, the operation reception unit 72 may receive input of a stroke on the terminal apparatus 8 at the other site.

The display control unit 73 displays the object data received by the communication unit 71, the handwritten stroke, or the like on a display of the terminal apparatus 8 at the other site.

If the identification information of the operator image 7 is attached to the object data, the operator image acquisition unit 74 designates the identification information of the operator image 7 to acquire the operator image 7 from the information processing system 50 via the communication unit 71.

Meeting Device

Referring back to FIG. 9, the description is continued. The meeting device 60 includes a terminal communication unit 61, a panoramic image generation unit 62, a speaker image generation unit 63, a sound collection unit 64, an audio combining unit 65, an operator image generation unit 66, and a device direction detection unit 67. These units of the meeting device 60 are functions that are implemented by or means that are caused to function by any of the components illustrated in FIG. 5 operating in accordance with instructions of the CPU 611 based on the program loaded to the DRAM 614 from the ROM 612.

The terminal communication unit 61 communicates with the terminal apparatus 10 via a USB cable or the like. The terminal communication unit 61 may be connected to the terminal apparatus 10 by a cable. In some embodiments, the terminal communication unit 61 may communicate with the terminal apparatus 10 via a wireless LAN, Bluetooth®, or the like. The panoramic image generation unit 62 generates a panoramic image. The speaker image generation unit 63 generates a speaker image. The method of generating a panoramic image and a speaker image has been described with reference to FIGS. 6A to 7. The panoramic image generation unit 62 is also an acquisition unit that acquires image data.

The sound collection unit 64 converts an audio signal acquired by the microphone 608 included in the meeting device 60 into (digital) audio data. Thus, the content of utterances made by the user and the participant at the site where the terminal apparatus 10 is installed is collected.

The audio combining unit 65 combines the audio transmitted from the terminal apparatus 10 and the audio collected by the sound collection unit 64 together. Thus, the audio of utterances made at the other site 101 and the audio of utterances made at the one site 102 are combined together.

The operator image generation unit 66 starts clipping the operator image 7 from the panoramic image in response to an operation start notification (clipping request) from the terminal apparatus 10, and ends clipping the operator image 7 in response to an operation end notification (clipping end request).

The device direction detection unit 67 detects a specific sound (sound of a specific frequency) to detect a direction of the electronic whiteboard 2 in a panoramic image. The device direction detection unit 67 may detect the direction of the electronic whiteboard 2 in the panoramic image based on a previously set direction of the electronic whiteboard 2, detection of a two-dimensional code or the like, or the shape of the electronic whiteboard 2. In the description of the present embodiment, the terminal apparatus 10 detects the direction of the electronic whiteboard 2 based on the user setting, detection of the two-dimensional code or the like, or the shape of the electronic whiteboard 2. In this case, the device direction detection unit 67 receives the direction of the electronic whiteboard 2 from the terminal apparatus 10.

Information Processing System

The information processing system 50 includes a communication unit 51, an authentication unit 52, a screen generation unit 53, a communication management unit 54, a device management unit 55, a text conversion unit 56, and an object sharing unit 57. These units of the information processing system 50 are functions that are implemented by or means that are caused to function by any of the components illustrated in FIG. 4 operating in accordance with instructions of the CPU 501 based on the program loaded to the RAM 503 from the HD 504. The information processing system 50 also includes a storage unit 5000 implemented by the HD 504 or any desired memory illustrated in FIG. 4. The storage unit 5000 includes the conference information storage unit 5001, a recorded video information storage unit 5002, an association information storage unit 5003, an account information storage unit 5004, and an object data storage unit 5005, each of which may be implemented by a database. The object data storage unit 5005 will be described in relation to the electronic whiteboard 2.

The communication unit 51 transmits and receives various kinds of information to and from the terminal apparatus 10. For example, the communication unit 51 transmits a list of teleconferences to the terminal apparatus 10, and receives an audio data recognition request from the terminal apparatus 10.

The authentication unit 52 authenticates a user who operates the terminal apparatus 10. For example, the authentication unit 52 authenticates a user based on whether authentication information (a user ID and a password) included in an authentication request received by the communication unit 51 matches authentication information held in advance. The authentication information may be a card number of an integrated circuit (IC) card, biometric information of a face, a fingerprint, or the like. The authentication unit 52 may use an external authentication system or an authentication method such as Open Authorization (OAuth) to perform authentication.

The screen generation unit 53 generates screen information to be displayed by the terminal apparatus 10. When the terminal apparatus 10 executes a native app, the terminal apparatus 10 holds the screen information and transmits the information to be displayed in a form of Extensible Markup Language (XML) or the like. When the terminal apparatus 10 executes a web app, the screen information is created by HyperText Markup Language (HTML), XML, Cascade Style Sheet (CSS), JavaScript®, or the like.

The communication management unit 54 acquires information related to a teleconference from the conference management system 9 by using an account of each user or a system account assigned to the information processing system 50. The communication management unit 54 stores conference information of a scheduled conference in association with a conference ID in the conference information storage unit 5001. The communication management unit 54 acquires conference information for which a user belonging to a tenant has a right to view. Since the conference ID is set for a conference, the teleconference and the recording information are associated with each other by the conference ID.

In response to receipt of device identification information of the electronic whiteboard 2 from the terminal apparatus 10, the device management unit 55 stores the device identification information in association with the conference ID and the electronic whiteboard 2 and the meeting device 60 that are used in the conference in the association information storage unit 5003. Since a combined moving image is also associated with the conference ID, handwritten data and the combined moving image are also associated with each other. In response to the end of recording (the end of the conference), the device management unit 55 deletes the association from the association information storage unit 5003.

The text conversion unit 56 uses an external speech recognition service (for example, speech recognition service system 80) to convert audio data requested to be converted into text data by the terminal apparatus 10, into text data. In some embodiments, the text conversion unit 56 may perform this conversion.

The object sharing unit 57 enables an input/display area, object data, and the operator image 7 to be shared between the terminal apparatus 10 and the electronic whiteboard 2 that are participating in the same conference. The object sharing unit 57 provides the input/display area to allow the electronic whiteboard 2 and the terminal apparatus 10 to share the input/display area, and receives an input of an object in the input/display area on the electronic whiteboard 2 or the terminal apparatus 10. The terminal apparatus 10 attaches the conference ID to a communication. The attached conference ID enables the object sharing unit 57 to identify the conference. The object sharing unit 57 transmits an object transmitted from the electronic whiteboard 2 at the one site in response to an input of an object, to the electronic whiteboard 2 at the other site (and all the associated devices and apparatuses participating in the conference). The object sharing unit 57 also performs this processing in the opposite direction. The object sharing unit 57 enables the electronic whiteboard 2 and the terminal apparatus 10 to share an object and the operator image 7. Content to be transmitted is not limited to an object, and the entire input/display area in which an object is input may be transmitted and displayed.

The object sharing unit 57 may be an app, such as an online whiteboard app or an online electronic whiteboard app, that allows operators to mutually write objects on the plurality of terminal apparatuses 10 and the plurality of electronic whiteboards 2 and creates a whiteboard image online (in cloud). The object sharing unit 57 may use a web service external to the information processing system 50. The object sharing unit 57 is an example of a sharing unit.

FIG. 11 illustrates an example of conference information stored in the conference information storage unit 5001 and managed by the communication management unit 54. The communication management unit 54 uses the aforementioned account to acquire a list of teleconferences for which a user belonging to a tenant has a right to view. The right to view may be directly given from the information recording app 41 of the terminal apparatus 10 for conference information managed by the communication management unit 54. The list of teleconferences for which the user belonging to the tenant has the right to view includes conference information created by the user and conference information for which the user is given the right to view by another user. In the present embodiment, teleconferences are used as an example. However, the list of teleconferences also includes a conference held in a single conference room, without communication with a remote location.

The conference information is managed based on the conference ID, which is associated with items "host ID", "title" (conference name), "start date and time", "end date and time", "electronic whiteboard", and "meeting device", for example. These items are an example of the conference information, and the conference information may include other information.

The item "host ID" identifies a host of (a person who holds) the conference. The item "title" indicates the details of the conference such as a name of the conference or a subject of the conference.

The item "start date and time" indicates a date and time at which the conference is scheduled to be started.

The item "end date and time" indicates a date and time at which the conference is scheduled to end.

The item "electronic whiteboard" indicates identification information of the electronic whiteboard 2 associated with the conference.

The item "meeting device" indicates identification information of a meeting device used in the conference.

As illustrated in FIGS. 10 and 11, a combined moving image recorded at a conference is identified by the conference ID.

The recorded video information stored in the recorded video information storage unit 5002 may be the same as the information illustrated in FIG. 10. However, the information processing system 50 has a list of combined moving images recorded by all users belonging to the tenant. The user may input desired storage destination information in a user setting screen or the like of the information recording app 41 of the terminal apparatus 10, so that the storage destination (path information such as a URL of a cloud storage system) may be stored in the recorded video information storage unit 5002.

FIG. 12 illustrates association information stored in the association information storage unit 5003. The association information associates the conference ID and the device identification information (of the electronic whiteboard 2 and the meeting device 60) with each other. The association information is kept stored from the time when the information recording app 41 transmits the device identification information to the information processing system 50 to the time when the recording ends. The terminal apparatus 10 is connected to the meeting device 60. Thus, the information processing system 50 may store the identification information (such as an Internet Protocol (IP) address) of the terminal apparatus 10 in association with the association information. Alternatively, if the terminal apparatus 10 attaches the device identification information of the meeting device 60 to a communication, the device identification information allows the terminal apparatus 10 to be identified as an apparatus participating in the same conference as the electronic whiteboard 2.

FIG. 13 illustrates an example of the account information stored in the account information storage unit 5004. The account information includes information for not only persons but also for the electronic whiteboard 2 and the meeting device 60 as users other than persons (that is, devices).

The item "user ID" is identification information of a user, the electronic whiteboard 2, the meeting device 60, and the like that may participate in a conference.

The item "type" is a type of each account, i.e., the user, the electronic whiteboard 2, or the meeting device 60.

The item "name" is a name of the user or a name of the electronic whiteboard 2 or the meeting device 60.

The item "email address" is an email address of the user, the electronic whiteboard 2, the meeting device 60, or the like.

Electronic Whiteboard

Figure 14:
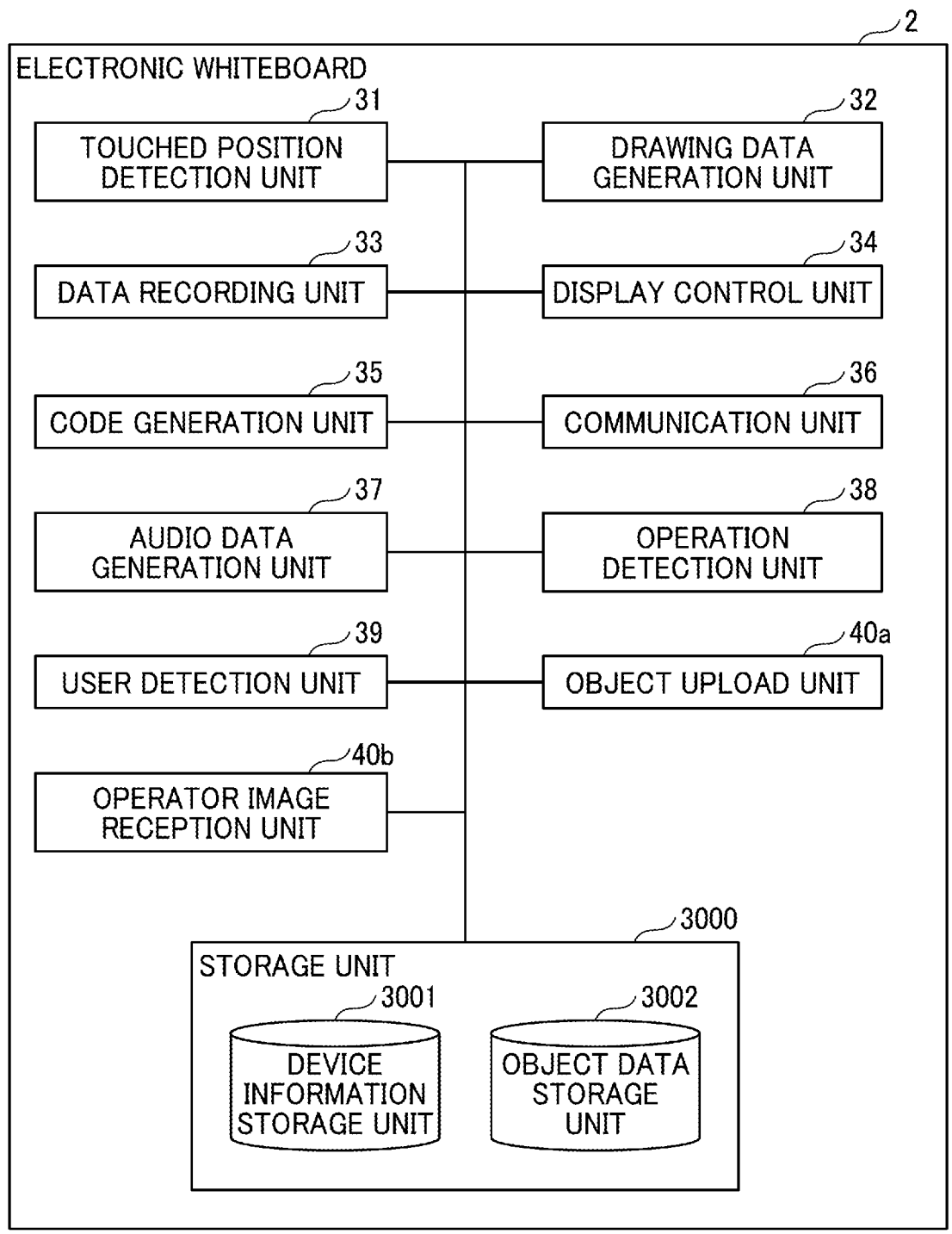
FIG. 14 is an example of a functional block diagram for describing, as individual blocks, functions of the electronic whiteboard according to the embodiment of the present disclosure.

FIG. 14 is an example of a functional block diagram for describing, as individual blocks, functions of the electronic whiteboard 2. The electronic whiteboard 2 includes a touched position detection unit 31, a drawing data generation unit 32, a data recording unit 33, a display control unit 34, a code generation unit 35, a communication unit 36, an audio data generation unit 37, an operation detection unit 38, a user detection unit 39, an object upload unit 40a, and an operator image reception unit 40b.

The respective functions of the electronic whiteboard 2 are functions or means that are implemented by any of the components illustrated in FIG. 8 operating in accordance with instructions of the CPU 401 based on the program loaded to the RAM 403 from the SSD 404.

The touched position detection unit 31 detects coordinates of a position where the electronic pen 490 has touched the touch sensor 414. The drawing data generation unit 32 acquires the coordinates of the position touched by the tip of the electronic pen 490 from the touched position detection unit 31. The drawing data generation unit 32 interpolates a sequence of coordinate points and links the resulting coordinate points to generate stroke data.

The display control unit 34 displays handwritten data, a character string converted from the handwritten data, a menu to be operated by the user, and the like on the display.

The data recording unit 33 stores, in an object data storage unit 3002, handwritten data handwritten on the electronic whiteboard 2, a figure such as a circle or triangle into which the handwritten data is converted, a stamp of "DONE" or the like, a PC screen, a file, or the like. Handwritten data, a character string (including a figure), an image such as the PC screen, a file, and the like are handled as objects. As for handwritten data, a set of stroke data is handled as one object in accordance with a temporal separation due to an interruption of handwriting and a distance separation due to a difference in handwriting location.

The communication unit 36 is connected to Wi-Fi or a LAN and communicates with the information processing system 50. The communication unit 36 transmits object data to the information processing system 50, receives object data stored in the information processing system 50 from the information processing system 50, and displays an object based on the object data on the display 480. The communication unit 36 transmits an operation start notification or an operation end notification to the terminal apparatus 10.

The code generation unit 35 encodes the device identification information of the electronic whiteboard 2 stored in a device information storage unit 3001 and information indicating that the electronic whiteboard 2 is a device usable in the conference into a two-dimensional pattern to generate a two-dimensional code. The code generation unit 35 may encode the device identification information of the electronic whiteboard 2 and the information indicating that the electronic whiteboard 2 is a device usable in the conference into a barcode. The device identification information may be a serial number, a Universally Unique Identifier (UUID), or the like. The device identification information may be set by the user.

The audio data generation unit 37 generates audio data according to a method of sampling a signal of a preset frequency at a certain interval as in pulse code modulation (PCM) conversion. The audio data is converted into an analog signal by a digital-to-analog (D/A) converter included in the loudspeaker 450, and the analog signal is output from the loudspeaker 450.

The operation detection unit 38 detects a user operation on the electronic whiteboard 2. For example, the operation detection unit 38 detects the start of an operation or the end of the operation in accordance with detection of a touch (or approach) of the electronic pen 490, the hand H of the user, or the like onto (to) the display 480 (touch panel) by the touched position detection unit 31.

The user detection unit 39 uses an infrared sensor, an ultrasonic sensor, a camera, or the like to detect an approach of a user to the electronic whiteboard 2 and moving of the user away from (leaving of the user from) the electronic whiteboard 2.

The object upload unit 40a uploads an object displayed by the electronic whiteboard 2 to the information processing system 50 at a predetermined timing. This allows the object to be shared between the sites.

The operator image reception unit 40b receives the operator image 7 from the terminal apparatus 10. The operator image reception unit 40b may receive the operator image 7 from the terminal apparatus 10 via the information processing system 50, or directly from the terminal apparatus 10.

The electronic whiteboard 2 also includes a storage unit 3000 implemented by the SSD 404 or the like illustrated in FIG. 8. The storage unit 3000 includes the device information storage unit 3001 and the object data storage unit 3002, each may be implemented by a database.

FIG. 15 illustrates information such as device identification information stored in the device information storage unit 3001. Device identification information is identification information of the electronic whiteboard 2. An IP address is used by another apparatus to connect to the electronic whiteboard 2 via a network. A password is used for authentication performed when another apparatus connects to the electronic whiteboard 2.

FIG. 16 is a diagram for describing object data stored in the object data storage unit 3002. The object data is information for managing an object displayed by the electronic whiteboard 2, and includes various data items as illustrated in FIG. 16. The object data is transmitted to the information processing system 50 and is used as minutes. The object is associated with the conference ID which the electronic whiteboard 2 is notified of by the information processing system 50.

The item "object ID" is identification information for identifying an object. Types of the object include a character, a figure, an image as well as a stroke. The type "character" indicates a character string (character code) converted from handwritten data. The character string may also be referred to as text data. The type "figure" indicates a geometric shape converted from handwritten data, such as a triangle or a square. The type "image" indicates image data of Joint Photographic Experts Group (JPEG), Portable Network Graphics (PNG), Portable Document Format (PDF), or Tag Image File Format (TIFF) captured from a PC, the Internet, or the like.

The item "data content" indicates a sequence of coordinate points of a stroke. The item "data content" indicates data such as a character code or an image file and position information of the data.

The item "input source" indicates identification information of an apparatus to which an object is input. The identification information of the electronic whiteboard 2 is registered for handwriting on the electronic whiteboard 2. The user ID (logged-in user) who has performed handwriting is registered for handwriting performed on the terminal apparatus 8 at the other site.

As the item "operator image identification information", identification information of the operator image 7 associated with the object is registered. The operator image 7 may be stored in the information processing system 50 or in the storage service system 70.

The item "storage destination" indicates a URL or a file path where the operator image 7 is stored.

Operations or Processes

Figure 17:
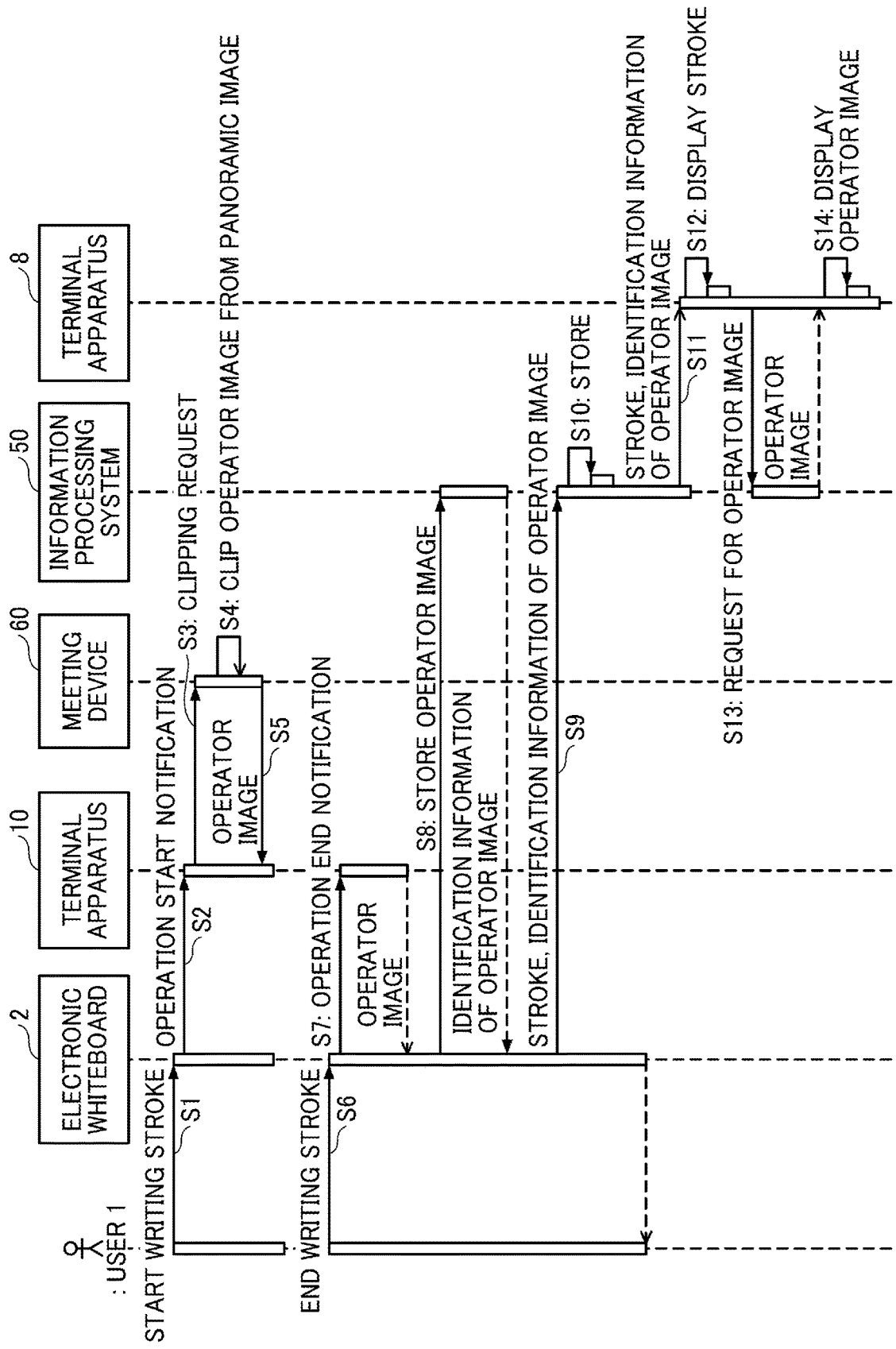
FIG. 17 is an example of a sequence diagram for describing a process in which the terminal apparatus at the other site displays a stroke handwritten on the electronic whiteboard by a user, along with the operator image in accordance with the embodiment of the present disclosure.

An overall process flow in which the meeting device 60 performs clipping of the operator image 7 and the terminal apparatus 8 at the other site displays an object and the operator image 7 will be described with reference to FIG. 17. FIG. 17 is a sequence diagram for describing a process in which the terminal apparatus 8 at the other site displays a stroke handwritten on the electronic whiteboard 2 by a user 1 (U1), along with the operator image 7.

S1: The user 1 participating in a conference performs handwriting on the electronic whiteboard 2 with the electronic pen 490 or an operation for displaying a screen of a PC on the electronic whiteboard 2.

S2: The touched position detection unit 31 of the electronic whiteboard 2 detects a position touched with the electronic pen 490, and the operation detection unit 38 detects the start of the operation. The user detection unit 39 may detect an approach of the user 1. Since the operation is performed on the electronic whiteboard 2, the communication unit 36 of the electronic whiteboard 2 transmits an operation start notification (indicating detection of the operation) to the terminal apparatus 10. The method of communication performed between the electronic whiteboard 2 and the terminal apparatus 10 will be described later (FIGS. 19 to 22).

S3: In response to the communication unit 11 of the information recording app 41 receiving the operation start notification, the clipping request unit 25 transmits a clipping request for the operator image 7 to the meeting device 60 via the device communication unit 16. The clipping request unit 25 may transmit a clipping request for the operator image 7 to the meeting device 60 in response to the user 1 performing an operation of clipping the operator image 7.

S4: The terminal communication unit 61 of the meeting device 60 receives the clipping request, and the operator image generation unit 66 generates (clips) the operator image 7 from the panoramic image. A method of detecting the direction of the electronic whiteboard 2 will be described later. The terminal apparatus 10 can also clip the operator image 7.

S5: The terminal communication unit 61 of the meeting device 60 transmits the requested operator image 7 to the terminal apparatus 10. The device communication unit 16 of the terminal apparatus 10 receives the operator image 7.

The meeting device 60 may generate the operator image 7 for each stroke or may generate the operator image 7 for each object. The meeting device 60 may regularly generate the operator image 7.

S6: The user 1 participating in the conference ends the operation on the electronic whiteboard 2. Examples of how the operation ends include pen-up and no operation for a certain period or longer since the last operation.

S7: The operation detection unit 38 of the electronic whiteboard 2 detects the end of the operation. The end of the operation in this example is an end of one stroke (pen-up). The user detection unit 39 may detect moving away of the user 1. In response to the end of the operation, the operator image reception unit 40b of the electronic whiteboard 2 transmits a request for the operator image 7 to the terminal apparatus 10 via the communication unit 36. The communication unit 11 of the terminal apparatus 10 transmits the operator image 7 to the electronic whiteboard 2.

S8: The communication unit 36 of the electronic whiteboard 2 receives the operator image 7, and the object upload unit 40a transmits the operator image 7 along with the conference ID to the information processing system 50 via the communication unit 36. The communication unit 51 of the information processing system 50 receives the operator image 7, and the object sharing unit 57 assigns the identification information for the operator image 7. The object sharing unit 57 stores the operator image 7 and the identification information of the operator image 7 in association with each other. The communication unit 51 of the information processing system 50 transmits the identification information of the operator image 7 to the terminal apparatus 10.

S9: The object upload unit 40a of the electronic whiteboard 2 transmits object data (stroke data in this example) and the identification information of the operator image 7 along with the conference ID to the information processing system 50 via the communication unit 36.

S10: The communication unit 51 of the information processing system 50 receives the conference ID, the object data, and the identification information of the operator image 7, and the object sharing unit 57 assigns the object ID for the object data. Alternatively, the electronic whiteboard 2 may assign the object ID for the object data. The object sharing unit 57 stores the object ID, the object data, and the identification information of the operator image 7 in association with one another. The order in which the object data and the operator image 7 are transmitted may be reversed.

S11: In response to the information processing system 50 receiving the object data and the operator image 7, the object sharing unit 57 identifies, based on the conference ID, the terminal apparatus 8 participating in the same conference at the other site, and the communication unit 51 transmits the object data and the identification information of the operator image 7 to the terminal apparatus 8 at the other site. The object data and the identification information of the operator image 7 are not transmitted to the electronic whiteboard 2 that is the transmission source of the object data and the operator image 7. If the terminal apparatus 10 at the one site is participating the same conference, the object data and the identification information of the operator image 7 may also be transmitted to the terminal apparatus 10.

S12: The communication unit 71 of the terminal apparatus 8 at the other site receives the object data and the identification information of the operator image 7, and the display control unit 73 displays the object data on the display.

S13: In response to a user of the terminal apparatus 8 at the other site selecting one of the displayed objects, the operator image acquisition unit 74 transmits a request for the operator image 7 to the information processing system 50 via the communication unit 71 by using the identification information of the operator image 7. The communication unit 51 of the information processing system 50 receives the request, and the object sharing unit 57 transmits the operator image 7 associated with the identification information of the operator image 7 to the terminal apparatus 8 at the other site via the communication unit 51.

S14: The communication unit 71 of the terminal apparatus 8 at the other site receives the operator image 7, and the display control unit 73 displays the operator image 7 in association with the object transmitted along with the identification information of the operator image 7. Displaying the operator image 7 in association with the object indicates displaying the operator image 7 near (within a certain range from) the object or around (in an upper, lower, left, or right area of) the object.

The process described above allows the terminal apparatus 8 at the other site to inform the participant at the other site of who wrote the stroke on the electronic whiteboard 2 at the one site.

In the example described above, the electronic whiteboard 2 transmits the operator image 7 to the information processing system 50 in response to the end of the operation. In another example, the electronic whiteboard 2 may transmit the operator image 7 to the information processing system 50 during the operation (while the user performing the handwriting). The object data and the operator image 7 are transmitted to the information processing system 50 substantially at the same time. In another example, the object data and the operator image 7 may be transmitted separately. For example, the electronic whiteboard 2 transmits the object data (stroke data) to the information processing system 50, and then performs processing for storing the operator image 7 in the information processing system 50. That is, the stroke data alone may be shared with the terminal apparatus 8 at the other site first, and then the operator image 7 captured when the stroke is input may be shared with the terminal apparatus 8 at the other site.

Display Example of Terminal Apparatus at Another Site

Figure 18A:
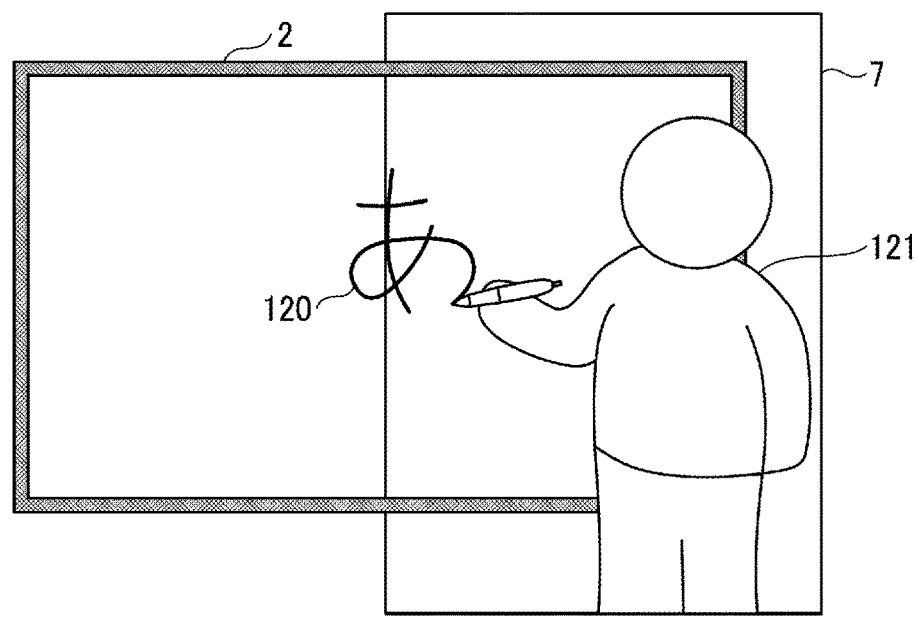
FIGS. 18A and 18B are diagrams illustrating an example of the object and the operator image displayed by the terminal apparatus at the other site.
Figure 18B:
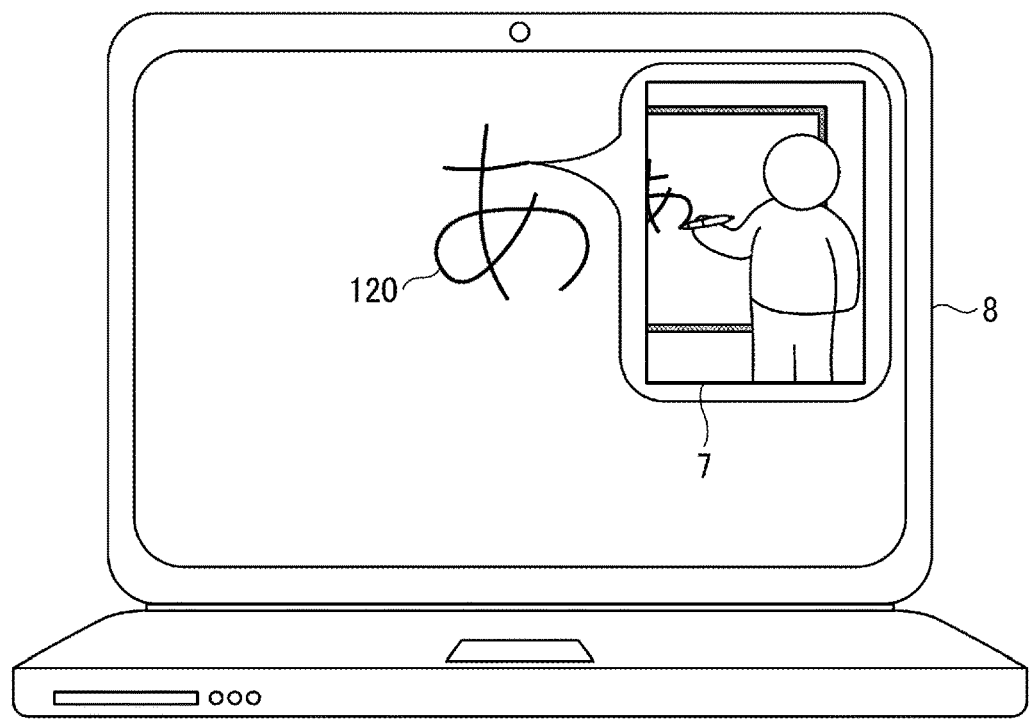

FIGS. 18A and 18B illustrate an example of the object and the operator image 7 displayed by the terminal apparatus 8 at the other site. FIG. 18A illustrates the operator 121 who performs handwriting on the electronic whiteboard 2. In this case, the operator image 7 is created which includes the operator 121 near the stroke 120 handwritten on the electronic whiteboard 2. The operator image 7 is an image of a right half of the electronic whiteboard 2 because the handwriting is performed on the right side of the electronic whiteboard 2. In another example, the entire electronic whiteboard 2 may be clipped or the face of the operator 121 alone may be clipped.

FIG. 18B illustrates the stroke 120 and the operator image 7 that are displayed by the terminal apparatus 8 at the other site. The operator image 7 is displayed as a speech bubble or a pop-up window near the stroke 120 handwritten on the electronic whiteboard 2. The operator image 7 thus allows the user at the other site to easily grasp who wrote the stroke 120.

In the example of FIG. 18B, the meeting device 60 intentionally clips a wide area to inform the users at the other site of how the operator 121 is performing the handwriting on the electronic whiteboard 2 or of a scene including the electronic whiteboard 2 in detail. Thus, the operator image 7 includes the hand of the user who is writing the stroke 120 and a part of the electronic whiteboard 2. The position where the operator image 7 is displayed is merely an example. Thus, the operator image 7 may be just displayed around the stroke 120. The display control unit 73 may display the operator image 7 to avoid an existing stroke. The display control unit 73 may display a reduced-size image of the operator image 7 to avoid the existing stroke.

The meeting device 60 may use a known image recognition (face recognition) technique to clip the face or a peripheral area including the face as a circular or rectangular shape and generate the operator image 7. In the example of FIG. 18B, the meeting device 60 acquires information indicating that handwriting is performed on the right side of the electronic whiteboard 2 from the electronic whiteboard 2 and generates the operator image 7 of the right half of the electronic whiteboard 2. In another example, the meeting device 60 may detect a person (the operator 121) and may generate the operator image 7 including the electronic whiteboard 2 and the person.

Figure 38:
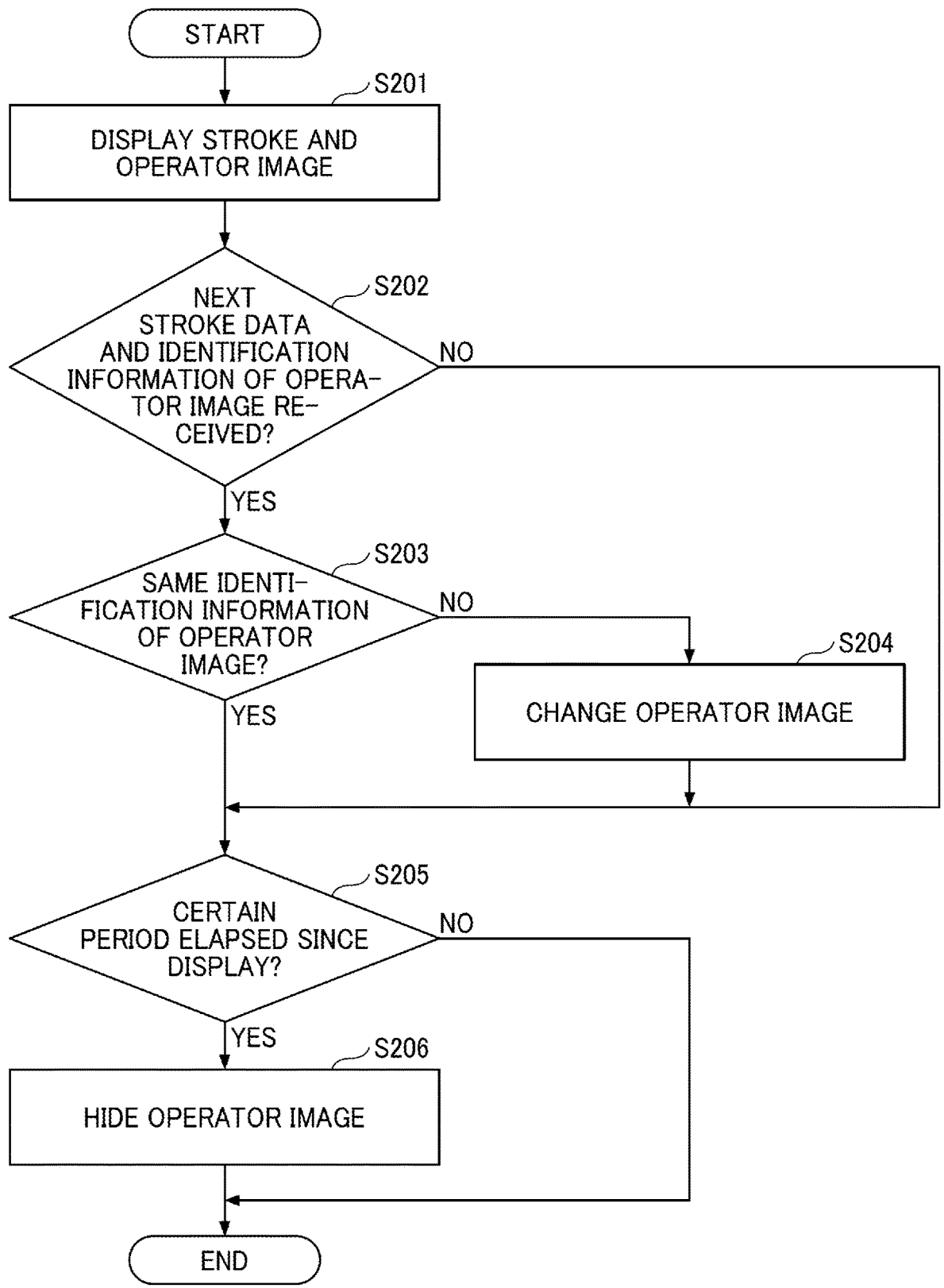
FIG. 38 is an example of a flowchart for describing a process in which after receiving the operator image, the terminal apparatus at the other site displays the operator image in accordance with the embodiment of the present disclosure.

The terminal apparatus 8 at the other site may hide the operator image 7 after an elapse of a certain period (for example, when determining that nothing is written for several seconds or longer since last detection of writing on the electronic whiteboard 2). This may avoid a hindrance caused by the operator image 7. The display control unit 73 may hide the operator image 7 in response to a user operation even during the certain period. FIG. 38 illustrates details of display control of the operator image 7.

Example of Process Performed Before Electronic Whiteboard and Terminal Apparatus Communicate with Each Other A process for allowing the electronic whiteboard 2 and the terminal apparatus 10 to communicate with each other will be described below. The user registers a new conference to the information processing system 50 through a conference registration screen 250 illustrated in FIG. 19. FIG. 19 illustrates an example of the conference registration screen 250 displayed by the terminal apparatus 10.

An item "conference name" 241 indicates a title of the conference.

An item "host" 242 presents information on the host of the conference. The host is usually a person who performs an operation in the conference registration screen 250.

An item "date and time" 243 is an input field for a start date and time and an end date and time of the conference. The item "date and time" 243 is selectable from a calendar. An item "participants" 244 indicates participants of the conference. The participants are selectable from a list of users registered in the account information storage unit 5004.

An item "electronic whiteboard" 245 is a selection field for the electronic whiteboard 2 to be used in the conference. The electronic whiteboard 2 to be used is selectable from a list of accounts with the type "electronic whiteboard" in the account information storage unit 5004.

An item "meeting device" 246 is a selection field for the meeting device 60 to be used in the conference. The meeting device 60 to be used is selectable from a list of accounts with the type "meeting device" in the account information storage unit 5004.

As illustrated in FIG. 19, when creating a new conference, the user is allowed to select the electronic whiteboard 2 and the meeting device 60 to be used in the conference.

As illustrated in FIG. 20, the user then registers the meeting device 60 and the electronic whiteboard 2 to the information processing system 50. Since conference information has already been created, the user simply selects the conference. FIG. 20 is an example of a sequence diagram for describing a process in which the user registers the meeting device 60 and the electronic whiteboard 2 to the information processing system 50.

S21: As illustrated in FIG. 19, the user creates conference information.

S22: The operation reception unit 12 of the terminal apparatus 10 receives the conference information, and the communication unit 11 transmits the conference information to the information processing system 50. The communication unit 51 of the information processing system 50 receives the conference information, and the communication management unit 54 registers the conference information to the conference information storage unit 5001.

S23: Before starting the conference, the user may move to a conference room or the like, and connects the meeting device 60 to the terminal apparatus 10. The meeting device 60 starts up in response to connection of a USB cable, and starts communicating with the meeting device 60 (transmitting various images) in response to the startup of the information recording app 41.

S24: The user selects the conference to be held from a conference list screen 230 (see FIG. 33) displayed by the information recording app 41.

S25: The operation reception unit 12 of the information recording app 41 receives the operation. The communication unit 11 designates the device identification information of the meeting device 60 and the conference ID in a request to register the meeting device 60 to the conference, and transmits the request to the information processing system 50. The communication unit 51 of the information processing system 50 receives the request to register the meeting device 60 to the conference, and determines that the meeting device 60 indicated by the request is the meeting device 60 registered in the conference information. The device management unit 55 associates the device identification information of the meeting device 60 with the conference ID.

S26: The user then selects a conference to be held from the conference list screen 230 displayed on the electronic whiteboard 2.

S27: The communication unit 36 of the electronic whiteboard 2 designates the device identification information of the electronic whiteboard 2 and the conference ID in a request to register the electronic whiteboard 2 to the conference, and transmits the request to the information processing system 5. The communication unit 51 of the information processing system 50 receives the request to register the electronic whiteboard 2 to the conference, and determines that the electronic whiteboard 2 indicated by the request is the electronic whiteboard 2 registered in the conference information. The device management unit 55 associates the device identification information of the electronic whiteboard 2 with the conference ID.

In this manner, the information processing system 50 associates the meeting device 60 (the terminal apparatus 10) with the electronic whiteboard 2 to allow the terminal apparatus 10 and the electronic whiteboard 2 to communicate with each other via the information processing system 50. If one of the meeting device 60 (the terminal apparatus 10) and the electronic whiteboard 2 transmits the identification information to the information processing system 50, the information processing system 50 successfully identifies the other device registered with the same conference ID based on the association information.

The user registers the conference information in advance in FIGS. 19 and 20. The conference information is not necessarily registered in advance, and the user is allowed to register the meeting device 60 and the electronic whiteboard 2 in association with each other to the information processing system 50 when starting the conference.

FIG. 21 is an example of a sequence diagram for describing a process in which the user registers the meeting device 60 and the electronic whiteboard 2 to the information processing system 50 when the conference information is not created.

S31: The user performs an operation for starting registration for associating the electronic whiteboard 2 with the meeting device 60, on the electronic whiteboard 2 in the conference room.

S32: In response to the operation, the electronic whiteboard 2 communicates with the information processing system 50 set in advance, and registers the device identification information of the electronic whiteboard 2 and information indicating that the electronic whiteboard 2 can be associated with the conference.

S33: The code generation unit 35 of the electronic whiteboard 2 disposed in the conference room and to be used in the conference encodes the device identification information of the electronic whiteboard 2 and information indicating that the electronic whiteboard 2 is a device usable in the conference to generate a two-dimensional code. The display control unit 34 displays the two-dimensional code. The two-dimensional code may further include a password used by the electronic whiteboard 2 to authenticate another device.

S34: The user enters the conference room where the electronic whiteboard 2 is installed while carrying the terminal apparatus 10 and the meeting device 60, and connects the terminal apparatus 10 and the meeting device 60 to each other with a USB cable. The meeting device 60 starts up in response to power supply from the USB cable or power-on. In this way, the meeting device 60 enters a standby state.

The user starts the information recording app 41 on the terminal apparatus 10. The information recording app 41 starts communicating with the meeting device 60, so that the meeting device 60 starts capturing images and collecting sound. The panoramic image generation unit 62 of the meeting device 60 generates image data of a captured image of the surroundings including the two-dimensional code.

S35: The terminal communication unit 61 of the meeting device 60 transmits the image data and the device identification information of the meeting device 60 to the terminal apparatus 10.

S36: The device communication unit 16 of the terminal apparatus 10 receives the image data and the device identification information of the meeting device 60, and the analysis unit 23 detects the two-dimensional code displayed on the electronic whiteboard 2 from the image data. The analysis unit 23 decodes the two-dimensional code. If the analysis unit 23 determines that information indicating that the electronic whiteboard 2 is a device usable in the conference is embedded, the analysis unit 23 acquires the device identification information of the electronic whiteboard 2 from the two-dimensional code. The communication unit 11 of the information recording app 41 designates the device identification information of the electronic whiteboard 2 and the device identification information of the meeting device 60 in a registration request, and the transmits the registration request to the information processing system 50. The two-dimensional code may be decoded by the meeting device 60.

S37, S38: In response to the communication unit 51 of the information processing system 50 receiving the registration request (of the device identification information of the electronic whiteboard 2 and the device identification information of the meeting devices 60) to the conference, the communication management unit 54 issues a conference ID. The device management unit 55 then stores the device identification information of the electronic whiteboard 2, the device identification information of the meeting device 60, and the conference ID in association with one another in the association information storage unit 5003.

The communication unit 51 of the information processing system 50 notifies the terminal apparatus 10 and the electronic whiteboard 2 of the conference ID and the completion of registration of the electronic whiteboard 2 to the conference. The communication unit 11 of the terminal apparatus 10 receives and stores the conference ID. Likewise, in response to receiving the conference ID and the password, the communication unit 36 of the electronic whiteboard 2 verifies the password and stores the conference ID if the received password matches the password used for authentication. The terminal apparatus receives the conference ID as a response to the communication in step S36. The electronic whiteboard 2 receives the conference ID and the password as a response to polling (for requesting association of the device identification information with the conference) on the information processing system 50. The electronic whiteboard 2 and the information processing system 50 may communicate with each other by a two-way communication scheme such as WebSocket that enables push communication from the information processing system 50 to the electronic whiteboard 2.

Thereafter, the terminal apparatus 10 and the electronic whiteboard 2 adds the conference ID (or the corresponding device identification information) to data to be transmitted.

In this manner, the information processing system 50 associates the meeting device 60 (the terminal apparatus 10) with the electronic whiteboard 2 to allow the terminal apparatus 10 and the electronic whiteboard 2 to communicate with each other via the information processing system 50.

In FIGS. 19 to 21, the terminal apparatus 10 and the electronic whiteboard 2 are allowed to communicate with each other via the information processing system 50. However, if the terminal apparatus 10 and the electronic whiteboard 2 are connected to the same network, the terminal apparatus 10 and the electronic whiteboard 2 can use IP addresses to communicate with each other. The same network refers to a network having the same network address or a network having the same connection destination Service Set Identifier (SSID).

Figure 22:
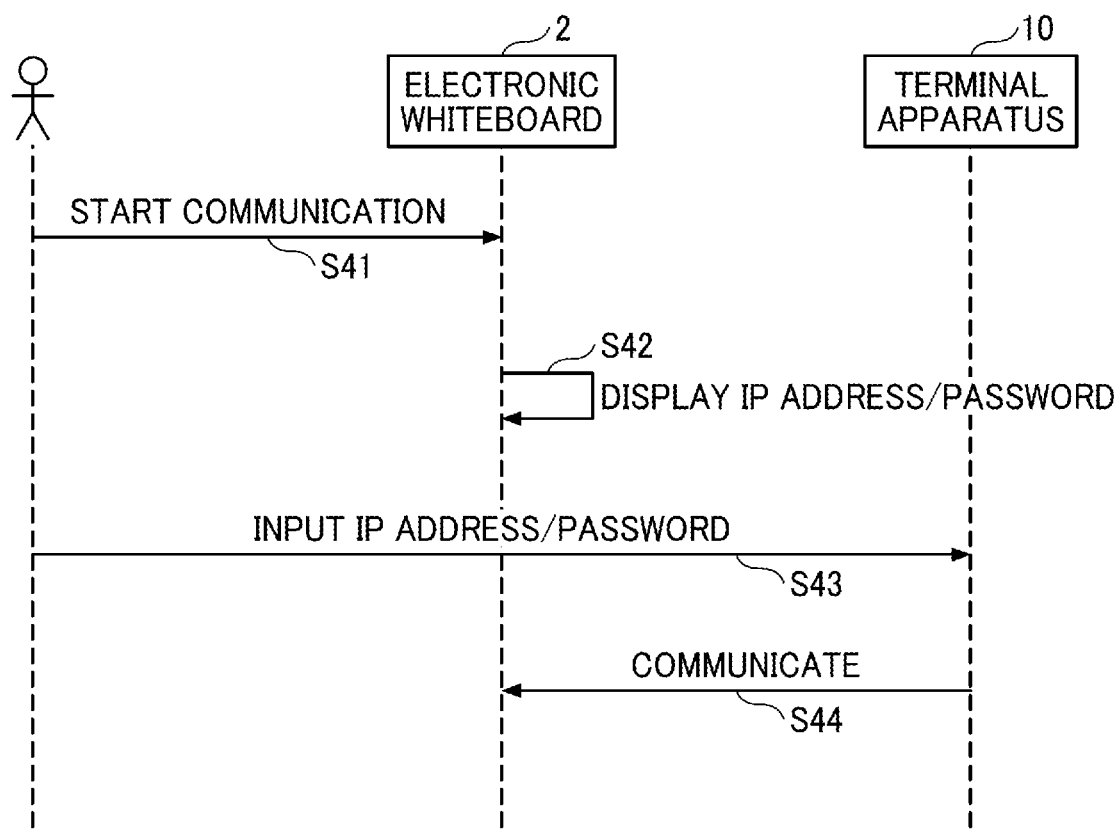
FIG. 22 is an example of a sequence diagram for describing a method of communication performed between the terminal apparatus and the electronic whiteboard in the case where the terminal apparatus and the electronic whiteboard are connected to the same network in accordance with the embodiment of the present disclosure.

FIG. 22 is an example of a sequence diagram for describing a method of communication performed between the terminal apparatus 10 and the electronic whiteboard 2 when the terminal apparatus 10 and the electronic whiteboard 2 are connected to the same network.

S41: The user performs an operation for starting association with the meeting device 60, on the electronic whiteboard 2 in the conference room.

S42: The electronic whiteboard 2 receives the operation, and the display control unit 34 displays the IP address and the password of the electronic whiteboard 2.

S43: The user views the displayed IP address and password, and inputs the IP address and password to the information recording app 41 of the terminal apparatus 10. The operation reception unit 12 of the terminal apparatus 10 receives the input.

S44: The communication unit 11 of the terminal apparatus 10 uses the IP address to establish a connection to the electronic whiteboard 2 and transmits the password to the electronic whiteboard 2. If verification of the password is successful, the terminal apparatus is allowed to communicate with the electronic whiteboard 2.

Determination of Direction of Electronic Whiteboard in Panoramic Image

Methods of determining the direction of the electronic whiteboard 2 in the panoramic image will be described. The operator image 7 is an image of a participant (user) operating the electronic whiteboard 2. Thus, if the meeting device 60 clips an image of the direction of the electronic whiteboard 2, the operator image 7 including the operator is obtained.

Four major methods for determining the direction of the electronic whiteboard 2 are as follows:
 1. A user designates the direction of the electronic whiteboard 2 from a panoramic image at the start of a conference;

2. The electronic whiteboard 2 displays a specific image (such as a two-dimensional code), and the terminal apparatus 10 or the meeting device 60 recognizes the specific image from a panoramic image captured by the image-capturer 601 of the meeting device 60;
3. The electronic whiteboard 2 outputs a specific sound, and the meeting device 60 recognizes the specific sound with the microphone 608; and
4. Any information processing apparatus learns the shape of the electronic whiteboard 2 through machine learning, and the terminal apparatus 10 or the meeting device 60 recognizes the electronic whiteboard 2 from a panoramic image captured by a camera (the image-capturer 601) of the meeting device 60, based on learning data.

Figure 23:
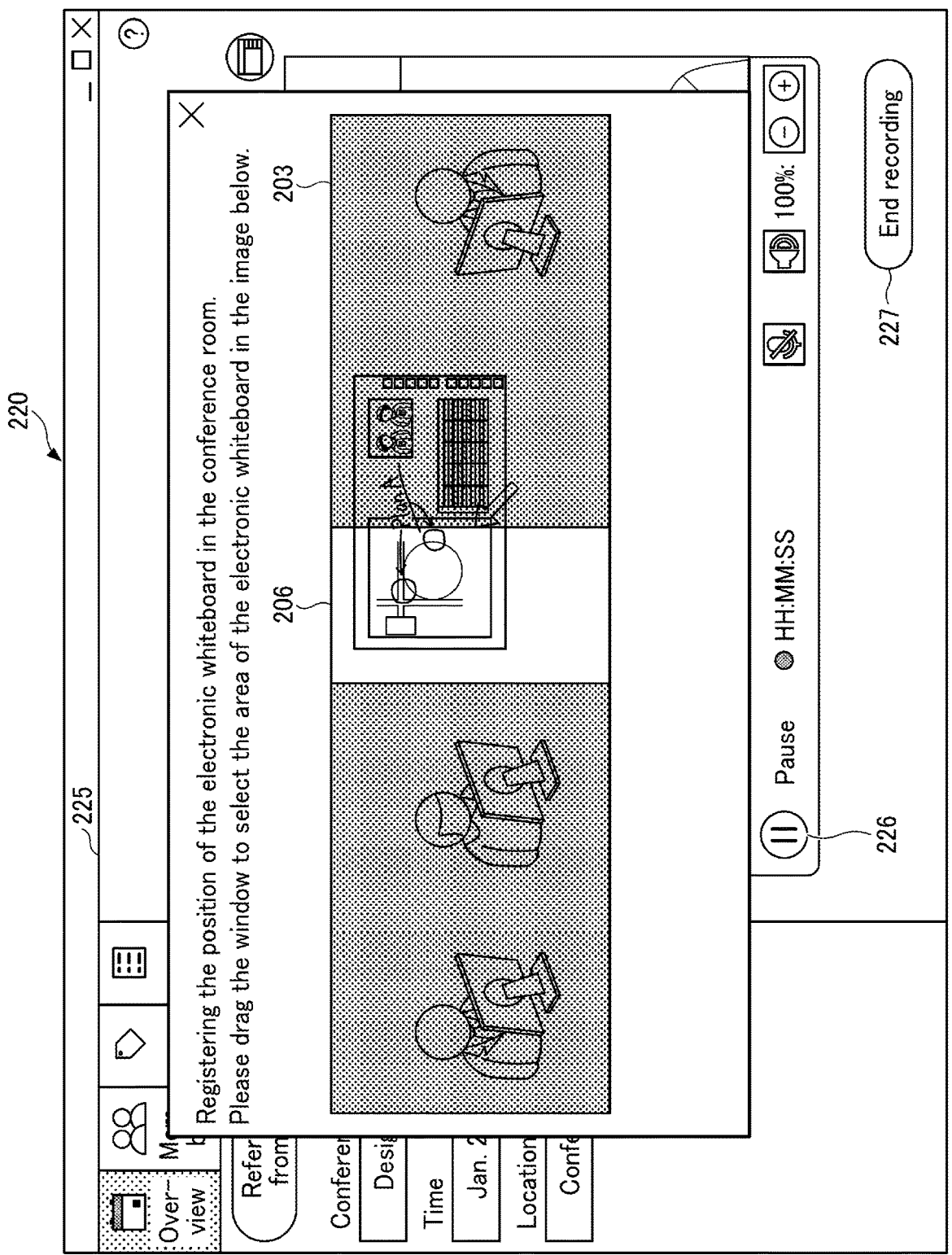
FIG. 23 is a diagram for describing a method of an operation of setting a direction of the electronic whiteboard through pressing of a position registration button in accordance with the embodiment of the present disclosure.

1. User Designating Direction of Electronic Whiteboard from Panoramic Image at Start of Conference FIG. 23 is a diagram for describing a method of an operation of setting the direction of the electronic whiteboard 2 through pressing of a position registration button 207. In response to pressing of the position registration button 207, the panoramic image 203 pops up. For example, the user moves a rectangular window 206 over the panoramic image 203 with a pointing device such as a mouse or a touch panel. The user aligns the window 206 over the electronic whiteboard 2, a podium, or the like included in the panoramic image 203.

FIG. 24 illustrates a screen for checking the direction set by the user. In response to the user pressing an OK button 208, the direction of the electronic whiteboard 2 in the panoramic image 203 is set. The direction set by the user is transmitted to the meeting device 60, and stored by the device direction detection unit 67 of the meeting device 60.

2. Electronic Whiteboard Displaying Specific Image (Such as Two-Dimensional Code), and Terminal Apparatus or Meeting Device Recognizing Specific Image from Panoramic Image Captured by Image-Capturer of Meeting Device, and 3. Electronic Whiteboard Outputting Specific Sound, and Meeting Device Recognizing Sound with Microphone FIG. 25 is an example of a sequence diagram for describing a process in which the information recording app 41 determines the direction of the electronic whiteboard 2 based on a specific image or sound.

S51: The user performs an operation for determining the direction of the electronic whiteboard 2 on the information recording app 41 of the terminal apparatus 10. The operation reception unit 12 receives the operation.

S52: The communication unit 11 of the information recording app 41 transmits a request to output a specific image or a specific sound to the electronic whiteboard 2. The communication unit 11 may communicate with the electronic whiteboard 2 via a LAN or via the information processing system 50.

S53: The communication unit 36 of the electronic whiteboard 2 receives the request, and the code generation unit 35 generates a two-dimensional code as the specific image. The display control unit 34 displays the two-dimensional code on the display 480.

The communication unit 36 of the electronic whiteboard 2 receives the request, and the audio data generation unit 37 outputs a sound of a specific frequency from the loudspeaker 450. In one example, one of the code generation unit 35 and the audio data generation unit 37 operates. In another example, both of the code generation unit 35 and the audio data generation unit 37 operate.

S54: Since the panoramic image generation unit 62 of the meeting device 60 repeatedly generates a panoramic image, the panoramic image generation unit 62 automatically generates a panoramic image including the two-dimensional code if the two-dimensional code is in the angle of view. Since the sound collection unit 64 of the meeting device 60 repeatedly collects a sound, the sound collection unit 64 automatically collects the sound of the specific frequency. The device direction detection unit 67 performs Fourier transform on the audio data to obtain a frequency spectrum, and specifies two directions from which a sound having the frequency determined in advance and has a volume equal to or higher than a threshold arrives. The device direction detection unit 67 of the electronic whiteboard 2 stores the direction of the electronic whiteboard 2 (A degrees to B degrees among 360 degrees in the horizontal direction). The specific sound is preferably in an ultrasonic frequency band because the sound in the ultrasonic frequency band is non-audible to the user.

S55: The terminal communication unit 61 of the meeting device 60 transmits the panoramic image to the terminal apparatus 10.

S56: The device communication unit 16 of the information recording app 41 receives the panoramic image. The analysis unit 23 detects the two-dimensional code displayed on the electronic whiteboard 2 from the panoramic image. The analysis unit 23 decodes the two-dimensional code. If the analysis unit 23 determines that the information indicating the direction of the electronic whiteboard 2 is embedded, the analysis unit 23 identifies positions of the left and right ends of the two-dimensional code in the panoramic image. The details will be described with reference to FIG. 26. The device direction detection unit 67 of the meeting device 60 may perform this processing.

S57: The device communication unit 16 of the terminal apparatus 10 transmits information on the direction of the electronic whiteboard 2 (A degrees to B degrees among 360 degrees in the horizontal direction) to the meeting device 60. The terminal communication unit 61 of the meeting device 60 receives information on the direction of the electronic whiteboard 2, and the device direction detection unit 67 stores the direction.

S58: Since the direction of the electronic whiteboard 2 is determined, the communication unit 11 of the information recording app 41 transmits a request to stop outputting the specific image or the specific sound to the electronic whiteboard 2.

S59: The communication unit 36 of the electronic whiteboard 2 receives the request, and the display control unit 34 ends the display of the two-dimensional code. The audio data generation unit 37 stops outputting the sound of the specific frequency.

Determination of Direction Based on Two-Dimensional Code

FIG. 26 illustrates an example of two-dimensional codes 301 displayed as the specific image by the electronic whiteboard 2.

In FIG. 26, the panoramic image includes the electronic whiteboard 2, and the electronic whiteboard 2 displays the two two-dimensional codes 301. The size (width) of the two-dimensional code 301 is equal to ⅓ of the width of the display of the electronic whiteboard 2. The two two-dimensional codes 301 are displayed. The two two-dimensional codes 301 are displayed on the display 480 such that one is right-aligned and the other is left-aligned. Each of the two-dimensional codes 301 includes information indicating whether the two-dimensional code 301 is displayed on the right side or the left side. In the present embodiment, right and left are determined with the user facing the electronic whiteboard 2.

FIG. 27 is a diagram for describing a method of determining the direction of the electronic whiteboard 2 based on the two-dimensional codes 301. The analysis unit 23 detects the two two-dimensional codes 301 to identify position information of each of the two-dimensional codes 301 in the horizontal direction. The analysis unit 23 determines a position 253 located to the left from a left end 251 of the left two-dimensional code 301 by an amount equal to the width of the two-dimensional code 301, as the position of the left end of the electronic whiteboard 2. The analysis unit 23 determines a position 254 located to the right from a right end 252 of the right two-dimensional code 301 by an amount equal to the width of the two-dimensional code 301, as the position of the right end of the electronic whiteboard 2. The analysis unit 23 determines a range from the position 253 of the left end to the position 254 of the right end, as the direction of the electronic whiteboard 2.

Determination of Direction Based on Sound

Figure 28A:
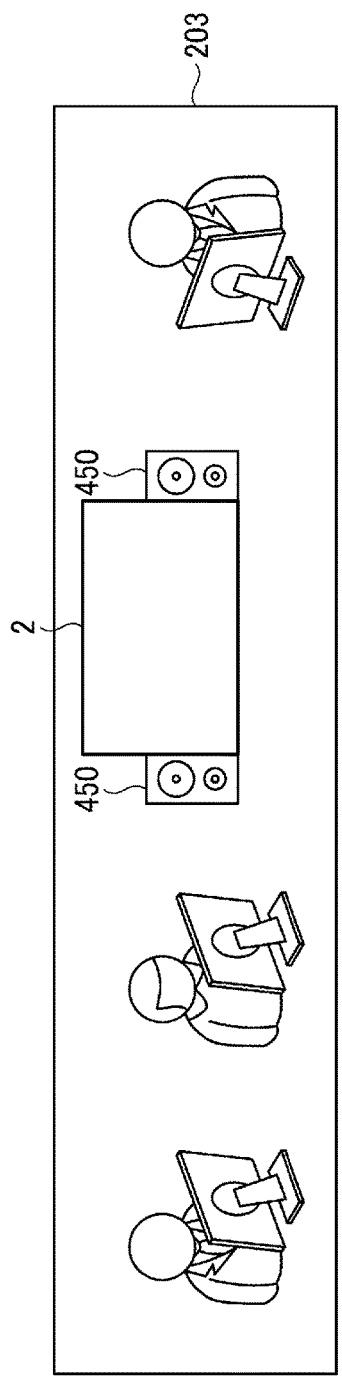
FIGS. 28A, 28B, and 28C are diagrams for describing a method of determining the direction of the electronic whiteboard, based on the specific sound output by the electronic whiteboard in accordance with the embodiment of the present disclosure.
Figure 28B:
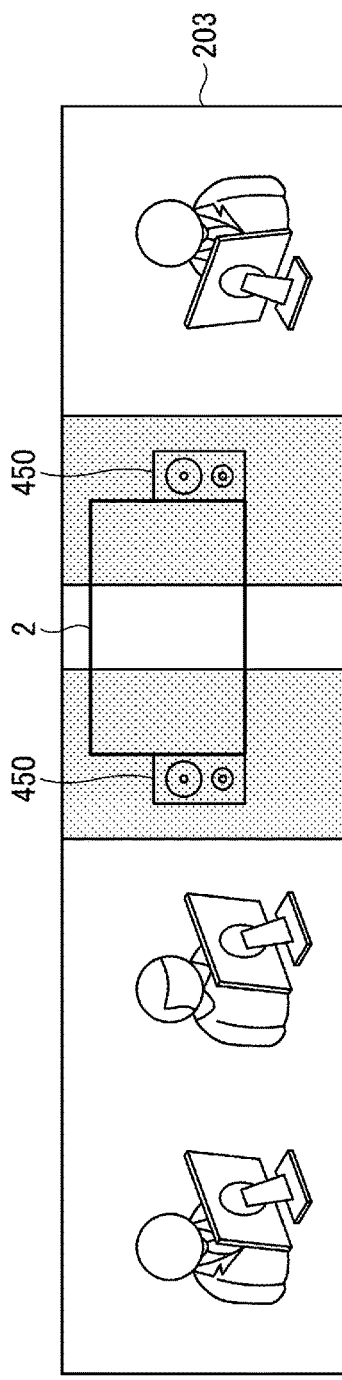
Figure 28C:
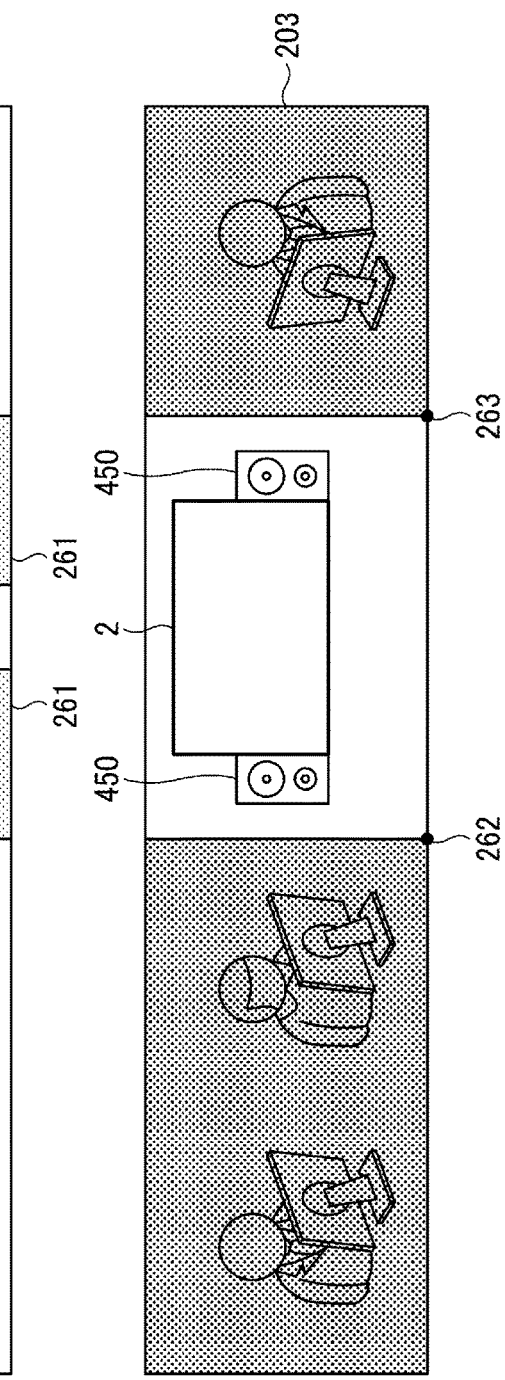

FIGS. 28A, 28B, and 28C are diagrams for describing a method of determining the direction of the electronic whiteboard 2 based on the specific sound output by the electronic whiteboard 2. As illustrated in FIG. 28A, the loudspeakers 450 are installed at the left and right ends of the electronic whiteboard 2. The loudspeakers 450 may be built in the right and left ends.

As illustrated in FIG. 28B, the audio data generation unit 37 outputs a sound from each of the loudspeakers 450. The microphone 608 of the meeting device 60 is directional and thus specifies from which direction the sound emitted from each of the loudspeakers 450 comes to the meeting device 60. Once the direction of the sound relative to the meeting device 60 is identified, the direction of the electronic whiteboard 2 in the panoramic image 203 is also identified.

Even the directional device direction detection unit 67 has a difficulty in determining in the center between the loudspeakers 450. Thus, based on the intensity of the sound of the specific frequency, the device direction detection unit 67 determines certain ranges 261 extending leftward and rightward around the direction with the highest intensity, as the positions of the loudspeakers 450.

As illustrated in FIG. 28C, the device direction detection unit 67 determines a range from a left end 262 of a left one of the two ranges 261 to a right end 263 of a right one of the two ranges 261, as the direction of the electronic whiteboard 2.

Figure 29:
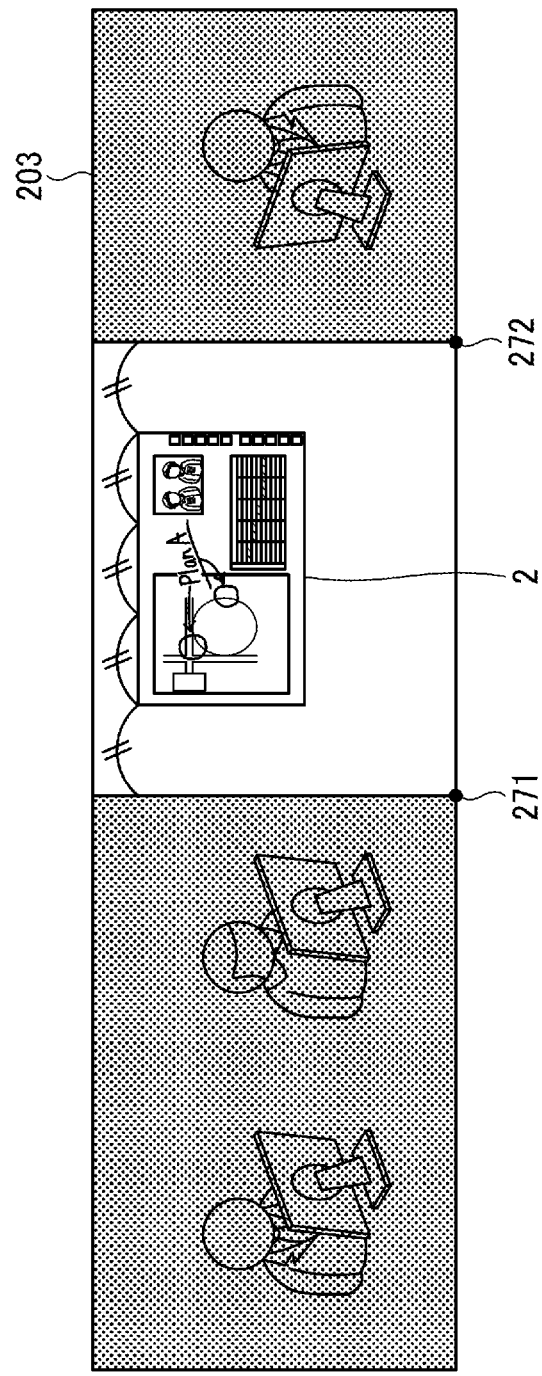
FIG. 29 is a diagram for describing a method of determining the direction of the electronic whiteboard based on the electronic whiteboard detected through image processing such as machine learning in accordance with the embodiment of the present disclosure.

4. Any Information Processing Apparatus Learning Shape of Electronic Whiteboard Through Machine Learning, and Terminal Apparatus or Meeting Device Recognizing Electronic Whiteboard from Panoramic Image Captured by Image-Capturer of Meeting Device FIG. 29 is a diagram for describing a method of determining the direction of the electronic whiteboard 2, based on the electronic whiteboard 2 detected through image processing such as machine learning. The device recognition unit 22 detects the shape (circumscribed rectangle) of the electronic whiteboard 2 from a panoramic image through machine learning. In response to detecting the electronic whiteboard 2 from the panoramic image, the device recognition unit 22 determines a range from a position 271, which is away from the left end of the electronic whiteboard 2 by ⅓ of the width of the electronic whiteboard 2, to a position 272, which is away from the right end of the electronic whiteboard 2 by ⅓ of the width of the electronic whiteboard 2, as the direction of the electronic whiteboard 2. ⅓ is merely an example.

The terminal apparatus 10 transmits information on the direction of the electronic whiteboard 2 to the meeting device 60, and the device direction detection unit 67 stores the direction of the electronic whiteboard 2. The meeting device 60 may detect the position based on image processing.

Screen Transition

Figure 30:
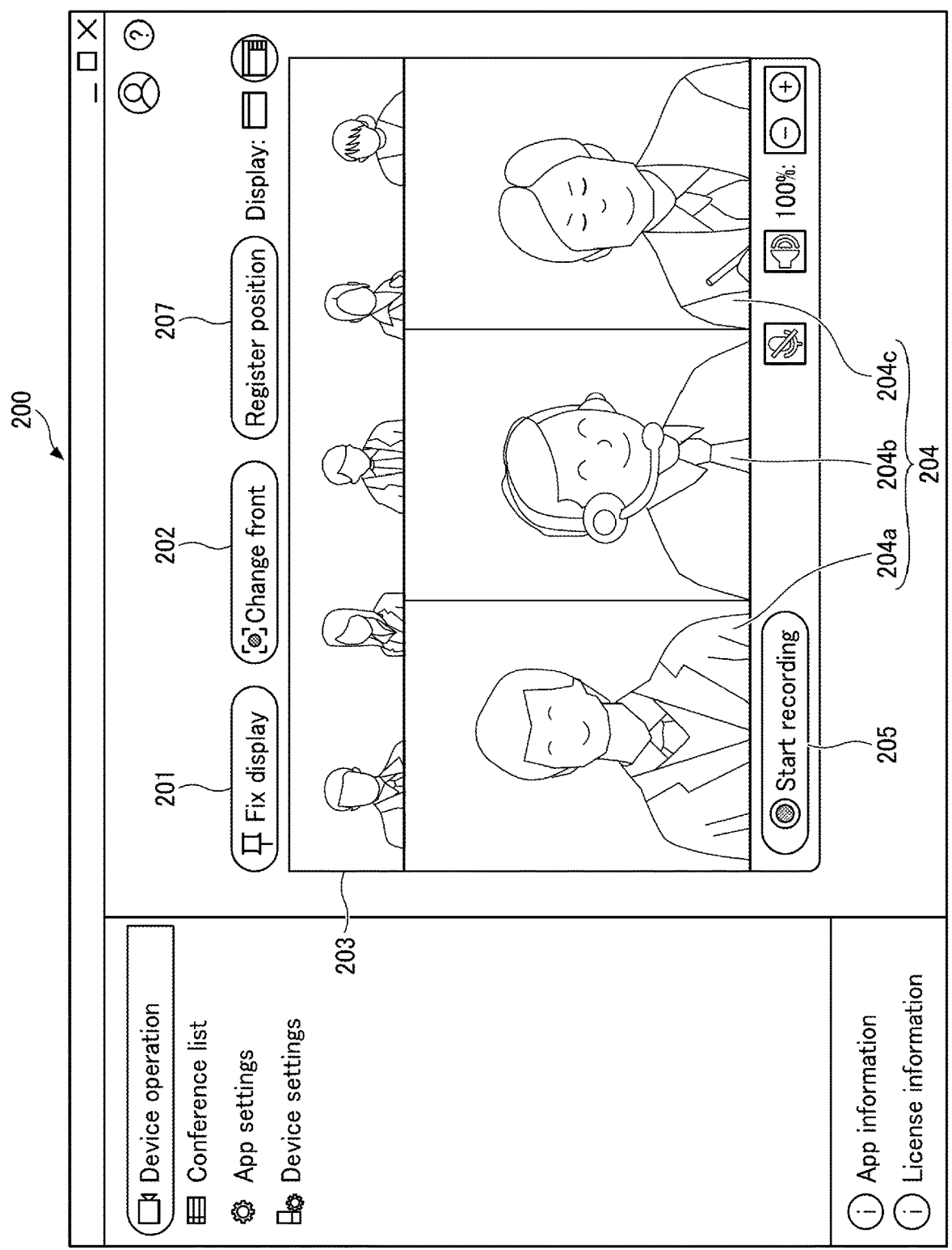
FIG. 30 is a diagram illustrating an example of an initial screen displayed by the information recording app operating on the terminal apparatus after login in accordance with the embodiment of the present disclosure.

Several screens displayed by the terminal apparatus 10 during a teleconference will be described with reference to FIGS. 30 to 33. FIG. 30 illustrates an initial screen 200 displayed by the information recording app 41 operating on the terminal apparatus 10 after login. The user of the terminal apparatus 10 connects the information recording app 41 to the information processing system 50. The user inputs authentication information, and if the login is successful, the initial screen 200 of FIG. 30 is displayed.

The initial screen 200 includes a fixed display button 201, a front change button 202, the panoramic image 203, one or more speaker images 204a to 204c (hereinafter referred to as speaker images 204 when the speaker images 204a to 204c are not distinguished from one another), a recording start button 205, and the position registration button 207. If the meeting device 60 has already been started and is capturing an image of the surroundings at the time of the login, the panoramic image 203 and the speaker images 204 created by the meeting device 60 are displayed in the initial screen 200. This thus allows the user to decide whether to start recording while viewing the panoramic image 203 and the speaker images 204. If the meeting device 60 is not started (is not capturing any image), the panoramic image 203 and the speaker images 204 are not displayed.

The information recording app 41 may display the speaker images 204 of all participants based on all faces detected from the panoramic image 203, or may display the speaker images 204 of N persons who have made an utterance most recently. FIG. 30 illustrates an example in which the speaker images 204 of up to three persons are displayed. Display of the speaker image 204 of a participant may be omitted until the participant makes an utterance (in this case, the number of the speaker images 204 increases by one in response to an utterance), or the speaker images 204 of three participants in a predetermined direction may be displayed (the speaker images 204 are switched in response to an utterance).

When no participants have made an utterance such as immediately after the meeting device 60 is started, an image of a predetermined direction (such as 0 degrees, 120 degrees, or 240 degrees) of 360 degrees in the horizontal direction is created as the speaker image 204. When fixed display (described later) is set, the setting of the fixed display is prioritized.

The fixed display button 201 is a button with which the user performs an operation of fixing a certain region of the panoramic image 203 as the speaker image 204 in close-up.

The front change button 202 is a button with which the user performs an operation of changing the front of the panoramic image 203 (since the panoramic image includes the 360-degree space in the horizontal direction, the direction indicated by the right end matches the direction indicated by the left end). The user slides the panoramic image 203 leftward or rightward with a pointing device to determine a participant who appears in front. The user's operation is transmitted to the meeting device 60. The meeting device 60 changes the angle set as the front among 360 degrees in the horizontal direction, creates the panoramic image 203, and transmits the panoramic image 203 to the terminal apparatus 10.

The position registration button 207 is a button with which the user performs an operation of setting a position (direction) of a device such as the electronic whiteboard 2.

Figure 31:
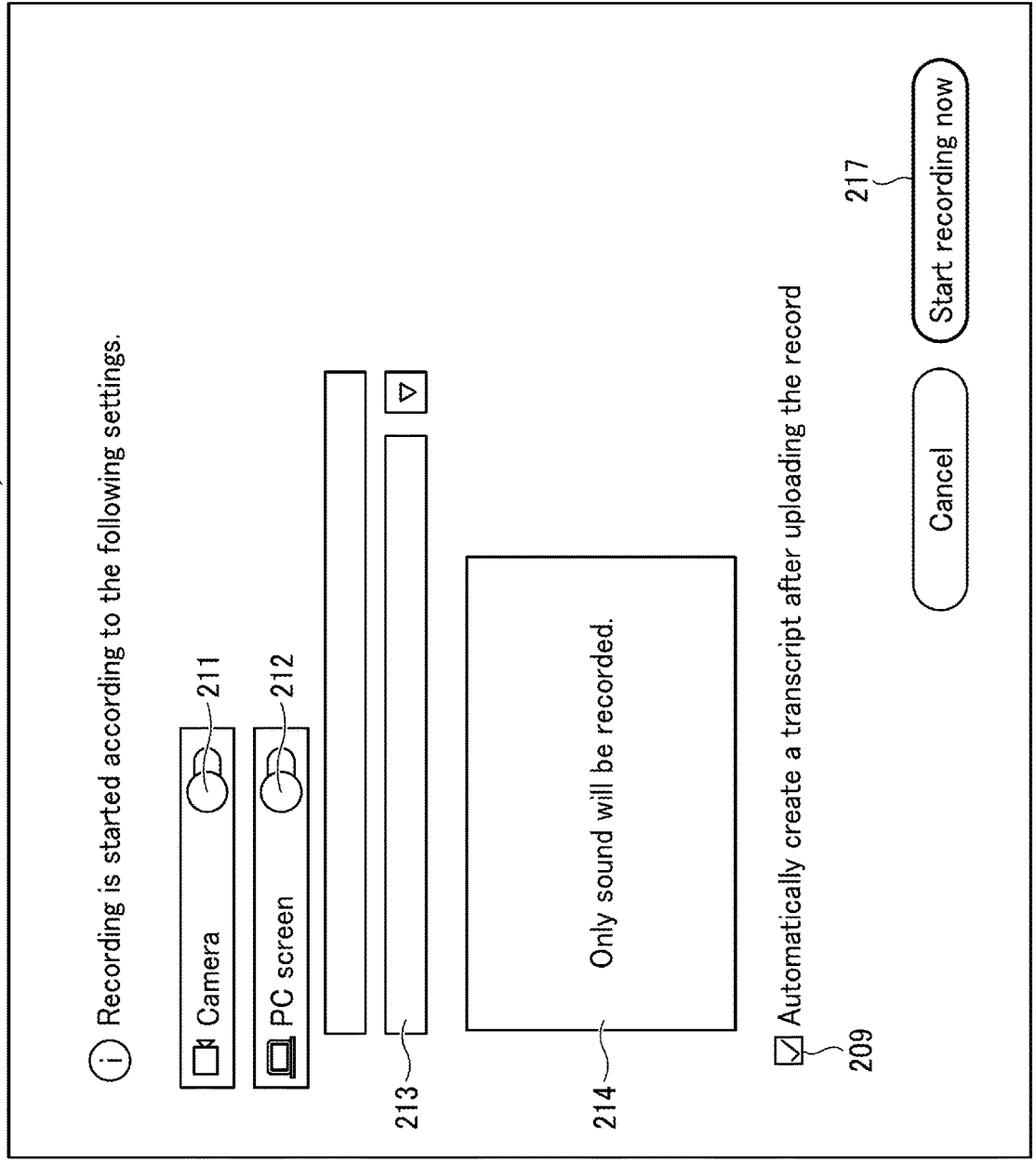
FIG. 31 is a diagram illustrating an example of a recording setting screen displayed by the information recording app in accordance with the embodiment of the present disclosure.

In response to the user pressing the recording start button 205, the information recording app 41 displays a recording setting screen 210 of FIG. 31.

FIG. 31 is an example of the recording setting screen 210 displayed by the information recording app 41. The recording setting screen 210 allows the user to set whether to record the panoramic image 203 and the speaker images 204 created by the meeting device 60 and a desktop screen of the terminal apparatus 10 or a screen of an app operating on the terminal apparatus 10 (whether to include the images and screen in a recorded video). If the setting is made to record none of the panoramic image, the speaker images, and the desktop screen or the screen of the operating app, the information recording app 41 records sound (sound output by the terminal apparatus 10 and sound collected by the meeting device 60).

A camera toggle button 211 is a button for switching on and off recording of the panoramic image 203 and the speaker images 204 created by the meeting device 60. The camera toggle button 211 may allow settings for recording a panoramic image and a speaker image to be made separately.

A PC screen toggle button 212 is a button for switching on and off recording of the desktop screen of the terminal apparatus 10 or the screen of the app operating on the terminal apparatus 10. When the PC screen toggle button 212 is on, the desktop screen is recorded.

When the user desires to record a screen of an app, the user further selects the app in an app selection field 213. The app selection field 213 displays names of apps being executed by the terminal apparatus 10 in a pull-down format. Thus, the app selection field 213 allows the user to select an app whose screen is to be recorded. The information recording app 41 acquires the names of the apps from the OS. The information recording app 41 can display names of apps that have a user interface (UI) (screen) among apps being executed. The apps to be selected may include the teleconference app 42. Thus, the information recording app 41 can record a material displayed by the teleconference app 42, the participant at each site, and the like as a moving image. The apps whose names are displayed in the pull-down format may include various apps being executed on the terminal apparatus 10 such as a presentation app, a word processor app, a spreadsheet app, a material creating and editing app for documents or the like, a cloud electronic whiteboard app, and a web browser app. This thus allows the user to flexibly select the screen of the app to be included in the combined moving image.

When recording is performed in units of apps, the user is allowed to select a plurality of apps. The information recording app 41 can record the screens of all the selected apps.

When both the camera toggle button 211 and the PC screen toggle button 212 are set off, "Only sound will be recorded" is displayed in a recording content confirmation window 214. The sound includes sound output from the terminal apparatus 10 (sound received by the teleconference app 42 from the other site 101) and sound collected by the meeting device 60. That is, when a teleconference is being held, the sound from the teleconference app 42 and the sound from the meeting device 60 are stored regardless of whether the images are recorded. Note that the user may make a setting to selectively stop storing the sound from the teleconference app 42 and the sound from the meeting device 60.

In accordance with a combination of on and off of the camera toggle button 211 and the PC screen toggle button 212, a combined moving image is recorded in the following manner. The combined moving image is displayed in real time in the recording content confirmation window 214.

If the camera toggle button 211 is on and the PC screen toggle button 212 is off, the panoramic image and the speaker images captured by the meeting device 60 are displayed in the recording content confirmation window 214.

If the camera toggle button 211 is off and the PC screen toggle button 212 is on (and the screen has also been selected), the desktop screen or the screen of the selected app is displayed in the recording content confirmation window 214.

If the camera toggle button 211 is on and the PC screen toggle button 212 is on, the panoramic image and the speaker images captured by the meeting device 60 and the desktop screen or the screen of the selected app are displayed side by side in the recording content confirmation window 214.

Thus, an image created by the information recording app 41 is referred to as a combined moving image for convenience in the present embodiment although there is a case where the panoramic image and the speaker images or the screen of the app is not recorded or a case where none of the panoramic image, the speaker image, and the screen of the app are recorded.

The recording setting screen 210 further includes a check box 209 with a message "Automatically create a transcript after uploading the record". The recording setting screen 210 also includes a start recording now button 217. If the user checks the check box 209, text data converted from utterances made during the teleconference is attached to the recorded moving image. In this case, after the end of recording, the information recording app 41 uploads audio data to the information processing system 50 together with a text data conversion request. In response to the user pressing the start recording now button 217, a recording-in-progress screen 220 in FIG. 32 is displayed.

Figure 32:
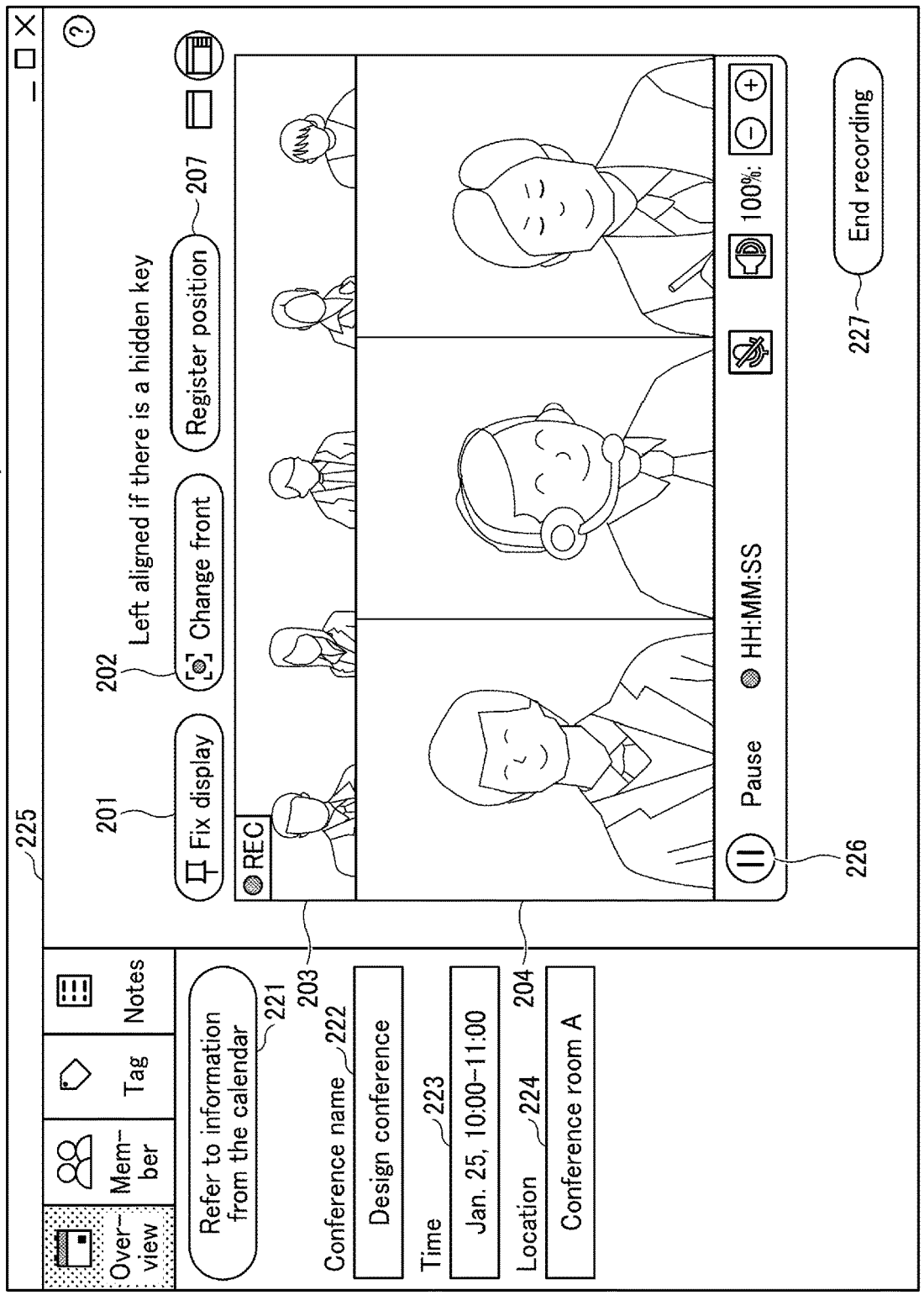
FIG. 32 is a diagram illustrating an example of a recording-in-progress screen displayed by the information recording app during recording in accordance with the embodiment of the present disclosure.

FIG. 32 is an example of the recording-in-progress screen 220 displayed by the information recording app 41 during recording. In FIG. 32, differences from FIG. 30 will be mainly described. The recording-in-progress screen 220 displays, in real time, the combined moving image being recorded according to the conditions set by the user in the recording setting screen 210. The recording-in-progress screen 220 in FIG. 32 corresponds to the case where the camera toggle button 211 is on and the PC screen toggle button 212 is off, and displays the panoramic image 203 and the speaker images 204 (both of which are moving images) created by the meeting device 60. The recording-in-progress screen 220 displays a recording icon 225, a pause button 226, and a recording end button 227.

The pause button 226 is a button for pausing the recording. The pause button 226 also receives an operation of resuming the recording after the recording is paused. The recording end button 227 is a button for ending the recording. The recorded video ID is does not changed when the pause button 226 is pressed, whereas the recorded video ID is changed when the recording end button 227 is pressed. After pausing or temporarily stopping the recording, the user is allowed to set the recording conditions set in the recording setting screen 210 again before resuming the recording or starting recording again. In this case, the information recording app 41 may create a plurality of moving image files each time the recording is stopped (for example, when the recording end button 227 is pressed), or may combine a plurality of files to create one continuous moving image (for example, when the pause button 226 is pressed). When the information recording app 41 plays the combined moving image, the information recording app 41 may play the plurality of moving image files continuously as one moving image.

The recording-in-progress screen 220 includes an acquire-information-from-calendar button 221, a conference name field 222, a time field 223, and a location field 224. The acquire-information-from-calendar button 221 is a button with which the user acquires conference information from the conference management system 9. In response to pressing of the acquire-information-from-calendar button 221, the information recording app 41 acquires a list of conferences for which the user has a right to view from the information processing system 50 and displays the list of conferences. The user selects a teleconference to be held from the list of conferences. Consequently, the conference information is reflected in the conference name field 222, the time field 223, and the location field 224. The title, the start time and the end time, and the location included in the conference information are reflected in the conference name field 222, the time field 223, and the location field 224, respectively. The conference information and the recording information in the conference management system 9 are associated with each other by the conference ID.

In response the user ending the recording after the end of the teleconference, a combined moving image with sound is created.

Figure 33:
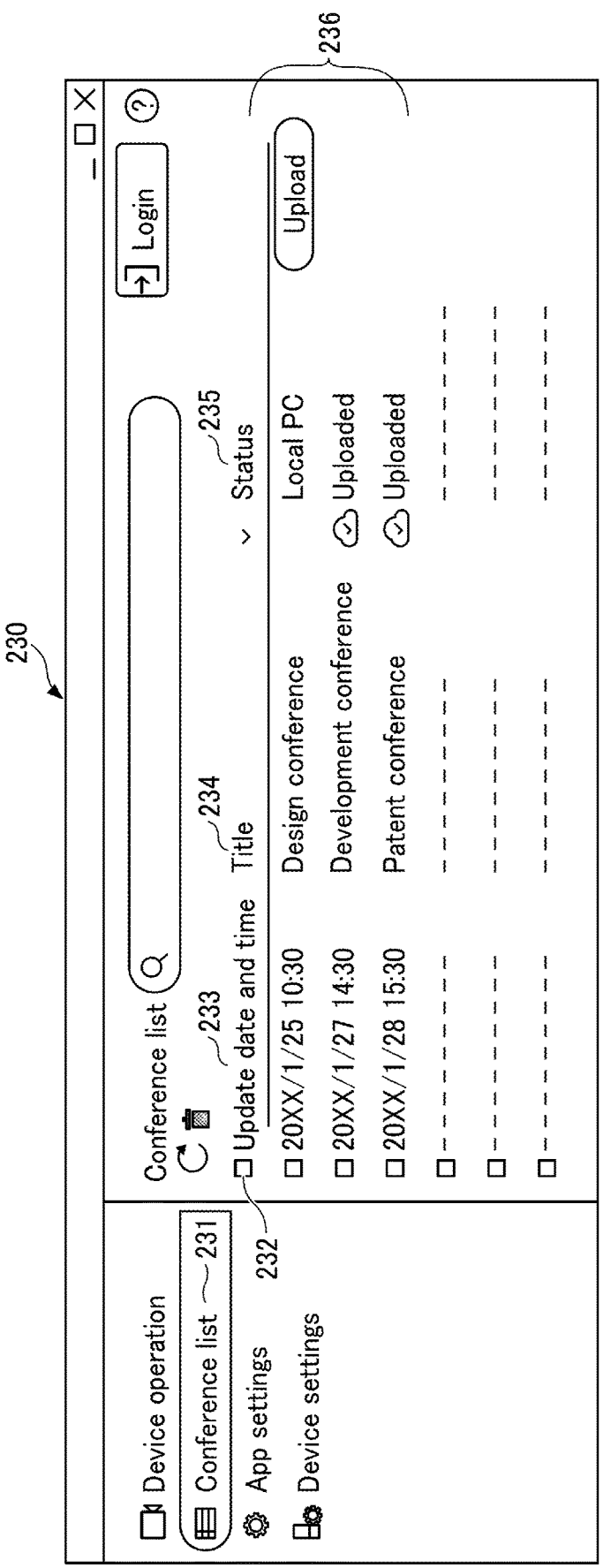
FIG. 33 is a diagram illustrating an example of a conference list screen displayed by the information recording app in accordance with the embodiment of the present disclosure.

FIG. 33 is an example of the conference list screen 230 displayed by the information recording app 41. The conference list screen 230 displays a list of conferences, specifically, a list of pieces of recording information recorded during teleconferences. The list of conferences includes conferences held in a certain conference room as well as teleconferences.

The conference list screen 230 displays conference information for which the logged-in user has a right to view in the conference information storage unit 5001. The moving image recording information stored in the information storage unit 1001 may be further integrated.

The conference list screen 230 is displayed in response to the user selecting a conference list tab 231 in the initial screen 200 in FIG. 30. The conference list screen 230 displays a list 236 of pieces of recording information for which the user has a right to view. The conference creator (minutes creator) can set the right to view for a participant of the conference. The list of conferences may be a list of stored pieces of recording information, a list of scheduled conferences, or a list of pieces of conference data.

The conference list screen 230 includes items such as a check box 232, an update date and time 233, a title 234, and a status 235.

The check box 232 receives selection of a moving image file. The check box 232 is used when the user desires to collectively delete the moving image files.

The update date and time 233 indicates a recording start time or a recording end time of the combined moving image. If the combined moving image is edited, the update date and time 233 indicates the edited date and time.

The title 234 indicates the title (such as a subject) of the conference. The title may be transcribed from the conference information or set by the user.

The status 235 indicates whether the combined moving image has been uploaded to the information processing system 50. If the combined moving image has not been uploaded, "Local PC" is displayed. If the combined moving image has been uploaded, "Uploaded" is displayed. If the combined moving image has not been uploaded, an upload button is displayed. If there is a combined moving image yet to be uploaded, it is desirable that the information recording app 41 automatically upload the combined moving image when the user logs into the information processing system 50.

In response to the user selecting a title or the like from the list 236 of the combined moving images with a pointing device, the information recording app 41 displays a recording/playback screen, description of which is omitted in the present embodiment. The recording/playback screen allows playback of the combined moving image.

It is desirable that the user be allowed to narrow down conferences based on the update date and time, the title, the keyword, or the like. If the user has a difficulty finding a conference of interest because many conferences are displayed, it is desirable that the user be allowed to input a word or phrase to narrow down the recording information based the word or phrase included in utterances made during the conference or the title of the conference with a search function. The search function allows the user to find desired recording information in a short time even if the number of pieces of recorded information increases. In the conference list screen 230, the user may be allowed to perform sorting by the update date and time or the title.

Storage of Combined Moving Image

Figure 34:
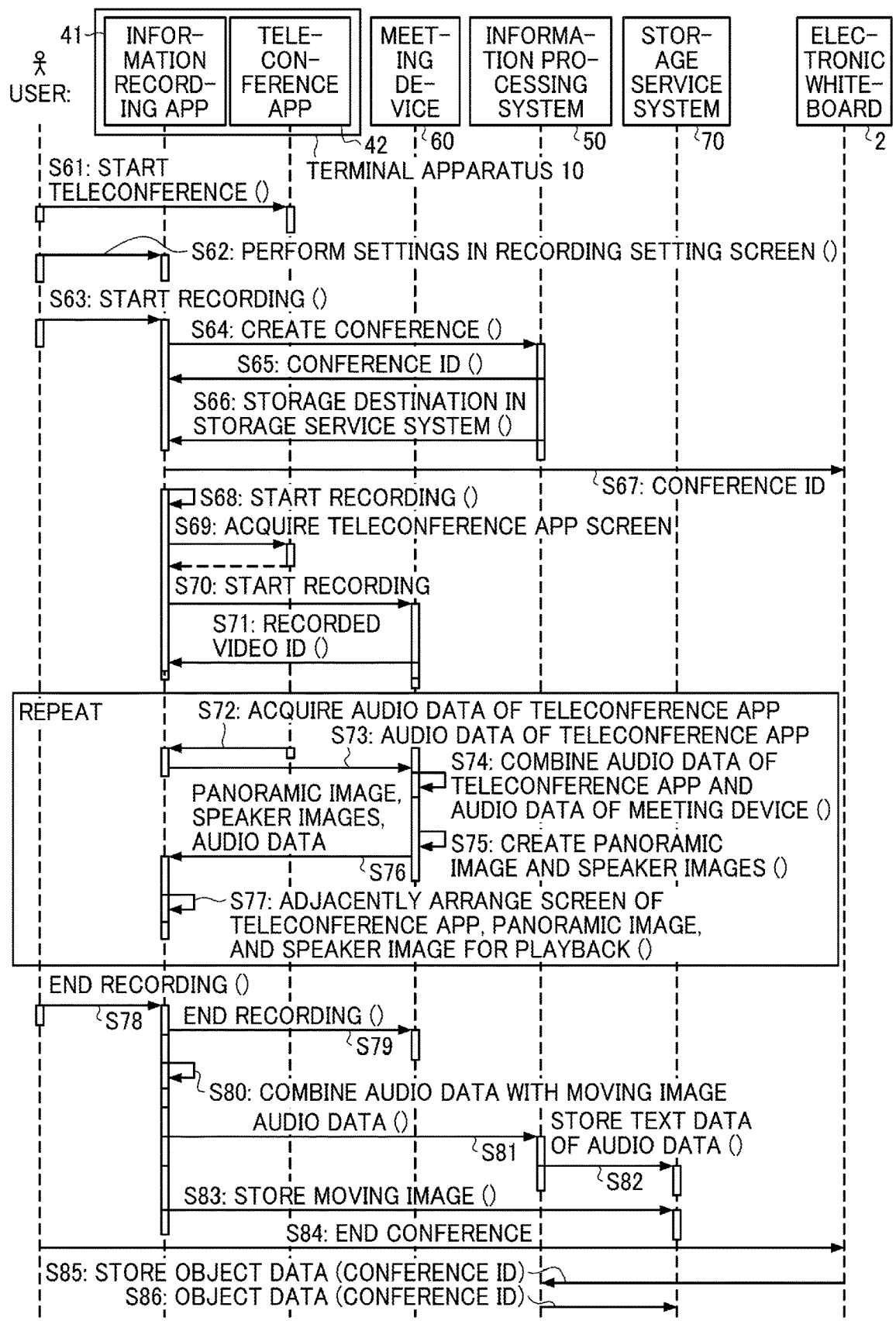
FIG. 34 is an example of a sequence diagram for describing a process in which the meeting device starts clipping of a device image in response to the start of an operation on the electronic whiteboard and ends the clipping of the device image in response to the end of the operation on the electronic whiteboard in accordance with the embodiment of the present disclosure.

A process of storing a combined moving image will be described with reference to FIG. 34. FIG. 34 is an example of a sequence diagram illustrating a procedure in which the information recording app 41 records a panoramic image, speaker images, and a screen of an app.

S61: The user at the one site 102 operates the teleconference app 42 to start a teleconference. In this example, the teleconference app 42 at the one site 102 and the teleconference app 42 at the other site 101 start a teleconference. The teleconference app 42 at the one site 102 transmits an image captured by the camera of the terminal apparatus 10 and sound collected by the microphone of the terminal apparatus 10 to the teleconference app 42 at the other site 101. The teleconference app 42 at the other site 101 displays the received image on the display of the terminal apparatus 8 and outputs the received sound from the loudspeaker of the terminal apparatus 8. Likewise, the teleconference app 42 at the other site 101 transmits an image captured by the camera of the terminal apparatus 8 and sound collected by the microphone of the terminal apparatus 8 to the teleconference app 42 at the one site 102. The teleconference app 42 at the one site 102 displays the received image on the display of the terminal apparatus 10 and the loudspeaker of the terminal apparatus 10. The teleconference app 42 at the one site 102 and the teleconference app 42 at the other site 101 repeat this processing to implement the teleconference.

S62: The user at the one site 102 performs recording settings in the recording setting screen 210 of the information recording app 41 illustrated in FIG. 31 The operation reception unit 12 of the information recording app 41 receives the settings. In this example, both the camera toggle button 211 and the PC screen toggle button 212 are on.

If the teleconference is scheduled in advance, the user presses the acquire-information-from-calendar button 221 in FIG. 32 to display the list of conferences and selects the teleconference with which a moving image to be recorded is associated. Since the user has logged into the information processing system 50, the information processing system 50 identifies teleconferences for which the logged-in user has a right to view. The information processing system 50 transmits the list of the identified teleconferences to the terminal apparatus 10. Thus, the user selects a teleconference that is being held or to be held. In this way, information related to the teleconference such as the conference ID is determined.

If the teleconference is not scheduled in advance, the user is allowed to create the conference when creating a combined moving image. In the description below, the information recording app 41 creates a conference when creating a combined moving image and acquires the conference ID from the information processing system 50.

S63: The user instructs the information recording app 41 to start recording (through a start recording now button 217). The operation reception unit 12 of the information recording app 41 receives the instruction. The display control unit 13 displays the recording-in-progress screen 220.

S64: Since the teleconference is not selected (because the conference ID has not been determined), the communication unit 11 of the information recording app 41 transmits a teleconference creation request to the information processing system 50.

S65: The communication unit 51 of the information processing system 50 receives the teleconference creation request. The communication management unit 54 acquires the conference ID that is unique and assigned by the conference management system 9. The communication unit 51 transmits the conference ID to the information recording app 41.

S66: The communication management unit 54 transmits information on a storage destination (URL of the storage service system 70) of the combined moving image (moving image file) to the information recording app 41 via the communication unit 51.

S67: The communication unit 11 of the information recording app 41 receives the conference ID and the information on the storage destination of the moving image file. The communication unit 11 then transmits the conference ID to the electronic whiteboard 2. In one example, the communication unit 11 transmits the conference ID to the electronic whiteboard 2 via the information processing system 50. In another example, the communication unit transmits the conference ID directly to the electronic whiteboard 2.

S68: In response to the communication unit 11 of the information recording app 41 receiving the conference ID and the information on the storage destination of the moving image file, the recording control unit 17 determines that recording is ready to be started and starts recording.

S69: The app screen acquisition unit 14 of the information recording app 41 transmits a request for an app screen to an app selected by the user. Specifically, the app screen acquisition unit 14 acquires the app screen via the OS. In FIG. 34, the app selected by the user is the teleconference app 42.

S70: The recording control unit 17 of the information recording app 41 notifies the meeting device 60 of the start of recording via the device communication unit 16. It is desirable that the recording control unit 17 notify the meeting device 60 that the camera toggle button 211 is on (to request the panoramic image and the speaker images). The meeting device 60 transmits the panoramic image and the speaker images to the information recording app 41 regardless of the presence or absence of the request.

S71: In response to the terminal communication unit 61 of the meeting device 60 receiving the recording start notification, the terminal communication unit 61 assigns a unique recorded video ID and returns the recorded video ID to the information recording app 41. The recorded video ID may be assigned by the information recording app 41, or may be acquired from the information processing system 50.

S72: The sound acquisition unit 15 of the information recording app 41 acquires audio data output by the terminal apparatus 10 (audio data received by the teleconference app 42).

S73: The device communication unit 16 transmits the audio data acquired by the sound acquisition unit 15 and a combination request to the meeting device 60.

S74: The terminal communication unit 61 of the meeting device 60 receives the audio data and the combination request, and the audio combining unit 65 combines the audio data of the surroundings collected by the sound collection unit 64 and the received audio data together. For example, the audio combining unit 65 adds up the two pieces of audio data. Since clear sound around the meeting device 60 is recorded, particularly the accuracy of text converted from the sound around the meeting device 60 (in the conference room) increases.

The terminal apparatus 10 may perform this combination of the audio data. However, if the recording function is deployed in the terminal apparatus 10 and the audio processing is deployed in the meeting device 60 in a distributed manner, the loads on the terminal apparatus and the meeting device 60 are successfully reduced. In another example, the recording function may be deployed in the meeting device 60 and the audio processing may be deployed in the terminal apparatus 10 in a distributed manner.

S75: The panoramic image generation unit 62 of the meeting device 60 creates a panoramic image, and the speaker image generation unit 63 creates speaker images.

S76: The device communication unit 16 of the information recording app 41 repeatedly acquires the panoramic image and the speaker images from the meeting device 60. The device communication unit 16 repeatedly acquires the combined audio data from the meeting device 60. The device communication unit 16 may transmit a request to the meeting device 60 to acquire the images and the audio data. Alternatively, in response to receiving a notification indicating that the camera toggle button 211 is on, the meeting device 60 may automatically transmit the panoramic image and the speaker images. In response to receiving the combination request for the audio data, the meeting device 60 may automatically transmit the combined audio data to the information recording app 41.

S77: The recording control unit 17 of the information recording app 41 arranges the app screen acquired from the teleconference app 42, the panoramic image, and the speaker images adjacently with one another to create a combined image. The recording control unit 17 repeatedly creates the combined image and designates each combined image as a frame of a moving image to create a combined moving image. The recording control unit 17 stores the audio data received from the meeting device 60.

The information recording app 41 repeats steps S72 to S77 described above. While steps S72 to S77 are performed, the process illustrated in FIG. 17 (generation and transmission of the operator image 7) is performed as occasion arises.

S78: If the teleconference ends and the recording is no longer desired, the user instructs the information recording app 41 to end recording (through the recording end button 227, for example). The operation reception unit 12 of the information recording app 41 receives the instruction.

S79: The device communication unit 16 of the information recording app 41 transmits a recording end notification to the meeting device 60. The meeting device 60 keeps creating the panoramic image and the speaker images and combining the audio data. The meeting device 60 may change the processing load such as the resolution or the frame rate (fps) depending on whether recording is in progress.

S80: The recording control unit 17 of the information recording app 41 combines the audio data with the combined moving image to create the combined moving image with sound.

S81: If the user has checked the check box 209 "Automatically create a transcript after uploading the record" in the recording setting screen 210, the audio data processing unit 18 transmits a request to convert the audio data into text data to the information processing system 50.

Specifically, the audio data processing unit 18 designates the URL of the storage destination, and transmits, via the communication unit 11, a request to convert the audio data of the combined moving image along with the conference ID and the recorded video ID to the information processing system 50.

S82: The communication unit 51 of the information processing system 50 receives the request to convert the audio data, and the text conversion unit 56 uses the speech recognition service system 80 to convert the audio data into text data. The communication unit 51 stores the text data in the storage destination (indicated by the URL of the storage service system 70) that is the same as the storage destination of the combined moving image. The recorded video information storage unit 5002 stores the text data in association with the combined moving image by the conference ID and the recorded video ID. The communication management unit 54 of the information processing system 50 may manage and store the text data in the storage unit 5000. The terminal apparatus 10 may transmit a speech recognition request to the speech recognition service system 80 and store the text data acquired from the speech recognition service system 80 in the storage destination. The speech recognition service system 80 returns the converted text data to the information processing system 50. In another example, the speech recognition service system 80 may transmit the text data directly to the URL of the storage destination. The speech recognition service system 80 may be selectively switched from among a plurality of services in accordance with settings set by the user in the information processing system 50.

S83: The upload unit 20 of the information recording app 41 stores the combined moving image in the storage destination of the combined moving image via the communication unit 11. In the recorded video information storage unit 5002, the combined moving image is associated with the conference ID and the recorded video ID. For the combined moving image, "Uploaded" is recorded.

S84: The user performs an operation to end the conference on the electronic whiteboard 2. The user may perform an operation to end the conference on the terminal apparatus 10, and the terminal apparatus 10 may transmit a conference end notification to the electronic whiteboard 2. In this case, the conference end notification may be transmitted to the electronic whiteboard 2 via the information processing system 50.

S85: The communication unit 36 of the electronic whiteboard 2 designates the conference ID in a request to store the object data (for example, handwritten object data) displayed during the conference, and transmits the request to the information processing system 50. The object data is shared in real time by the information processing system 50. The communication unit 36 may transmit the device identification information of the electronic whiteboard 2 to the information processing system 50. In this case, the conference ID is identified by the association information.

S86: Based on the conference ID, the information processing system 50 stores the object data in the same storage destination as the storage destination of the combined moving image and the like.

The user is notified of the storage destination. Thus, the user may notify the participants of the storage destination by email or the like to share the combined moving image with the participants. Even if different apparatuses create the combined moving image, the audio data, the text data, and the object data, the combined moving image, the audio data, the text data, and the object data are collectively stored in a single storage place. This makes it easier for the user or the like to view the combined moving image, the audio data, the text data, and the object data later.

The processing of steps S72 to S77 is not necessarily performed in the order described in FIG. 34, and the combination of the audio data and the creation of the combined image may be performed in opposite order.

According to the present embodiment, the operator image 7 is displayed near the stroke 120 at the other site 101. This allows the user at the other site 101 to easily grasp who is writing (wrote) the stroke 120. The information processing system 50 associates the operator image 7 with the object data. This make it clear that who has input the object and thus improves the content of the minutes.

Second Embodiment

In the present embodiment, a case is described in which the electronic whiteboard 2 and the terminal apparatus 10 do not communicate directly but transmit and receive information via the information processing system 50. Even if direct communication between the electronic whiteboard 2 and the terminal apparatus 10 is not available, the terminal apparatus 8 at the other site successfully displays the operator image 7.

In description of the present embodiment, the hardware configuration diagrams of FIGS. 4, 5, and 8 and the functional block diagram of FIG. 9 described in the above embodiment are used.

Figure 35:
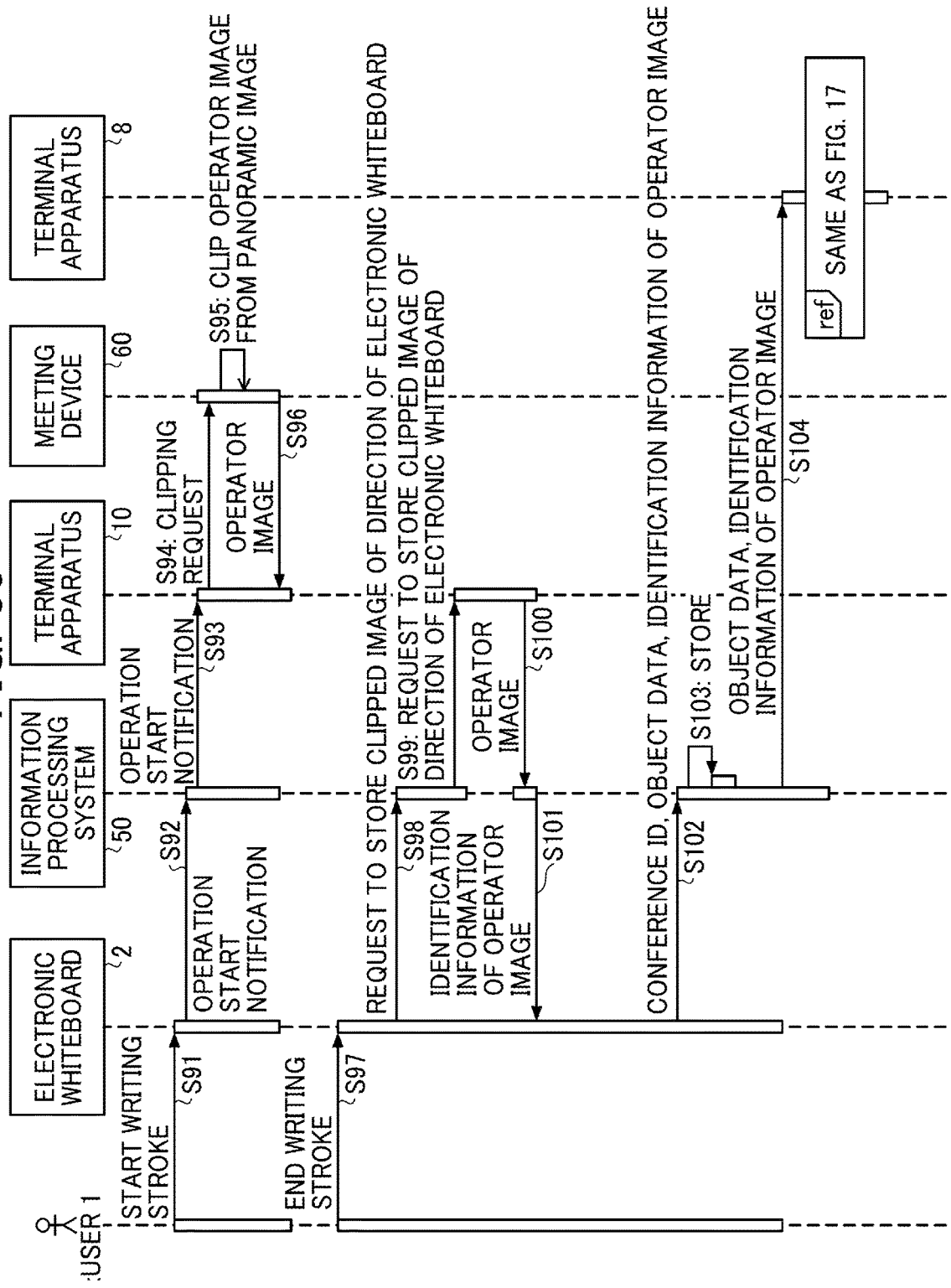
FIG. 35 is an example of a sequence diagram for describing a process in which the terminal apparatus at the other site displays a stroke handwritten on the electronic whiteboard by a user, along with the operator image in accordance with another embodiment of the present disclosure.

FIG. 35 is a sequence diagram for describing a process in which the terminal apparatus 8 at the other site displays a stroke handwritten on the electronic whiteboard 2 by the user 1, along with the operator image 7. In FIG. 35, differences from FIG. 17 will be mainly described.

S91, S92: The user 1 participating in a conference performs handwriting on the electronic whiteboard 2 with the electronic pen 490 or an operation for displaying a screen of a PC on the electronic whiteboard 2. Since the operation is performed on the electronic whiteboard 2, the communication unit 36 of the electronic whiteboard 2 transmits an operation start notification to the information processing system 50 along with the device identification information of the electronic whiteboard 2.

S93: The communication unit 51 of the information processing system 50 transmits the operation start notification to the meeting device 60 (that is, the terminal apparatus 10) associated with the device identification information of the electronic whiteboard 2. The terminal apparatus 10 repeatedly performs polling on the information processing system 50 using the conference ID to receive communication from the information processing system 50. Alternatively, the terminal apparatus 10 may communicate with the information processing system 50 via bi-directional communication such as WebSocket.

Processing of steps S94 to S96 may be the same as or similar to the processing of steps S3 to S5 in FIG. 17.

S97: The user ends writing.

S98: The operation detection unit 38 of the electronic whiteboard 2 detects the end of the operation (a request to store the clipped image of the direction of the electronic whiteboard 2). In response to the end of the operation, the operator image reception unit 40*b* of the electronic whiteboard 2 designates the device identification information of the electronic whiteboard 2 in a request for the operator image 7 and transmits the request to the information processing system 50 via the communication unit 36.

S99: The communication unit 51 of the information processing system 50 receives the device identification information of the electronic whiteboard 2 and the request for the operator image 7. The object sharing unit 57 transmits, via the communication unit 51, the request for the operator image 7 to the terminal apparatus 10 connected to the meeting device 60 associated with the electronic whiteboard 2.

S100: The communication unit 11 of the terminal apparatus 10 receives the request for the operator image 7, and the operator image transmission unit 24 transmits the operator image 7 to the information processing system 50 via the communication unit 11.

S101: The communication unit 51 of the information processing system 50 receives the operator image 7, and the object sharing unit 57 assigns the identification information to the operator image 7. The object sharing unit 57 stores the identification information of the operator image 7 and the operator image 7 in association with each other. The object sharing unit 57 also transmits, via the communication unit 51, the identification information of the operator image 7 to the electronic whiteboard 2 that has transmitted the operation end notification.

S102: The communication unit 36 of the electronic whiteboard 2 receives the identification information of the operator image 7, and the object upload unit 40*a* transmits the conference ID, the object data, and the identification information of the operator image 7 to the information processing system 50 via the communication unit 36.

S103: The communication unit 51 of the information processing system 50 receives the conference ID, the object data, and the identification information of the operator image 7, and the object sharing unit 57 stores the object data, the identification information of the operator image 7, and the operator image 7 in association with one another. The object ID may be assigned by the electronic whiteboard 2 or by the information processing system 50.

S104: The object sharing unit 57 transmits, via the communication unit 51, the object data and the identification information of the operator image 7 to the terminal apparatus 8, at the other site, participating in the same conference identified by the conference ID. The following processing is substantially the same as the processing in FIG. 17.

In addition to the advantages of the first embodiment, the operator image 7 is transmitted from the terminal apparatus 10 to the electronic whiteboard 2 via the information processing system 50 even if direct communication between the terminal apparatus 10 and the electronic whiteboard 2 is not available in the present embodiment.

Third Embodiment

In the present embodiment, a case is described in which a user consecutively writes strokes and then another user writes a stroke. When consecutive processing is assumed as in the present embodiment, the image acquisition timing or the like is different from that in the first and second embodiments.

In description of the present embodiment, the hardware configuration diagrams of FIGS. 4, 5, and 8 and the functional block diagram of FIG. 9 described in the above embodiment are used.

Figure 36:
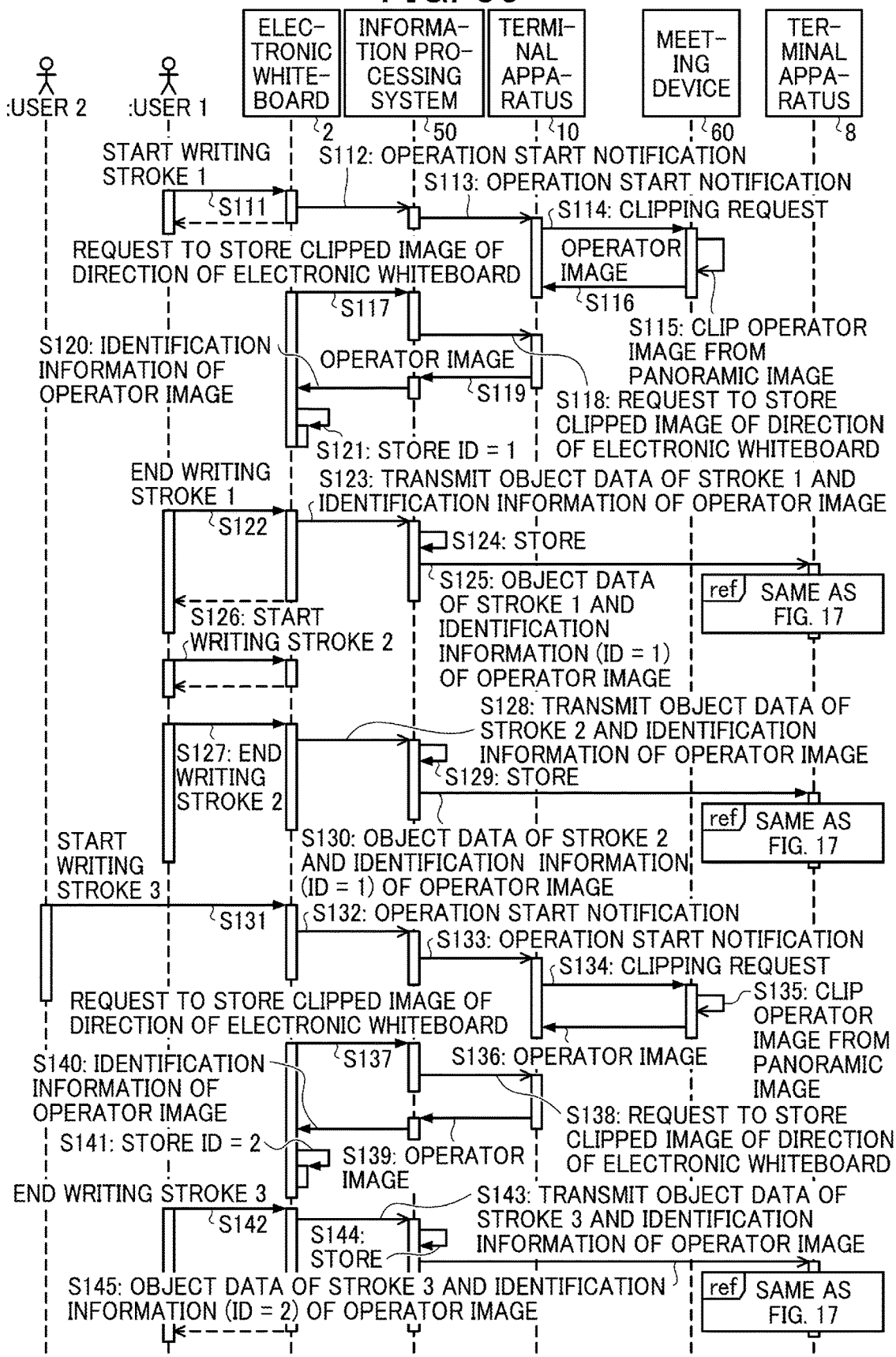
FIG. 36 is an example of a sequence diagram for describing a process in which the terminal apparatus at the other site displays strokes along with the operator image in the case where a user handwrites strokes on the electronic whiteboard and then another user handwrites another stroke on the electronic whiteboard in accordance with the embodiment of the present disclosure.

FIG. 36 is a sequence diagram for describing a process in which the terminal apparatus 8 at the other site 101 displays strokes along with the operator image 7 when the user 1 performs handwriting on the electronic whiteboard 2 and then another user 2 (U2) performs handwriting on the electronic whiteboard 2. Processing of steps S111 to S116 is substantially the same as the processing of steps S91 to S96 in FIG. 35.

Processing of steps S117 to S120 may be substantially the same as the processing of steps S98 to S101 in FIG. 35. However, FIG. 36 assumes consecutive processing of strokes. Thus, the electronic whiteboard 2 acquires the identification information of the operator image 7 without waiting for the end of the operation.

S121: The communication unit 36 of the electronic whiteboard 2 receives the identification information of the operator image 7, and stores the identification information of the operator image 7 in the object data storage unit 3002. For convenience of explanation, the identification information of the operator image 7 is 1.

S122: The user 1 ends writing the stroke 1.

S123: The operation detection unit 38 of the electronic whiteboard 2 detects the end of the operation, and the object upload unit 40*a* transmits the identification information of the operator image 7 and the object data to the information processing system 50 via the communication unit 36.

S124: The communication unit 51 of the information processing system 50 receives the identification information of the operator image 7 and the object data, and the object sharing unit 57 assigns the object ID and stores the object ID in association with the identification information of the operator image 7 in the object data storage unit 5005. The electronic whiteboard 2 may assign the object ID.

S125: The object sharing unit 57 transmits, via the communication unit 51, the object data and the identification information of the operator image 7 to the terminal apparatus 8, at the other site 101, participating in the same conference. The following processing is substantially the same as the processing in FIG. 17.

S126: Then, the user 1 starts writing a stroke 2. Since the input is started (pen-down) within a certain period from the end (pen-up) of the input of the stroke 1 (last stroke), the operator image reception unit 40*b* determines that the user who is writing the stroke 2 is the same as the user who wrote the stroke 1 and does not acquire the operator image 7. The operator image reception unit 40*b* holds the identification information of the operator image 7 (ID=1) which is acquired for the stroke 1, and thus can use the same operator image 7.

S127 to S130: The user 1 ends writing the stroke 2. This processing is substantially the same as the processing of steps S122 to S125. ID=1 is used as the identification information of the operator image 7.

S131: The user 2 starts writing a stroke 3. Since the input is started (pen-down) after the certain period or longer has elapsed from the end (pen-up) of the input of the stroke 2 (last stroke), the operator image reception unit 40*b* determines that the user 2 is a user different from the user 1 and acquires the identification information of the operator image 7. The operator image reception unit 40*b* determines that the operator image 7 is to be updated since another user may be writing the stroke 3.

The operator image reception unit 40*b* may detect a change of the operator through image processing, in addition to detection of the change of the operator depending on whether the certain period or longer has elapsed from the pen up to the pen down. The image of the face of the user who is operating the electronic whiteboard 2 is not captured by the meeting device 60. The operator image reception unit 40*b*, however, detects the change of the operator based on a feature quantity of the user's appearance from the back (such as the height, hairstyle, or clothing).

In steps S132 to S141, substantially the same processing as the processing of steps S112 and S121 is performed. However, the identification information of the operator image 7 which is ID=2 is newly assigned.

S142 to S145: The user 2 ends writing the stroke 3. This processing is substantially the same as the processing of steps S122 to S125. ID=2 is used as the identification information of the operator image 7.

As described above, in the present embodiment, whenever the electronic whiteboard 2 deduces a change of the user, the electronic whiteboard 2 acquires the identification information of the operator image 7.

Figure 37A:
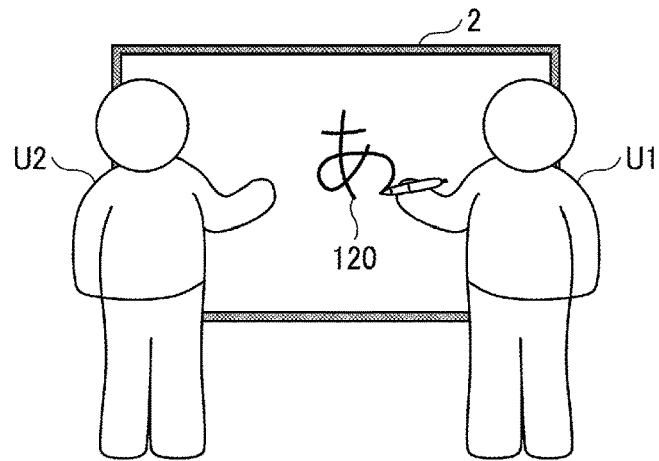
FIGS. 37A, 37B, and 37C are diagrams illustrating an example of the operator image displayed by the terminal apparatus at the other site when two users perform operations on the electronic whiteboard.
Figure 37B:
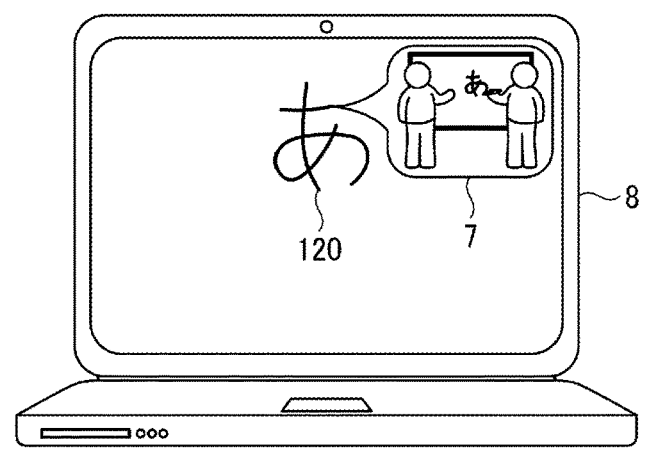
Figure 37C:
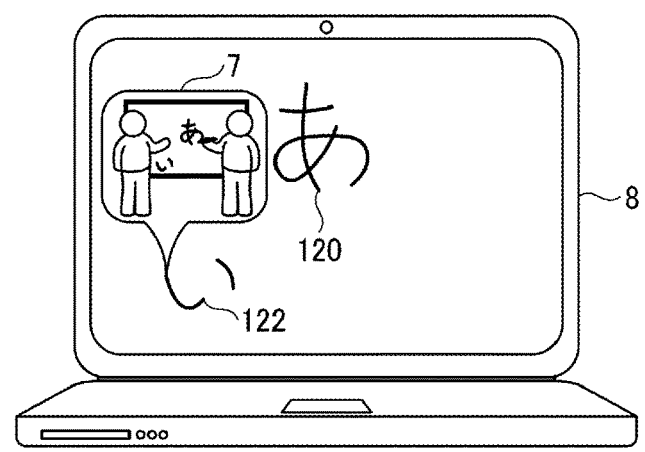

FIGS. 37A, 37B, and 37C illustrate the operator image 7 displayed by the terminal apparatus 8 at the other site 101 when the two users 1 and 2 perform operations on the electronic whiteboard 2. FIG. 37A illustrates the two users 1 and 2 who are performing operations on the electronic whiteboard 2. FIG. 37B illustrates the operator image 7 displayed by the terminal apparatus 8 at the other site 101.

As described in FIG. 36, while the user 1 is handwriting the stroke 120, the terminal apparatus 8 at the other site 101 displays the operator image 7 once and hides the operator image 7 after a certain period elapses.

In response to the user 2 handwriting a stroke 122, the terminal apparatus 8 at the other site 101 acquires and displays the new operator image 7. If the operator image 7 associated with the stroke 120 is being displayed, the display control unit 73 hides the displayed operator image 7 (FIG. 37B) and displays the operator image 7 (FIG. 37C) associated with the stroke 122.

Process of Terminal Apparatus at Another Site

A process in which the terminal apparatus 8 at the other site 101 displays the operator image 7 will be described with reference to FIG. 38. FIG. 38 is a flowchart for describing a process in which in response to receiving the operator image 7, the terminal apparatus 8 at the other site 101 displays the operator image 7. The process described below is performed by the terminal apparatus 8 at the other site 101.

The display control unit 73 displays the stroke and the operator image 7 received from the information processing system 50 (S201).

The communication unit 71 then determines whether the next stroke data and the identification information of the operator image 7 are received (S202). The stroke data includes the identification information of the operator image 7. As described above, the identification information of the operator image 7 may be the same as the previous one in some cases, and may be different from the previous one in other cases. If NO is determined in step S202, the process proceeds to step S205.

If YES is determined in step S202, the operator image acquisition unit 74 determines whether the identification information of the operator image 7 is the same as the previous one (S203).

If the identification information of the operator image 7 is the same as the identification information of the operator image 7 currently displayed (YES in step S203), acquisition of the operator image 7 may be skipped. Thus, the process proceeds to step S205.

If the identification information of the operator image 7 is different from the identification information of the operator image 7 currently displayed (NO in step S203), the display control unit 73 changes the operator image 7 (S204). Specifically, the operator image acquisition unit 74 designates the identification information of the operator image 7 and acquires the operator image 7 from the information processing system 50 via the communication unit 71. Even if the identification information of the operator image 7 is different, the operator image 7 associated with a newly added stroke may include the same operator as the operator included in the previous operator image 7 in some cases and may include an operator different from the operator included in the previous operator image in other cases.

In response to an elapse of a certain period from the display of the operator image 7 (YES in S205), the display control unit 73 hides the operator image 7 (S206).

The terminal apparatus 8 at the other site 101 holds the operator image 7 in association with the object data even after hiding the operator image 7 to get ready for re-display. This enables the terminal apparatus 8 to re-display the operator image in response to a user touching the stroke, for example.

Figure 39:
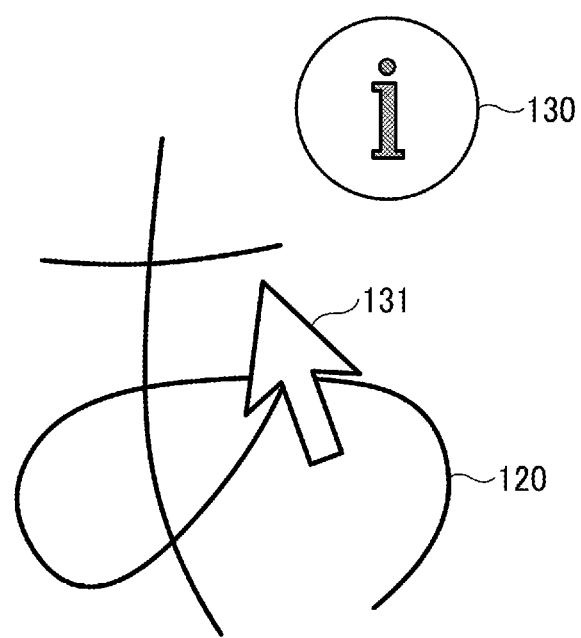
FIG. 39 is an example of a diagram illustrating a marking indicating that an operator image is attached to a stroke displayed by the terminal apparatus at the other site.

FIG. 39 illustrates a marking 130 indicating that the operator image 7 is attached to the stroke 120 displayed by the terminal apparatus 8 at the other site 101. As described above, the operator image 7 is hidden in response to an elapse of the certain period. However, the user may desire to display the operator image 7 again. If the user desires to display the operator image 7 for the stroke 120, the user presses the stroke 120 with a pointing device 131 such as a mouse, a pen, or a finger to display the marking 130. In response to the user pressing the marking 130 with the pointing device 131, the display control unit 73 displays the operator image 7 associated with the stroke 120. This operator image 7 is stored in the terminal apparatus 8 at the other site 101 during the conference. This allows the user to confirm the operator associated with the object at any time.

The display control unit 73 may display the operator image 7 again in response to the user pressing the stroke 120.

If the terminal apparatus 8 at the other site 101 acquires the object from the information processing system 50 and displays the object after the end of the conference, the operator image 7 is not transmitted to the terminal apparatus 8 at the other site 101 along with the object data in some cases because the operator image 7 has a large size. In such cases, the operator image acquisition unit 74 may acquire the operator image 7 from the information processing system 50 based on the identification information of the operator image 7.

The marking 130 is merely an example, and the stroke 120 associated with the operator image 7 may blink or may be displayed in a different color. The operator image 7 may be displayed in response to the pointing device 131 being placed over the marking 130, instead of pressing the marking 130.

Input/Display Area

Figure 40A:
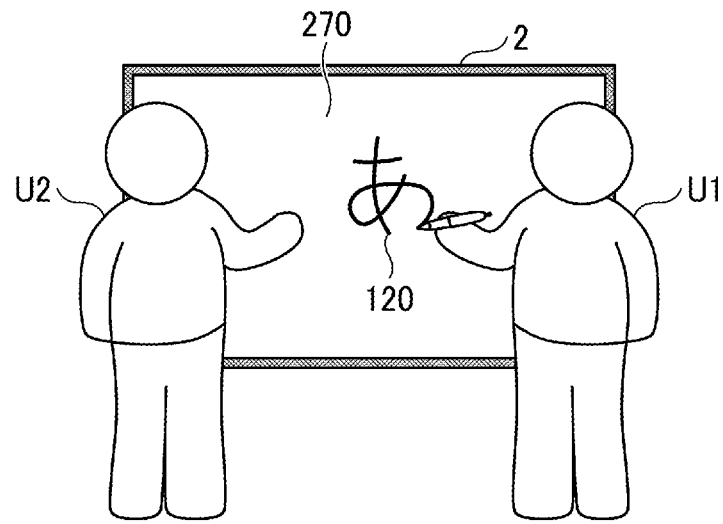
FIGS. 40A and 40B are diagrams for describing an input/display area.
Figure 40B:
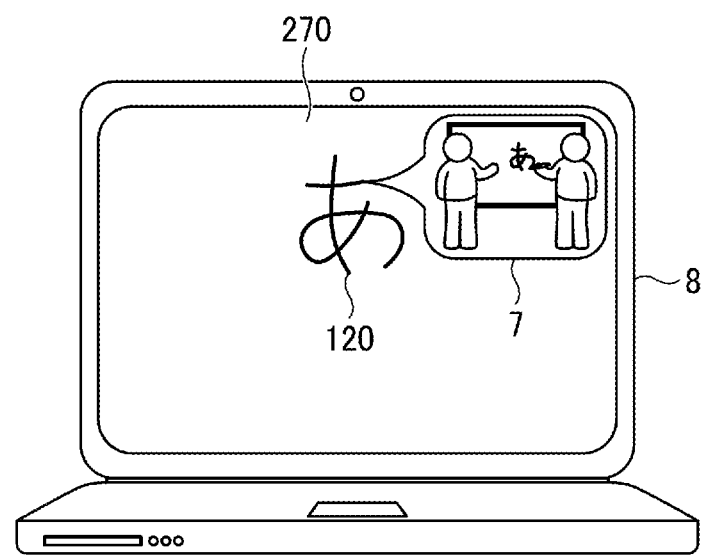

FIGS. 40A and 40B are diagrams describing the input/display area. The object sharing unit 57 allows the input/display area, the object data, and the operator image 7 to be shared between the terminal apparatuses 8 and the electronic whiteboard 2 that participate in the same conference. As illustrated in FIGS. 40A and 40B, the object sharing unit 57 allows an input/display area 270 to be shared between the electronic whiteboard 2 and the terminal apparatus 8 to receive an input of an object to the input/display area 270 on the electronic whiteboard 2 or the terminal apparatus 8. For example, the object sharing unit 57 receives an object transmitted from the electronic whiteboard 2 at the one site 102 in response to an input of an object on the electronic whiteboard 2 at the one site 102, and transmits the object to the terminal apparatus 8 at the other site 101. The object sharing unit 57 also performs this processing in the opposite direction.

Variations

While the present invention has been described above using the above-described one or more embodiments, the embodiments do not limit the present disclosure in any way. Various modifications and replacements may be made within a scope not departing from the gist of the present disclosure.

For example, a person located near the electronic whiteboard 2 may be detected through image processing to determine the range of the operator image 7 in the panoramic image. The meeting device 60 or the terminal apparatus 10 may detect that the person located near the electronic whiteboard 2 is performing handwriting on the electronic whiteboard 2 through image processing.

The terminal apparatus 10 and the meeting device 60 may be integrated together. The meeting device 60 may be externally attached to the terminal apparatus 10. The meeting device 60 may be implemented by a spherical camera, a microphone, and a loudspeaker connected to one another by cables.

The meeting device 60 may be disposed at the other site 101. The meeting device 60 at the other site 101 separately creates a combined moving image and text data. A plurality of meeting devices 60 may be disposed at a single site. In this case, a plurality of pieces of recording information are created for the respective meeting devices 60.

The arrangement of the panoramic image 203, the speaker images 204, and the screen of the app in the combined moving image used in the present embodiments is merely an example. The panoramic image 203 may be displayed below the speaker images 204, the user may change the arrangement, or the user may switch between non-display and display individually for the panoramic image 203 and the speaker images 204 during playback.

In the configuration examples illustrated in FIG. 9 and the like, the terminal apparatus 10, the meeting device 60, and the information processing system 50 are each divided in accordance with the major functions thereof to facilitate understanding of the processes performed by the terminal apparatus 10, the meeting device 60, and the information processing system 50. No limitation is intended by how the functions are divided by process or by the name of the functions. The processes performed by the terminal apparatus 10, the meeting device 60, and the information processing system 50 may be divided into more processing units in accordance with the content of the processes. In addition, the division may be performed so that one processing unit contains more processing.

The apparatuses or devices described in one or more embodiments are just one example of plural computing environments that implement the one or more embodiments disclosed herein. In some embodiments, the information processing system 50 includes multiple computing devices, such as a server cluster. The plural computing devices communicate with one another through any type of communication link including a network, shared memory, etc., and perform the processes disclosed herein.

The information processing system 50 may share the processing steps disclosed herein, for example, steps in FIG. 17 or the like in various combinations. For example, a process performed by a predetermined unit may be performed by a plurality of information processing apparatuses included in the information processing system 50. The information processing system 50 may be implemented by a single server apparatus in a collective manner or by a plurality of apparatuses in a distributed manner.

Any one of the above-described operations may be performed in various other ways, for example, in an order different from the one described above.

Each of the functions of the above-described embodiments may be implemented by one or more pieces of processing circuitry. The term "processing circuit or circuitry" used herein refers to a processor that is programmed to carry out each function by software such as a processor implemented by an electronic circuit, or a device such as an application specific integrated circuit (ASIC), digital signal processor (DSP), field programmable gate array (FPGA), or existing circuit module that is designed to carry out each function described above.

The invention claimed is:

1. A device management system comprising:
   a display device including first circuitry configured to display a display area for displaying an object input by an operator;
   an image-capturing device including second circuitry configured to acquire an operator image including an image of at least a portion of the display device and at least a portion of an operator; and
   an information processing server including third circuitry configured to transmit the operator image acquired by the image-capturing device to a terminal to enable sharing of the display area between the display device and the terminal, wherein
   the terminal includes a terminal apparatus at one site, the terminal apparatus at the one site being installed at a site where the image-capturing device and the display device are installed,
   the first circuitry of the display device is configured to transmit, in response to detecting an operation performed by the operator on the display device, a detection notification for the operation to the terminal apparatus at the one site, the terminal apparatus being configured to transmit a request for acquiring the operator image to the image-capturing device,
   the second circuitry of the image-capturing device is configured to transmit the operator image to the terminal apparatus at the one site, and
   the first circuitry of the display device is configured to transmit, to the information processing server, the operator image received from the terminal apparatus at the one site and an object displayed at the display device.

2. The device management system according to claim 1, wherein the terminal further includes another terminal apparatus at another site, the another terminal apparatus at the another site being installed at another site different from the site where the image-capturing device, the display device, and the terminal apparatus at the one site are installed, and
the third circuitry of the information processing server is configured to transmit the operator image and the object that are received from the display device, to the another terminal apparatus at the another site different from the one site where the display device is located.

3. The device management system according to claim 2, wherein the information processing server further includes:
a memory that stores the operator image and the object in association with each other, and
the third circuitry is configured to provide the another terminal apparatus at the another site with the operator image associated with the object, in response to selection of the object being displayed at the another terminal apparatus at the another site.

4. The device management system according to claim 2, wherein the third circuitry of the information processing server is configured to receive an operator image and an object that are received from the another apparatus at the another site based on a stroke input, and transmit the operator image and the object to the terminal apparatus at the one site.

5. The device management system according to claim 4, further comprising:
the terminal apparatus at the one site, being configured to communicate with the information processing server via a network,
the terminal apparatus including
fourth circuitry configured to display the operator image and the object received from the information processing server.

6. The device management system according to claim 5, wherein
the third circuitry of the information processing server is configured to transmit identification information of the operator image and the object to the terminal apparatus at the one site, and
wherein, in a case where the received identification information of the operator image differs from the identification information of the operator image being displayed, the fourth circuitry of the terminal apparatus is configured to change display of the operator image.

7. The device management system according to claim 5, wherein the fourth circuitry of the terminal apparatus is configured to display an indication indicating that the operator image is associated with the object, in response to receipt of an operation on the object.

8. The device management system according to claim 1, wherein the first circuitry of the display device is configured to
receive, in response to transmitting the operator image to the information processing server, identification information of the operator image from the information processing server, and
add the identification information of the operator image to the object to be transmitted to the information processing server.

9. The device management system according to claim 8, wherein the first circuitry of the display device is configured to
detect an operation performed by the operator for each stroke,
based on a determination that a time period from an end of inputting one stroke to a start of inputting a next stroke is equal to or less than a predetermined value,
skip transmission of the detection notification for the operation to the terminal apparatus at the one site, and
transmit, to the information processing server, the identification information of the operator image and the object that reflects the stroke being input during the time period.

10. The device management system according to claim 9, wherein the first circuitry of the display device is configured to
based on a determination that a time period from an end of inputting one stroke to a start of inputting a next stroke exceeds a predetermined value,
transmit the detection notification for the operation to the terminal apparatus at the one site and acquire a new operator image, and
transmit, to the information processing server, new identification information of the new operator image and the object that reflects the stroke being input during the time period, the new identification information of the new operator image being received from the information processing server in response to the first circuitry of the display device transmitting the new operator image to the information processing server.

11. An information processing server comprising server circuitry configured to:
acquire an operator image captured by an image-capturing device, the operator image including an image of at least a portion of a display device and at least a portion of an operator who is performing an input operation on the display device; and
transmit the acquired operator image to a terminal to enable sharing of the display area between the display device and the terminal, wherein
the terminal includes a terminal apparatus at one site, the terminal apparatus at the one site being installed at a site where the image-capturing device and the display device are installed,
first circuitry of the display device is configured to transmit, in response to detecting an operation performed by the operator on the display device, a detection notification for the operation to the terminal apparatus at the one site, the terminal apparatus being configured to transmit a request for acquiring the operator image to the image-capturing device,
second circuitry of the image-capturing device is configured to transmit the operator image to the terminal apparatus at the one site, and
the first circuitry of the display device is configured to transmit, to the information processing server, the operator image received from the terminal apparatus at the one site and an object displayed at the display device.

12. An information processing method comprising:
acquiring an operator image captured by an image-capturing device, the operator image including an image of at least a portion of a display device and at least a portion of an operator who is performing an input operation on the display device;
transmitting the acquired operator image to a terminal to enable sharing of the display area between the display device and the terminal, the terminal including a terminal apparatus at one site, the terminal apparatus at the one site being installed at a site where the image-capturing device and the display device are installed;

transmitting, in response to detecting an operation performed by the operator on the display device, a detection notification for the operation to the terminal apparatus at the one site, the terminal apparatus being configured to transmit a request for acquiring the operator image to the image-capturing device;

transmitting the operator image to the terminal apparatus at the one site; and transmitting, to an information processing server, the operator image received from the terminal apparatus at the one site and an object displayed at the display device.

13. A non-transitory recording medium storing a plurality of instructions which, when executed by one or more processors, cause the processors to perform an information processing method comprising:

acquiring an operator image captured by an image-capturing device, the operator image including an image of at least a portion of a display device and at least a portion of an operator who is performing an input operation on the display device;

transmitting the acquired operator image to a terminal to enable sharing of the display area between the display device and the terminal, the terminal including a terminal apparatus at one site, the terminal apparatus at the one site being installed at a site where the image-capturing device and the display device are installed;

transmitting, in response to detecting an operation performed by the operator on the display device, a detection notification for the operation to the terminal apparatus at the one site, the terminal apparatus being configured to transmit a request for acquiring the operator image to the image-capturing device;

transmitting the operator image to the terminal apparatus at the one site; and transmitting, to an information processing server, the operator image received from the terminal apparatus at the one site and an object displayed at the display device.

\* \* \* \* \*